(12) United States Patent
Randel

(10) Patent No.: US 10,453,120 B2
(45) Date of Patent: Oct. 22, 2019

(54) NETWORKED COMPUTER SYSTEM AND COMPUTER IMPLEMENTED METHODS FOR PROVIDING AN ONLINE AUCTION WEBPAGE WITH SKILL-BASED GAME

(71) Applicant: Advanced Promotional Technologies, Inc., Acworth, GA (US)

(72) Inventor: Michael D. Randel, Acworth, GA (US)

(73) Assignee: Advanced Promotional Technologies, Inc., Acworth, GA (US)

( * ) Notice: Subject to any disclaimer, the term of this patent is extended or adjusted under 35 U.S.C. 154(b) by 779 days.

(21) Appl. No.: 14/991,617

(22) Filed: Jan. 8, 2016

(65) Prior Publication Data

US 2016/0125521 A1    May 5, 2016

Related U.S. Application Data

(63) Continuation-in-part of application No. 14/512,050, filed on Oct. 10, 2014, now abandoned, which is a
(Continued)

(51) Int. Cl.
*G06Q 30/08* (2012.01)
*A63F 13/792* (2014.01)
(Continued)

(52) U.S. Cl.
CPC .............. *G06Q 30/08* (2013.01); *A63F 13/67* (2014.09); *A63F 13/792* (2014.09);
(Continued)

(58) Field of Classification Search
USPC ..................................... 705/14.1–14.73, 26.3
See application file for complete search history.

(56) References Cited

U.S. PATENT DOCUMENTS

| 6,415,270 B1 | 7/2002 | Rackson et al. |
|---|---|---|
| 2002/0052778 A1 | 5/2002 | Murphy et al. |

(Continued)

OTHER PUBLICATIONS

"Unique Competition Website Yoofind.me Launches Offering the Chance to Win iPads and Other Prizes for Just One Pound"; PR Newswire Europe; London, Apr. 24, 2012 (Year: 2012).*
(Continued)

*Primary Examiner* — Michael J Sittner
(74) *Attorney, Agent, or Firm* — Howard & Howard Attorneys PLLC

(57) ABSTRACT

A networked computer system for providing a webpage to a user is described herein. The networked computer system includes a database and a computer server that includes a processor that is coupled to a memory device. The database includes a webpage list including a plurality of host webpage records and an auction list including a plurality of auction items. The computer server receives a participation request from a web browser, accesses the database, and generates an auction webpage. The computer server receives a signal indicating a bid request from the user, generates a skill-based game to the user, receives a skill input from the user, determines an outcome of the skill-based game based on the skill input, and generates a bid associated with the received bid request based on the outcome of the skill-based game.

18 Claims, 37 Drawing Sheets

Related U.S. Application Data continuation-in-part of application No. 14/296,245, filed on Jun. 4, 2014, now abandoned, which is a continuation-in-part of application No. 13/871,850, filed on Apr. 26, 2013, now abandoned.

(60) Provisional application No. 61/639,666, filed on Apr. 27, 2012, provisional application No. 62/101,725, filed on Jan. 9, 2015.

(51) Int. Cl.
| | |
|---|---|
| *G07F 17/32* | (2006.01) |
| *A63F 13/67* | (2014.01) |
| *G06Q 30/02* | (2012.01) |
| *H04L 29/08* | (2006.01) |
| *G06F 16/9535* | (2019.01) |
| *G06F 16/957* | (2019.01) |

(52) U.S. Cl.
CPC ...... *G06F 16/9535* (2019.01); *G06F 16/9574* (2019.01); *G06Q 30/0212* (2013.01); *G07F 17/32* (2013.01); *H04L 67/02* (2013.01)

(56) References Cited

U.S. PATENT DOCUMENTS

| | | |
|---|---|---|
| 2003/0233278 A1 | 12/2003 | Marshall |
| 2006/0030400 A1* | 2/2006 | Mathis ................... G07F 17/32 463/20 |
| 2010/0069136 A1 | 3/2010 | Safaei et al. |
| 2011/0034237 A1* | 2/2011 | Schulhof ................ G06Q 30/08 705/26.3 |
| 2012/0246008 A1* | 9/2012 | Hamilton, II .......... G06Q 30/02 705/14.66 |
| 2012/0246737 A1* | 9/2012 | Paxton .................. G06F 21/316 726/27 |
| 2012/0284137 A1 | 11/2012 | Beckham et al. |
| 2013/0103530 A1* | 4/2013 | Tilford ................... G06Q 30/08 705/26.3 |
| 2013/0138490 A1 | 5/2013 | Mosley et al. |
| 2013/0304599 A1* | 11/2013 | Vincent ................. G06Q 30/08 705/26.3 |
| 2014/0215008 A1* | 7/2014 | Wiles ................ G06F 17/30902 709/217 |
| 2014/0258015 A1 | 9/2014 | Friedman |
| 2016/0048662 A1* | 2/2016 | Arnoud .................. G06F 21/31 726/5 |
| 2016/0067615 A1* | 3/2016 | Lai .......................... A63F 13/67 463/23 |
| 2016/0099982 A1* | 4/2016 | Driediger .......... G06F 17/30867 463/20 |

OTHER PUBLICATIONS

Non-Final Office Action (U.S. Appl. No. 14/296,245); Notification Date: Mar. 6, 2017.

Non-Final Office Action (U.S. Appl. No. 14/512,050); Notification Date: Mar. 27, 2017.

Final Office Action (U.S. Appl. No. 13/871,850); Notification Date: Feb. 1, 2016.

* cited by examiner

612

| Website Host ID (646) | Host Webpage (602) | Visual Design Elements (648) |
|---|---|---|
| 002 | Charity1.com | Text file 1, image files A, B, C |
| 005 | Charity2.com | Text file 2, image files E, F |
| 112 | Company1.com | Text file 20, image files Z, Y |

| User ID (638) | Authentication Information (640) | No. of Skill-Based Games Played | No. Wins | No. Losses |
|---|---|---|---|---|
| 101 | Username 1, password 1 | 2 | 2 | 0 |
| 102 | Username 2, Password 2 | 10 | 3 | 7 |
| 203 | Username 103, Password 103 | 5 | 5 | 0 |

(642 spans the last three columns)

FIG. 35

| Game ID | Game Title | Game File | Difficulty | Auction Item Value |
|---|---|---|---|---|
| 001 | Jumping Ball | Images; game algorithm; skill-input control | Easy | $100 to $200 |
| 002 | Shooter 1 | Images; game algorithm; skill-input control | Normal | $210 to $500 |
| 003 | Poker 1 | Images; game algorithm; skill-input control | Hard | $550 to $50,000 |

FIG. 36

| Auction Item ID | Item Description | Auction Value | Bid Unit Value |
|---|---|---|---|
| 001 | 2013 Automobile | $35,000 | $10 |
| 002 | Spa Package Voucher | $200 | $1 |
| 024 | $350 Casino Pay Card | $350 | $5 |

FIG. 37

NETWORKED COMPUTER SYSTEM AND COMPUTER IMPLEMENTED METHODS FOR PROVIDING AN ONLINE AUCTION WEBPAGE WITH SKILL-BASED GAME

CROSS-REFERENCE TO RELATED APPLICATIONS

This application is a continuation-in-part of U.S. patent application Ser. No. 14/512,050, filed Oct. 10, 2014, which is a continuation-in-part of U.S. patent application Ser. No. 14/296,245, filed Jun. 4, 2014, which is a continuation-in-part of U.S. patent application Ser. No. 13/871,850, filed Apr. 26, 2013, which claims the benefit of U.S. Provisional Application No. 61/639,666, filed Apr. 27, 2012, and claims the benefit of U.S. Provisional Application No. 62/101,725, filed Jan. 9, 2015, the disclosures of which are incorporated herein by reference in their entirety for all purposes.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

U.S. Patent Classification Primary Class: 707 (DATA PROCESSING: DATABASE, DATA MINING, AND FILE MANAGEMENT OR DATA STRUCTURES).

The subject matter disclosed herein relates generally to networked computer systems for providing webpages and more particularly, to networked computer systems and computer implemented methods for providing online auctions websites with a game of skill element wherein the bid may be placed in the auction after a successful completion of a game of skill, or where an individual's performance in a game of skill provides a bidding advantage to that individual.

BACKGROUND OF THE INVENTION

Online auctions delivered to users via the World Wide Web have become a popular activity for users interested in purchasing goods and services at the least possible amount online. Many online auctions allow a person to bid on an item in an attempt to obtain a winning bid and an associated opportunity to purchase the auction item at the winning bid price. Known online auction websites allow several users to compete with other online auction participants by submitting bids on a particular item until a predefined period of time has elapsed, and the highest bidder is determined.

At least some known online auction websites require users to purchase a bid unit that represents an opportunity to submit a bid in an auction and to redeem a bid unit each time the user places a bid on an auction item. Once the user has redeemed all of the bid units, the user cannot participate in the auction until additional bid units are purchased or provided. By requiring a user to purchase bid units to participate in the auction the online auction receives revenue from each user participating in the auction.

Many auction participants are attracted by the opportunity to win new auction items of high value at a low price, but may become frustrated with a requirement to purchase new bid units each time a user wishes to place a bid on an auction item. Auction participants may also become frustrated by purchasing bid units, participating in the auction, and not winning an auction. Likewise, online auction providers desire new auctioning opportunities to appeal to their auction participants, entice users to place additional bids, spend more time in the auction website, and have additional opportunities to benefit from winning new auctions. Accordingly, there is a continued need for systems and methods that create, provide, and facilitate new and interesting online auctions that are fair to each customer.

Some online auction formats, such as the penny auction, also known as a click to bid auctions have been known to be subject to fraud, cheating, and abuse by both customers and auction operators. The two most common forms of cheating are known as "shill" bidders and "bot" bidders. A "shill" bidder is used by an auction operator to artificially inflate the price of the auction while increasing the amount of the customer bids by having employees of the auction operator pose as bidders and bid against the real customers. A "bot" bidder accomplishes the same result, however the false bidding is accomplished by software code, or script, which poses as a real person competitively bidding in the auction. The reputation of the penny auction industry has been severely damaged by the use of shill and bot bidders. The reputation of fraud in the industry has been so damaging that many people refuse to participate in a penny auction for fear of being cheated out of their money.

Another detractor to acquiring new customers and retaining existing penny auction customers is the potential for any customer to be out bid by a well-financed competitor customer, thereby winning most auctions. For example, a customer who has the personal financial ability to purchase ten times the bids of a lesser well-financed customer is at a distinct and nearly insurmountable advantage. The better financed customer could simply keep bidding in an auction against the lesser financed customer until he or she runs out of bids and is unable to purchase more bids to remain competing in the auction. This appearance that penny auctions unfairly provide advantage to well-funded customers is known to prevent many new potential customers from trying the product for a first time, thereby severely limiting the potential growth of a penny auction business.

The present invention is aimed at one or more of the problems identified above.

SUMMARY OF THE INVENTION

The invention is generally directed to networked computer systems and computer implemented methods for generating and providing online auction webpages to users.

In one aspect of the invention, a networked computer system for providing a webpage to a user via the World Wide Web is provided. The system includes a database and a computer server that includes a processor that is coupled to a memory device. The database includes a webpage list including a plurality of host webpage data records and an auction list including a plurality of auction items. Each host webpage data record includes a host webpage identifier associated with a host webpage and visual webpage design elements associated with the corresponding host webpage. The computer server processor is programmed to receive from a web browser of a user computing device a participation request including a signal indicating activation of an auction webpage link being displayed in a host webpage. The signal includes a host webpage identifier. The processor is programmed to access the database, determine a host webpage data record associated with the received host webpage identifier, and retrieve the visual webpage design elements included with the determined host webpage data record. The processor is also programmed to display an online auction including generating and displaying an auction webpage on the user computing device via the web browser. The auction webpage includes the retrieved visual webpage design elements associated with the host webpage and a plurality of auction items. The processor receives from the web browser a signal indicating a bid request from the user including a selected auction item and a bid unit, generates and displays a skill-based game to the user via the user computing device in response to the received bid request, receives a skill input from the user and determines an outcome of the skill-based game as a function of the received skill input, and generates a bid associated with the received bid request if the outcome of the skill-based game is a winning outcome.

In another aspect of the invention, a computer implemented method of operating a networked computer system to provide a webpage to a user is provided. The networked computer system includes a database and a computer server including a processor and a memory device. The method includes the steps of the processor receiving from a web browser of a user computing device a participation request including a signal indicating activation of an auction webpage link being displayed in a host webpage and accessing the database including a webpage list including a plurality of host webpage data records and an auction list including a plurality of auction items. Each host webpage data record including a host webpage identifier associated with a host webpage and visual webpage design elements associated with the corresponding host webpage. The processor determines a host webpage data record associated with a received host webpage identifier, retrieves the visual webpage design elements included with the determined host webpage data record, and displays an online auction including generating and displaying an auction webpage on the user computing device via the web browser. The auction webpage includes the retrieved visual webpage design elements associated with the host webpage and a plurality of auction items. The processor receives from the web browser a signal indicating a bid request from the user including a selected auction item and a bid unit, generates and displays a skill-based game to the user via the user computing device in response to the received bid request, receives a skill input from the user, determines an outcome of the skill-based game as a function of the received skill input, and generates a bid associated with the received bid request if the outcome of the skill-based game is a winning outcome.

In yet another aspect of the invention, one or more non-transitory computer-readable storage media, having computer-executable instructions embodied thereon, is provided. The computer-executable instructions, when executed by at least one processor, cause the processor to receive from a web browser of a user computing device a participation request including a signal indicating activation of an auction webpage link being displayed in a host webpage and access a database including a webpage list including a plurality of host webpage data records and an auction list including a plurality of auction items. Each host webpage data record includes a host webpage identifier associated with a host webpage and visual webpage design elements associated with the corresponding host webpage. The processor determines a host webpage data record associated with a received host webpage identifier, retrieves the visual webpage design elements included with the determined host webpage data record, and displays an online auction including generating and displaying an auction webpage on the user computing device via the web browser. The auction webpage includes the retrieved visual webpage design elements associated with the host webpage and a plurality of auction items. The processor receives from the web browser a signal indicating a bid request from the user including a selected auction item and a bid unit, generates and displays a skill-based game to the user via the user computing device in response to the received bid request, receives a skill input from the user and determines an outcome of the skill-based game as a function of the received skill input, and generates a bid associated with the received bid request if the outcome of the skill-based game is a winning outcome.

BRIEF DESCRIPTION OF THE DRAWINGS

Other advantages of the invention will be readily appreciated as the same becomes better understood by reference to the following detailed description when considered in connection with the accompanying drawings wherein:

FIGS. 34-37 are illustrations of exemplary database records generated by the system of FIGS. 1, 13, 17-21, 29, and 30, according to an embodiment of the present invention.

Corresponding reference characters indicate corresponding parts throughout the drawings.

DETAILED DESCRIPTION OF THE PREFERRED EMBODIMENT

Figure 1:
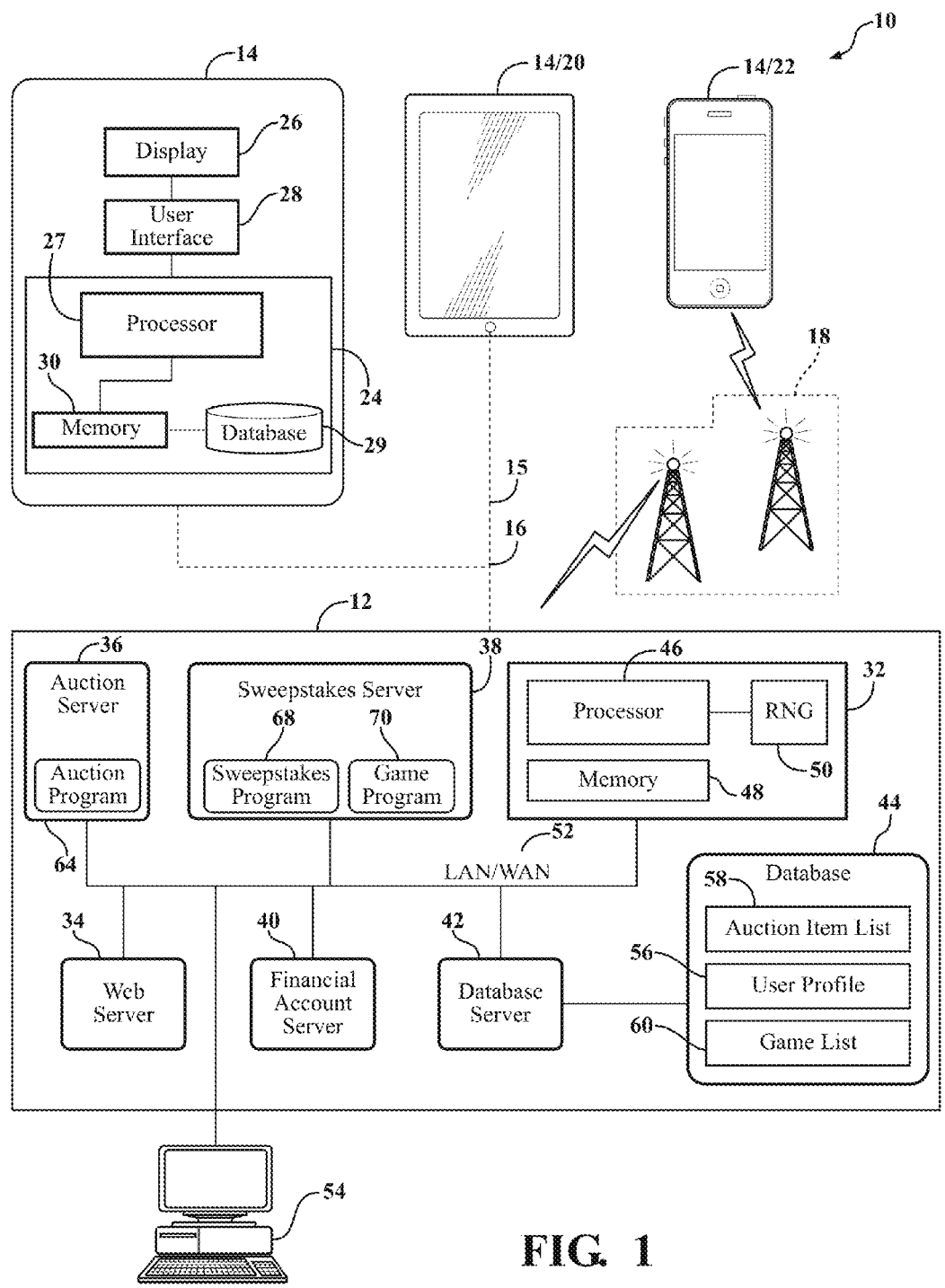
FIG. 1 is a schematic representation of an exemplary system, according to an embodiment of the present invention.

With reference to the drawings and in operation, the invention overcomes at least some of the disadvantages of known auction systems by providing, among other things, a networked computer system that generates an online auction webpage that is visually similar to a $3^{rd}$ party host webpage to enable the system to display an online auction to the user such that the user perceives that the online auction is being provided by the $3^{rd}$ party host webpage. In addition, the system provides the online auction including a skill-based game that is used to processes bid requests being received by users via the website. For example, the computer networked system generates and displays a skill based game to the player and allows the user to play the skill-based game to participate in the auction bidding process.

The system also provides the introduction of a skill based game directly into the bidding process, and whereby the successful negotiation of a skill game, or achievement of a pre-defined score as a pre-qualifier for a bid placement will eliminate the use of shill bidders, bot bidders, and will remove any advantage of personal finance from the auction bidding process. Because all customers would have to successfully negotiate the game, or achieve a pre-defined score for a bid to be deemed bona fide, the aforementioned deficiencies in the penny auction model are resolved. Further, the unsuccessful negotiating of a skill game, or failure to meet a pre-defined score would result in no bid being placed by that customer and therefore no bid being deducted from their account. Meaning, there was no cost for that customer associated with that bid attempt. These features are a departure from traditional known penny auctions which charges customers for every bid and are an improvement over known penny auction models.

Penny auctions, where the customer pays for bids or "bid options", prior to the auction and then participate in one or more auctions is a legal form of auctioneering for the operator and for purchasing online products at this time. Because of the competitive nature of a penny auction and the possibility of winning high value items for a fraction of their retail cost, at some time in the future legal authorities could deem to view a penny auction model as a "game of chance" and therefore a form of a contest, raffle, or lottery. Contests, raffles, and lotteries, are recognized in many jurisdictions as a form of gambling which requires regulation. If legal jurisdictions chose to recognize penny auctions as a game of chance, therefore a form of regulated gambling, this would severely limit the number of penny auction operators and place severe legal and financial burdens on new and existing penny auction operators. Also, due to the vast differences in the legal definitions, regulations, and rules, of games of chance, customers could be placed into legal jeopardy based on where they are geographically located when they participate. Because skill based games are extremely common and are legal in most US jurisdictions, adding a skill-based game element directly into the auction bidding process resolves the threat that a successful and profitable penny auction enterprise may have to close business because of an unfavorable legal definition or decision in the future.

In addition, the system is configured to conduct an online auction and display a wagering game to a player and awards the player bid units for use in the online auction based on wagers made by the player with the wagering game. In addition, the system awards the player gaming credits as a function of the game outcome and provides bid units if the player places another wager using the awarded wagering credits. By providing a system that provides a wagering game and provides bid units based on wagers being placed by the player on the wagering game, the amount of time a player players the wagering game is increased, thus increasing the amount of revenue received from the wagering game.

In one embodiment, the system provides a wide area progressive auction. The advent of open communication networks, such as the Internet, has led to a proliferation of online casinos, bringing online gaming within the reach of anyone with access to the World Wide Web. Online progressive jackpot wagering systems have evolved further to a point where competing online casinos are linked to a common progressive jackpot. Access to these types of progressive jackpot wagering systems is provided through the participating casino web sites and Jackpot portals on the World Wide Web. The aggregation of the shared pool progressive jackpot leads to the creation of larger and more attractive jackpots. In so doing, it is hoped to keep players motivated and therefore willing to re-commit winnings as well as improve sales, retain customers and attract new customers.

Wide area progressive gaming systems permit the player to play individual gaming machines or games on individual gaming web sites as discussed above. To add to the excitement of play, the individual gaming machines and/or gaming web sites, are linked together to allow players to compete for an additional, higher value, common award known as a "progressive jackpot". The progressive jackpot award can amount to a substantial amount of money as well as expensive items such as cars and luxurious vacations.

The method described in this patent applies to a shared progressive auction format which, at the surface, works similarly to a shared progressive jackpot, however, it contains several unique features not offered and not available in a progressive gambling jackpot scenario.

The system is a network of interconnected, yet independent, online penny auction businesses or operators. The independent auction sites sell bids to allow customers to participate in penny auctions on their own auction site, and/or at a central or shared auction site. At least a part of the purchase amount of each bid is contributed to at least one pooled account. All contributions accumulate in the at least one pooled account as a "Shared Auction Pool" account.

The at least one "Shared Auction Pool" account with accumulating pooled contributions, is used to set the budget for and pay for at least one product of high value that is auctioned jointly on all auction sites, and/or independently, on a central or shared auction site. Because the pooled funds are always sufficient to pay the manufacturer or vendor for the higher value product, the financial risk of not being able to buy and deliver the high value product is removed. The accumulating pooled contributions of revenue from the at least one independent auction site allows each independent auction site to offer the much higher value "shared" auction product on each of their independent sites without financial risk if the auction is won by one of their customers on their site. The method and system allows each networked penny auction business to offer more expensive products for auction while allowing each individual penny auction business to maintain their own brand, customer base, individual marketing strategy, financial integrity, and corporate governance.

The method and system is progressive in that if any particular "shared auction product" is not won in an auction, or is won but not paid for by the customer, then the Shared Auction Pool continues to accumulate. Alternatively, the at least one "Shared Auction Pool" account can be funded by at least part of a physical or on line wager. Alternatively, the at least one "Shared Auction Pool" account can be funded by at least one casino's promotional funds, marketing funds, and/or rewards points funds. Alternatively, the at least one "Shared Auction Pool" account can be funded by at least part of a donation to a charity. Alternatively, the at least one "Shared Auction Pool" account can be funded by at least a part of the purchase price for a product or service. Alternatively, the at least one "Shared Auction Pool" can have a base value feature where the at least one networked pool contributors fund the at least one "Shared Auction Pool" account to a set "base" amount. Alternatively, the method and system may contain at least one "Reserve Account" which is funded by the at least one networked pool contributors, or by the at least one "Shared Auction Pool" account.

The purpose of the at least one Reserve Account is to immediately provide an alternate budget and funding account if and/or when the at least one "Shared Auction Pool" account funds have been consumed. In effect, the at least one Reserve Account will become the de facto "Shared Auction Pool" account and a new Reserve Account will be established.

For online gaming, other than providing free play or rewards points, there are few promotions to entice customers to spend money at one casino versus another.

In addition, the system provides gambling games with an RNG. When the player's money is spent/wagered then bids are awarded. In one embodiment, the system provides the following steps: Customer logs in to online casino and customer loads money into their wallet or uses money already in their wallet. When customer transfers money from wallet to a game, the system awards the player free bids into a penny auction. If the customer wins money in the gambling game and re-wagers that money, they are awarded free bids into a penny auction. At any time customer may use the bids that they have acquired to place bids in any of the auctions. The customer may also buy bids.

In another embodiment, the system allows the customer to log in to an online casino. The customer loads money into their wallet or uses money already in their wallet. When customer transfers money from wallet to buy bids, they are awarded points which they use to play the casino games. The points in the games are used as chips or money. If the customer wins money in the gambling game and re-wagers that money, they are awarded free bids into a penny auction. At any time customer may use the bids that they have acquired to place bids in any of the auctions. In addition, game wins can award bids as well as money.

The system also enables a user to purchase one or more bid packets for use in an auction, provide the user with entries into a sweepstakes based on an amount of purchased bid packets, alternative method of entry, or product purchase, and enable the user to reveal the results of the sweepstakes entries via one or more simulated casino-type or amusement games. For example, the system and methods of the invention are configured to display a listing including a plurality of auction items available for bid, receive a bid unit purchase request from a user and responsively generating at least one initial bid unit for bidding on one or more auction items displayed in the auction, distribute at least one sweepstakes entry into a sweepstakes event to the user in response to the received purchase request, provide a sweepstakes award to the user as a function of the at least one sweepstakes entry, and, allow the user to purchase at least one addition bid unit with at least a portion of the sweepstakes award. By providing a plurality of sweepstakes entries to the user based on the purchase of bid packets for use in an auction and allowing the user to use the sweepstakes award to purchase additional bid packets, the amount of time a user spends bidding on auction items is increased, thus increasing the amount of bids received for the auction items and increasing the amount of revenue received from the auction. It should be understood that systems and methods of the invention may be configured to enable sweepstakes winnings to be applied to purchase products or services, redeem as cash or something else of value or donate to a charitable cause.

The invention is generally directed to systems and methods for promoting and facilitating the sale of goods and/or services through the provision and play of sweepstakes type game wherein one or more entries to the sweepstakes type game are configured to be distributed without extra cost to buyers of the sale of the goods and/or services.

In some embodiments, the systems and methods involve one or more computing terminals, which may be thin client type terminals, personal computers, mobile devices or any other associated computing platform, all of which are connected to a central controller through a distributed or global computing network.

In some embodiments, the systems and methods involve the provision of a user interface on the associated platforms which enables a user to purchase a good and/or service through the transmission of necessary information to complete the purchase, receive confirmation of the purchase and receive a sweepstakes entry which may be in the form of a confirmation number, bar code, virtual point, or a virtual or physical ticket. The systems and methods of the invention are therefore configured to receive and process the purchase, and communicate to the user interface the confirmation of the purchase as well as facilitate the transmission and delivery of the sweepstakes entry. The system and methods of the invention may further provide the ability for users to obtain a sweepstakes entry by purchasing products, or by means of an alternative method of entry without purchasing goods or services, as may be necessary according to applicable laws.

In some embodiments, the outcome of the sweepstakes entry (that is, whether the entry indicates the entrant has won or lost) may be revealed via the user interface, whereas in other embodiments the outcome may only be revealed using a different platform. The user may be provided with an option to reveal the outcome of the sweepstakes entry immediately or through simulated gaming activity. The simulated gaming activity may be a game of chance, such as poker or slots game, which may allow for player interactions and appear to be randomly operating, but which has an outcome that is predetermined and corresponds with the sweepstakes entry outcome.

In some embodiments, the goods for sale include a voucher, which may be electronic or in a physical form with a computer readable feature, allowing a user to bid for items offered in an auction available through the user interface. Each bid voucher may have a set unit value for purchase by a user and a set unit value for bidding at an auction, which may differ from each other. When the bid voucher is submitted or transmitted for placing a bid at an auction the bidding value would then be incremented to the current bid according to the set unit value.

In an exemplary embodiment, the invention is directed to a system and method which includes hardware and software for providing a central server based electronic sweepstakes application as a promotional tool to an on-line "penny auction" web site which is also server based. The on-line penny auction is a web-based auction for consumer goods where multiple computer users compete to purchase a product by placing on-line bids. The bids may typically increase by 1 cent per bid. Packages of individual bidding units may be sold in bid packages for any predetermined amount of money, such as for example, an amount of money between 60 cents and 1 dollar per bid. In this embodiment, bid units are electronic options to enter a bid on a product or service offered at auction.

For example, in one embodiment, each bid unit may be purchase of $1. If a product auction is started at 1 cent, and if each bid increases the price by 1 cent, and the ending auction price is $100.01, then a total of 10,000 bids units were entered—which is $10,000 worth of bids. The auction company would make that $10,000 plus the $100 which is paid for the product, minus the cost of the product. In some embodiments, participants in the auction can opt to purchase the product at full price.

In this embodiment, each purchase of a single bid unit would also entitle the purchaser to a single sweepstakes entry. The sweepstakes in this example uses a finite pool math model to award cash prizes to sweepstakes entrants who have winning entries. The visual simulation may be a presentation which appears like video poker or video slots. The amount in the sweepstakes won, if any, is predetermined from a finite pool. The video presentation which resembles a gambling style game is therefore merely an entertaining way, for amusement purposes, of revealing the outcome of the entries. The sweepstakes is a method of promoting the auction business of the example, among other things.

Figure 2:
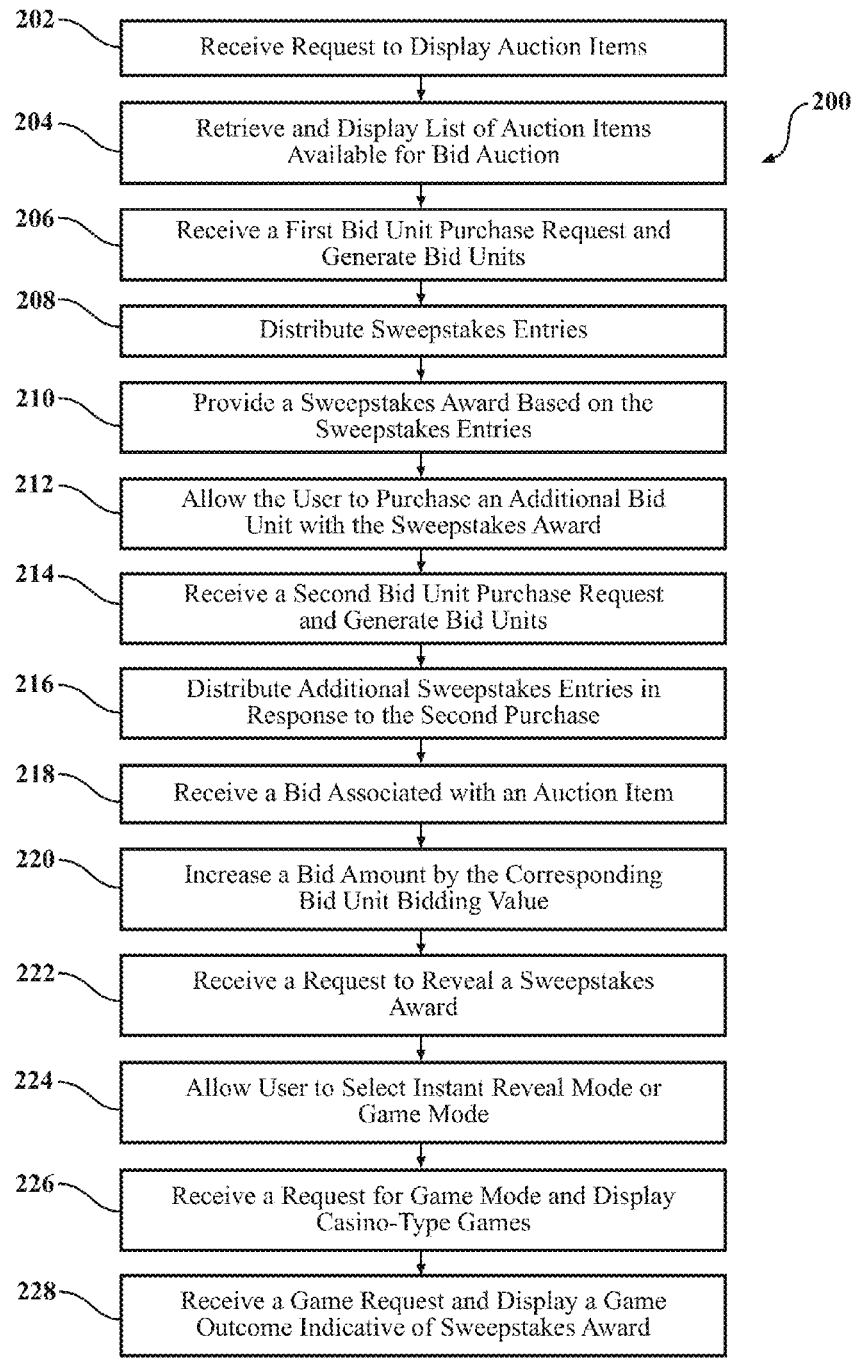
FIG. 2 is a flowchart of a method that may be used with the system shown in FIG. 1 for allowing a user to participate in a auction via a user computing device, according to an embodiment of the present invention.
Figure 3:
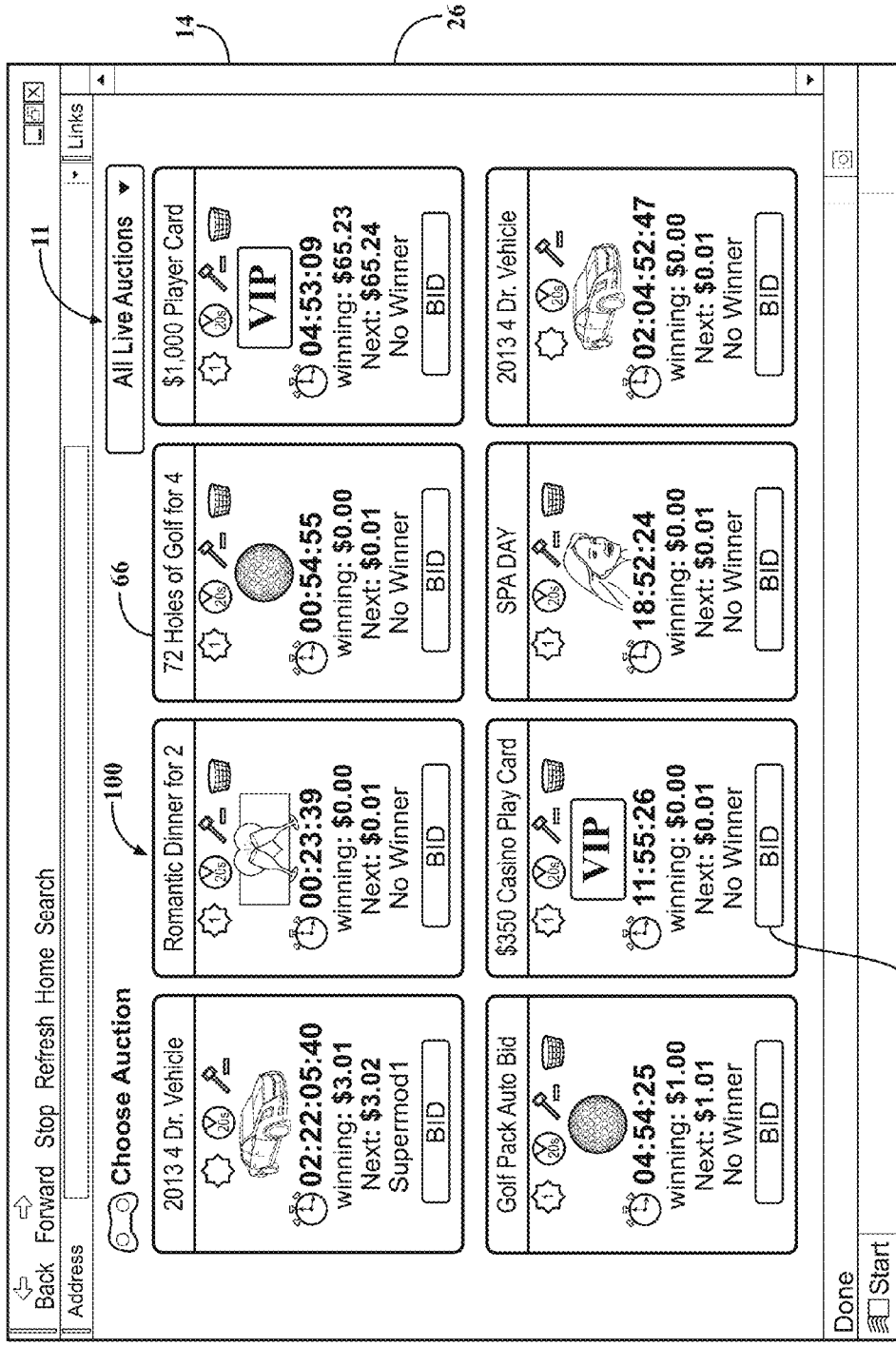
FIG. 3 is a graphical display of an online auction that may be used with the method shown in FIG. 2, according to an embodiment of the present invention.
Figure 4:
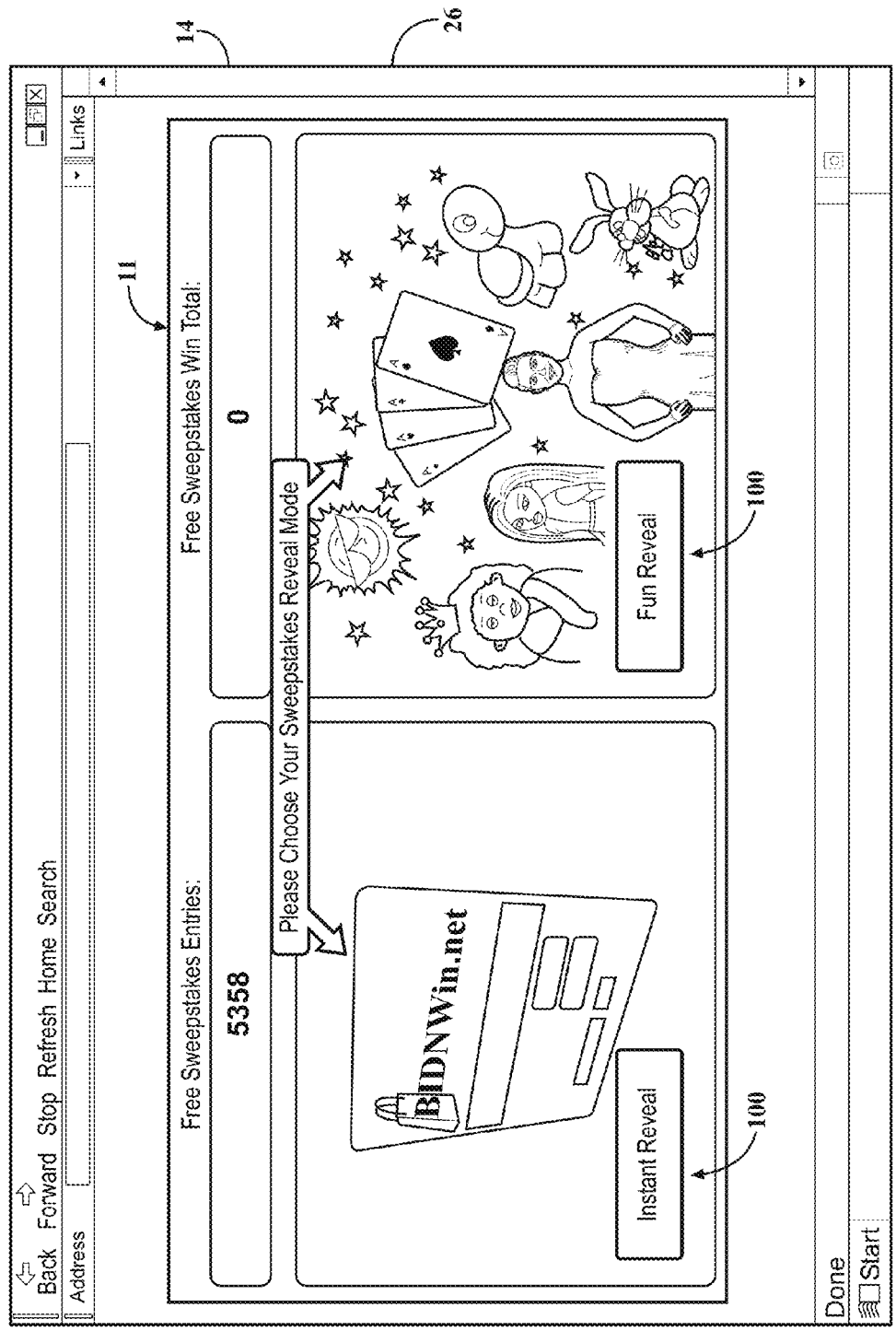
FIG. 4 is a graphical display of a sweepstake award selection screen, according to an embodiment of the present invention.
Figure 5:
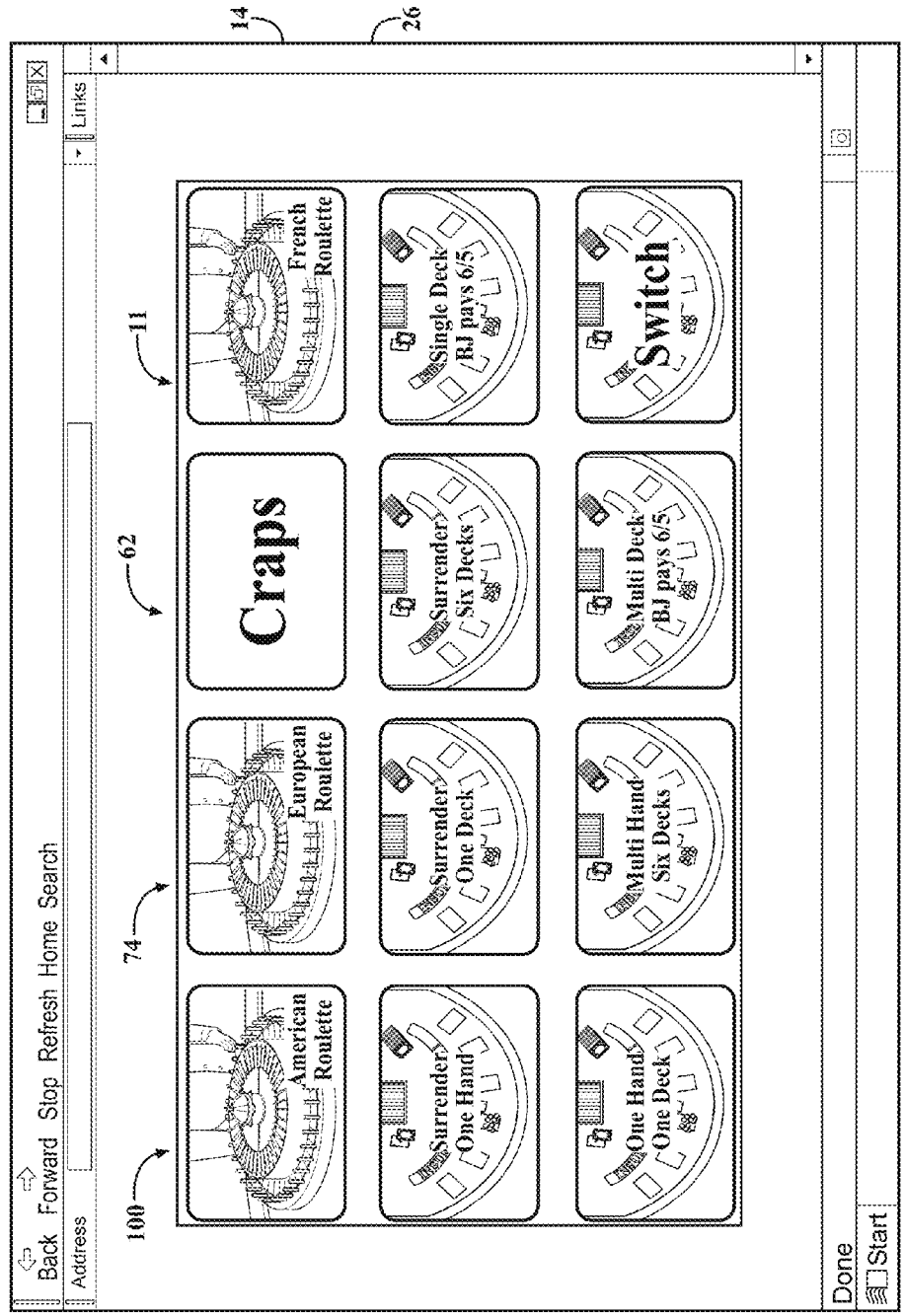
FIG. 5 is an exemplary entertaining graphical display of a simulated casino-type game selection screen, according to an embodiment of the present invention.
Figure 6:
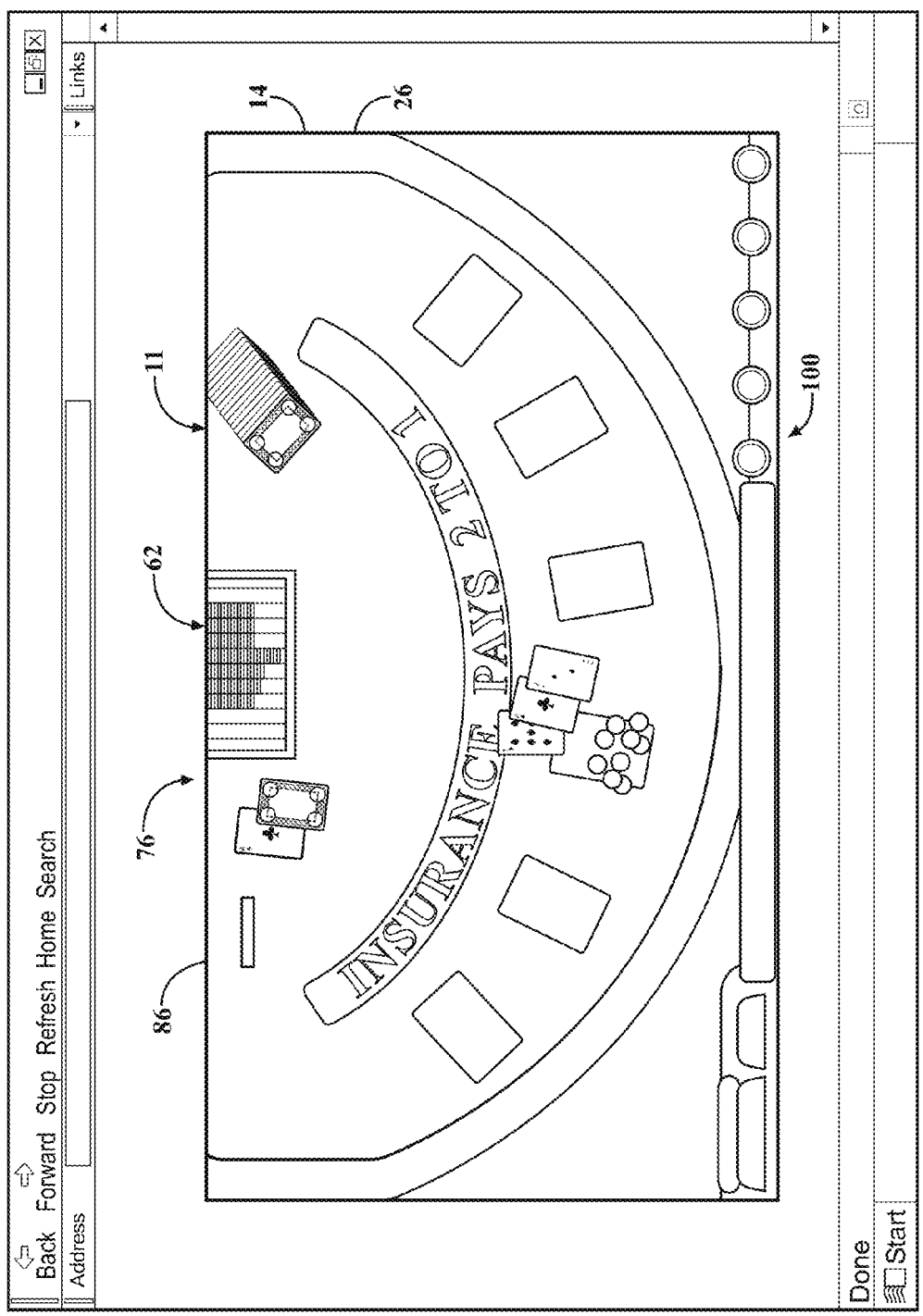
FIG. 6 is an exemplary entertaining graphical display for amusement purposes of a simulated video blackjack game that may be used with the method shown in FIG. 2, according to an embodiment of the present invention.
Figure 7:
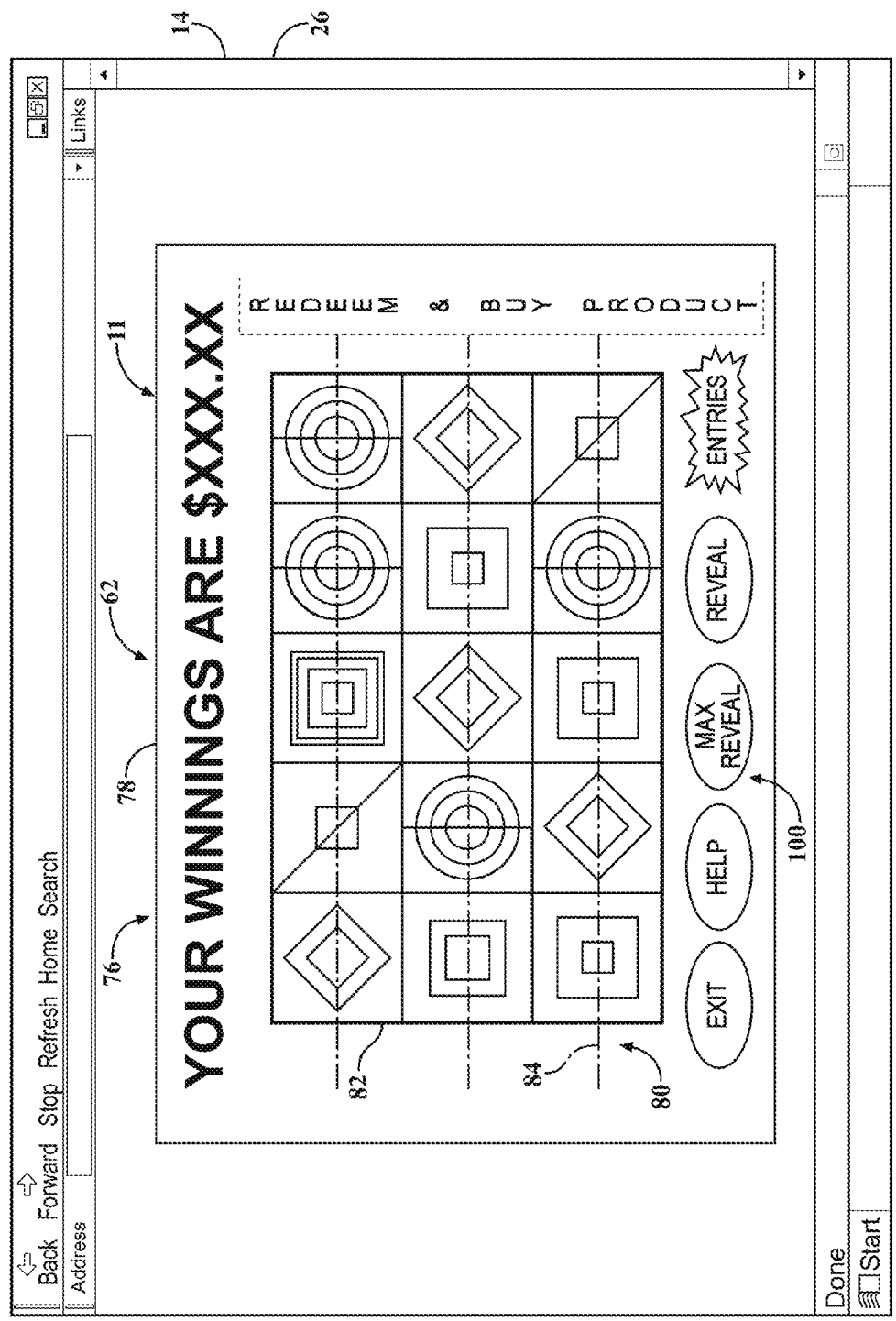
FIG. 7 is an exemplary entertaining graphical display for amusement purposes of a simulated video slot game that may be used with the method shown in FIG. 2, according to an embodiment of the present invention.

In an embodiment shown in FIGS. 1-8, a sweepstakes is combined with an on-line auction web site to form a system and method of the invention. In one example, when a purchase of a "bid package" is made, the customer is automatically awarded with "free" sweepstakes entries, which may include 100 entries per dollar spent. The entries and winnings are stored in their on-line account maintained in memory. At any time, the customer can click on a "reveal entries" button which will open a new browser window and the sweepstakes game web application. The user will have an instant reveal option, or a multitude of simulated games which they could use to reveal their results. The simulated games can be based on any game, and may be simulated casino or non-casino style games, wherein the outcome is predetermined and the simulation is for entertainment and/or amusement purposes. When a customer wins, they can convert their winnings into cash credits which are usable to purchase products on the auction site, purchase bid units, redeem for case or something of value or donate to charity. FIG. 2 provides a flow chart to illustrate the features and functionality of the method of this embodiment, which include the ability to create an account, purchase and receive bid options, receive sweepstakes entry, engage in an online auction, and determine the outcome of the sweepstakes entry, among other things. As shown in FIG. 4, users may opt to select "Instant Reveal" or some other selectable option to cause the system to determine and/or reveal the outcome of the sweepstakes immediately, which may be provided through a screen such as the screen shown in FIG. 8. Alternatively, as shown in FIGS. 3-7, users may select a simulated game for entertaining amusement purposes to reveal the outcome of the sweepstakes entry. In this embodiment, there are a plurality of casino-type games (shown in FIGS. 3-7) that are available to the user. As discussed herein, the games are simulated in that they may involve player interaction or appear to involve player decision making and appear to provide randomly generated results, but the result is the same predetermined outcome of the sweepstakes entry that would be communicated if "Instant Reveal" now had been selected. FIG. 7 illustrates an exemplary screen in which the simulated game selected resembles a slot machine with multiple reels, including providing the user with the option to apply multiple sweepstakes entries. For example, if multiple sweepstakes entries are revealed using this simulation, the reels would stop yielding an outcome and award equal to the cumulative award of the sweepstakes entries. FIG. 6 illustrates an exemplary screen in which the simulated game selected resembles a blackjack-type game.

In some embodiments, the winnings or awards may be converted into a variety of forms, physical or electronic, such as cash, products, services, credits which may be applied towards purchases of items at auction or for items offered by retailers on the same site or other sites, credits towards the play of a wagering game, or additional bid options or packages, among other things.

A selected embodiment of the invention will now be explained with reference to the drawings. It will be apparent to those skilled in the art from this disclosure that the following description of the embodiment of the invention is provided for illustration only and not for the purpose of limiting the invention as defined by the appended claims and their equivalents.

FIG. 1 is a schematic representation of the system 10, according to an embodiment of the invention. In the illustrated embodiment, the system 10 includes a server system 12 that is coupled to one or more user computing devices 14. Each user computing device 14 is configured to transmit and receive data to and/or from the server system 12 to display graphical interfaces 11 (shown in FIGS. 3-8) to enable a user to participate in an auction via the user computing device 14. In the illustrated embodiment, the server system 12 is coupled to each user computing device 14 via a communications link 15 that enables each user computing device 14 to access server system 12 over a network 16, such as the Internet, a cellular network 18, a wireless network and/or any suitable telecommunication network that enables the user computing devices 14 to access the server system 12. For example, in one embodiment, the user computing device 14 includes a mobile computing device 20, e.g., a smartphone 22 that communicates with the server system 12 via the cellular telecommunications network 18 and/or the Internet. In another embodiment, the user computing device 14 may include a personal computer, laptop, cell phone, tablet computer, smartphone/tablet computer hybrid, personal data assistant, a kiosk, and/or any suitable computing device that enables a user to connect to the server system 12 and display the graphical interfaces 11.

In the illustrated embodiment, each user computing device 14 includes a controller 24 that is coupled to a display device 26 and a user input device 28. The display device 26 includes, without limitation, a flat panel display, such as a cathode ray tube display (CRT), a liquid crystal display (LCD), a light-emitting diode display (LED), active-matrix organic light-emitting diode (AMOLED), a plasma display, and/or any suitable visual output device capable of displaying graphical data and/or text to a user. Moreover, the user input device 28 includes, without limitation, a keyboard, a keypad, a touch-sensitive screen, a gesture sensing device, a scroll wheel, a pointing device, a barcode reader, a magnetic card reader, a radio frequency identification (RFID) card reader, an audio input device employing speech-recognition software, and/or any suitable device that enables a user to input data into the controller 24 and/or to retrieve data from the controller 24. Alternatively, a single component, such as a touch screen, a capacitive touch screen, and/or a touchless screen, may function as both the display device 26 and as the user input device 28.

In the illustrated embodiment, the controller 24 includes a processor 27, a database 29, and a memory device 30 that is coupled to the processor 27 and the database 29. The memory device 30 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the processor 27 to store, retrieve, and/or execute instructions and/or data. The processor 27 executes various programs, and thereby controls other components of the controller 24 and the user computing device 14 according to user instructions and data accepted by the user input device 28. The processor 27 in particular displays the graphical interface 11 (shown in FIGS. 3-8), and thereby enables the system 10 to generate auction items and allow the user to place bids associated with the auction items in response to user instructions received via the user computing devices 14 in accordance with the embodiments described herein. The memory device 30 stores programs and databases used by the processor 27. Moreover, the memory device 30 stores and retrieves information in the database 29 including, but not limited to, image data for producing images and/or screens on the display device 26, and temporarily stores variables, parameters, and the like that are used by the processor 27.

In the illustrated embodiment, the server system 12 includes a system controller 32, a web server 34, an auction server 36, a sweepstakes server 38, a financial account server 40, a database server 42, and a database 44. Moreover, the system controller 32 includes a processor 46, a memory device 48, and a random number generator 50, and communicates with each user computing device 14 to enable the user to access the server system 12. The system controller 32 is connected to the servers, and the database 44 through a network 52 such as, for example, a local area network (LAN), a wide area network (WAN), dial-in-connections, cable modems, wireless modems, and/or special high-speed Integrated Services Digital Network (ISDN) lines. Moreover, at least one administrator workstation 54 is also coupled to the network 52 to enable communication with the server system 12. Alternatively, the workstation 54 may be coupled to the network 52 using an Internet link or may be coupled through an intranet.

The web server 34 communicates with the user computing devices 14 to facilitate transmitting data over the network 16 via the Internet and/or the cellular network 18, respectively.

The database server 42 is connected to the database 44 that contains information on a variety of matters, such as, for example, account information related to a user, user profile information, sweepstakes event information and/or auction event information. In one embodiment, the database 44 includes a centralized database that is stored on server system 12 and is accessed directly via the user computing devices 14. In an alternative embodiment, the database 44 is stored remotely from the server system 12 and may be non-centralized. In the illustrated embodiment, the database 44 includes a user profile program 56 that includes a plurality of user profile accounts and a plurality of corresponding unique user identifiers. For example, in one embodiment, the unique user identifier may include a combination of a username and password. Alternatively, in another embodiment, the unique user identifier may include a personal identification number, or a random identification number assigned to a corresponding user account. In the illustrated embodiment, the system 10 uses the unique user identifier to identify the user and provide access to the server system 12 via a user computing device 14 associated with the unique user identifier. For example, in one embodiment, the unique user identifier may include a mobile device identifier, such as, for example, a cellular phone number and/or wireless internet address for identifying a user computing device 14 associated with a user account.

In one embodiment, the server system 12 may communicate with a player tracking system (not shown) available at a gaming establishment, e.g., a casino. The player tracking system may include a player status associated with the user, e.g., a player ranking, based on the player account information such as, for example, a frequency in which the player plays a game at the associated casino, the average wager the player makes per play of a game, a total amount wagered by the player over a predefined period of time, and/or any other suitable player tracking information. The user profile program 56 may include data that is provided to the player tracking system to identify the user at the casino to enable the user to redeem sweepstakes awards at the casino with the associated user profile account. Moreover, a player may also receive awards from the casino for play at the casino, which may be transmitting from the player tracking system to the server system 12 for use in purchasing bid units, bid packets, auction items, store items, and/or any suitable use that enables the system 10 to function as described herein. It should be understood that server system 12 may communicate with any third party platform in addition to gaming establishments in order to advantageously transfer winnings for use therein in marketing, promotions or point-of-service transactions involving goods and services.

Each user profile account includes personal identification information such as, for example, a user name, address, personal identification number, date of birth, email address, mobile phone number, and/or any suitable information that enables the system 10 to function as described herein. In one embodiment, the user profile account may include a collection of user-defined categories that are indicative of preferred auction items. For example, in one embodiment, the user profile account may include a list of preferred auction item categories such as, for example, goods, service, travel, vehicles, sporting events, bid pricing, bid period, and/or any suitable auction event category identified by the associated user.

In the illustrated embodiment, the database 44 also includes an auction item list 58 and a game list 60. The auction item list 58 includes information related to a collection of auction items that are available for bid in an auction event. The game list 60 includes data related to a collection of simulated casino-type games 62 (shown in FIGS. 5-7) that are available to use in revealing a sweepstakes award to the user. The simulated casino-type games may include, but are not limited to, a video slot game, a keno game, a blackjack game, a video craps game, a video poker game, or any casino-type of game which allows a player to place a wager, play a game, and potentially provide the player an award.

In the illustrated embodiment, the auction server 36 includes an auction program 64 that includes a plurality of auction items 66 (shown in FIG. 3) that are available for display on the user computing devices 14. Moreover, the auction program 64 includes information associated with each auction item including, but not limited to, a description of the auction item, a category of the auction item, current bid price, a required next bid price, a bid period, a current bid time, and/or a user name associated with a current and/or winning bid. During operation, upon receiving a request from a user computing device 14, the system controller 32 retrieves information associated with each auction item 66 from the auction program 64 for display on the user computing device 14. For example, in one embodiment, the system controller 32 receives a request from a user computing device 14 to display available auction items 66. The system controller 32 transmits a request to the auction server 36 to receive a list of available auction items 66 for display on the user computing device 14. In addition, the system controller 32 receives a signal indicative of a user bid request from a user computing device 14 and transmits the bid request to the auction server 36 for use in updating the bid information associated with corresponding auction item 66.

In the illustrated embodiment, the auction server 36 conducts an on-line "penny auction", wherein a user may place a bid on a auction item 66 using bid units to increase the total bid price by the value of the bid unit. For example, in one embodiment, each bid unit includes a purchase value and a bidding value. The purchase value is associated with the purchase of the bid unit and is indicative of an amount of money needed to purchase the bid unit. The bidding value is associated with a bid on an auction item. In one embodiment, the bid unit purchase value may be equal to the bid unit bidding value. Alternatively, the bid unit purchase value may be less than, or greater than, the bidding unit value.

For example, in the illustrated embodiment, the bid unit includes a bid purchase value equal to $1 and a bidding value equal to $0.01. During the penny auction, a user may purchase a bid unit for $1, and place a bid on an auction item using the purchased bid unit to increase the total bid amount associated with the auction item by $0.01. For example, if the current bid total amount of an auction item is $100 and the user places a bid on the auction item, the total bid amount for the auction item is increased to $100.01.

In addition, for each auction item 66 available for bid, the auction server 36 determines a bid period, e.g., a period of time in which bids for the auction item 66 will be accepted, such that the auction server 36 will accept bids submitted by user during the bid period, and awards the auction item 66 to the last bid received at the end of the bid period. In one embodiment, the auction server 36 may establish a final bid period associated with an auction item 66. If a bid is received within the final bid period, the auction server 36 may increase the bid period by an additional predetermined period of time to enable additional bids to be received. For example, in one embodiment, the bid period for an auction item may be 2 hours and the final bid period may be the last 20 seconds of the bid period. If a bid is received within the last 20 seconds, the auction server 36 increases the bid period by an additional 20 seconds. If the auction server 36 does not receive any bids within the final bid period, the bidding for the associated auction item 66 is concluded, and the auction item 66 is made available to the final bidder for purchase at the final bid total. By extending the bid period, the excitement of the auction participants is enhanced and the amount of bids purchased and used is increased.

The financial account server 40 includes financial account information associated with each user profile account. More specifically, the financial server 40 includes a financial account, a bid account, and a sweepstakes account that are associated with each user profile account. The financial account includes data that is indicative of financial information associated with a user profile. The financial information may include, but is not limited to, available monetary funds for use in purchasing bid units, an available account balance, and/or any suitable financial information that enables the system 10 to function as described herein. The bid account includes information associated with each bid requested by the user including, but not limited to, a list of auction items bid on by the user, an amount of bid units available for use in an auction, a list of active auction bids, a list of winning bid items, and/or any suitable bid information that enables the system 10 to function as described herein. The sweepstakes account includes data that is indicative of a number of sweepstakes entries and/or a number of sweepstakes awards associated with the corresponding user profile. In addition, the sweepstakes account may include a list of sweepstakes awards provided to the user for use in redeeming the sweepstakes award at an associated casino property, retail or commercial enterprise.

During operation, the system controller 32 receives a user selection indicative of a bid request from a user computing device 14 including an auction item 66 associated with the bid request. The system controller 32 sends a verification message to the financial server 40 including a unique user identifier and an amount of bids associated with the bid request. The financial server 40 identifies the bid account associated with the unique user identifier and determines if sufficient bid units are available in the user bid account as a function of the bid request. If the financial server 40 determines sufficient bid units are available in the user bid account, the financial server 40 sends a verification message to the system controller 32 and deducts a corresponding amount of bid units from the user bid account. If the financial server 40 determines that the user bid account does not include a sufficient amount of bid units, the system controller 32 displays a message on the user computing device 14 requesting the user to purchase additional bid units corresponding to the bid request. In addition, the system controller 32 may display an amount of funds in the financial account that are available for use in purchasing additional bid units and/or display a number of sweepstakes entries and/or sweepstakes awards in the sweepstakes account that are available to be redeemed for additional bid units.

The sweepstakes server 38 includes a sweepstakes program 68 for conducting a sweepstakes and includes a plurality of sweepstakes entries and a plurality of sweepstakes awards associated with the entries. Each sweepstakes entry includes a unique sweepstakes identifier. In the illustrated embodiment, the sweepstakes program 68 uses a finite pool math model to award cash prizes to sweepstakes entrants who have winning entries. In one embodiment, the sweepstakes program 68 includes a predetermined number of sweepstakes entries, with each sweepstakes entry associated with a sweepstakes award. Each sweepstakes award may include, but is not limited to, a cash prize, a store credit prize, a merchandise prize, a monetary award, no award, goods, services, gaming credits for use at a casino-type gaming establishment, prizes, e.g., meals, show tickets, etc . . . , as well as bid packages, bid units, and/or any suitable award. In one embodiment, the sweepstakes awards may include additional sweepstakes entries, cash awards for use in purchasing addition bid units and/or purchasing auction items, gaming credits for use in casino-type games at an associated gaming establishment, e.g., a casino, and/or casino service credits for use in purchasing services offered at the casino. In addition, the sweepstakes program 68 may also includes various levels of awards such as, for example, a top level or "grand" prize, and a number of other prize levels, and/or a small number of grand prizes and a larger number of prizes at one or more lower prize levels.

In the illustrated embodiment, the sweepstakes server 38 distributes one or more sweepstakes entries to a user, determines a sweepstakes award associated with each distributed sweepstakes entries, and assigns each sweepstakes award to a corresponding user profile account. The RNG 50 generates and outputs random numbers to the sweepstakes server 38 to determine an outcome of the sweepstakes entries. For example, the sweepstakes server 38 uses the RNG 50 to randomly select a plurality of sweepstakes entries, and to associate an sweepstakes award with each selected sweepstakes entry. In one embodiment, the sweepstakes server 38 uses the RNG 50 to randomly select a predetermined number of sweepstakes entries to be provided to a user. In another embodiment, the sweepstakes server 38 uses the RNG 50 to assign sweepstakes entries from a pool of predetermined sweepstakes entries, with each entry being associated with a result in the sweepstakes game.

The sweepstakes server 38 also includes a game program 70 for use in displaying a sweepstakes award to an associated user. More specifically, the game program 70 is configured to operate in an instant reveal mode and a game mode based on a user's selection. In the instant reveal mode, the game program 70 determines the sweepstakes awards associated with each sweepstakes entry distributed to the player, and reveals the sweepstakes award in an instant reveal game 72 (shown in FIG. 8) that displays a total sweepstakes award received by the user from each of the sweepstakes entries. In game mode, the game program 70 displays a list 74 of simulated casino-type games 62 (shown in FIG. 5) from the game list 60 and enables the user to select one or more simulated casino-type games 62 for use in displaying each sweepstakes award associated with the user's sweepstakes entries.

During operation in game mode, the game program 70 determines a number of sweepstakes entries to reveal based on a user selection, and generates a corresponding number of gaming credits. The game program 70 allows the user to reveal one or more sweepstakes entries in the form of the outcome of the selected simulated casino-type game 62. The game program 70 generates an outcome 76 of the simulated casino-type game 62 and displays the generated outcome 76 to the user. The game outcome 76 is indicative of the sweepstakes award associated with the sweepstakes entries selected to be revealed by the user. For example, in one embodiment, the game program 70 displays a simulated video slot game 78 (shown in FIG. 7) based on a user selection. In the illustrated embodiment, the simulated video slot game 78 includes a plurality of slot reels 80, each slot reel 80 displaying a plurality of game symbols 82. The simulated video slot game 78 also includes a plurality of pay lines 84 to indicate, to the user, a combination of game symbols 82. The simulated video slot game 78 is generally played in a conventional manner. The user may increase or decrease the number of sweepstakes entries to reveal by selecting one or more pay lines 84. The game program 70 determines the sweepstakes award associated with the quantity of sweepstakes entries revealed and generates a game outcome associated with the sweepstakes award. The game program 70 spins the reels, and selectively stops the reels to display a predetermined pattern of game symbols 82 that is determined as a function of the selected pay line, a pay table, and the sweepstakes awards associated with the selected sweepstakes entries.

In another embodiment, the game program 70 displays a simulated video blackjack game 86 (shown in FIG. 6) for use in revealing the sweepstakes award to the user. The simulated blackjack game 86 is conducted in the convention manner. The game program 70 allows the user to wager one or more credits indicative of sweepstakes entries, distributes a hand of playing cards to the user and a hand of playing cards to the "dealer". The outcome of the simulated blackjack game 86 is determined as a function of the sweepstakes awards associated with the requested quantity of sweepstakes entries, and the game program 70 provides the player an award based on the predetermined outcome. Many variations to the above described general actuation of simulated casino-type games fall within the scope of the present invention.

In the illustrated embodiment, the workstation 54 includes a display and user input device to enable an administrative user to access the server system 12 to transmit data indicative of the auction events and/or auction items to the database server 42. This enables an administrative user to periodically update the auction items associated with auction events, available auction items, and/or any suitable data and information that enables the system 10 to function as described herein.

FIG. 2 is a flowchart of a method 200 that may be used with the system 10 for allowing a user to participate in an online auction via a user computing device 14. Portions of the method 200 may be performed by any one of, or any combination of, the server system 12 and/or the user computing devices 1. FIGS. 3-8 are entertaining graphical displays for amusement purposes that may be used with method 200. In the illustrated embodiment, entertaining graphical displays for amusement purposes are presented by the user computing device 14 via the display device 26 (shown in FIG. 1) and may receive input (e.g., selections and/or entries) via the user input device 28 (shown in FIG. 1). For example, in one embodiment, a selection may be received via user input device 28 of the user computing device 14 and may be transmitted by the user computing device 14 to the server system 12 via the network 16.

In the illustrated embodiment, the method 200 includes the step of receiving 202 a request to display information including an auction event from a user computing device 14. In one embodiment, the user may submit the request by accessing a website via web server 34. In another embodiment, the user may access a mobile website via the cellular network 18. In addition, in one embodiment, the method 200 may include receiving a unique user identifier to validate the request to display the auction event. More specifically, the system controller 32 may display a login screen (not shown) on the user computing device 14 to request the unique user identifier such as, for example requesting a username and/or password. The system controller 32 receives the unique user identifier and transmits a validation request including the user credentials to the database server 42. The database server 42 compares the received unique user identifier with the collection of unique user identifier contained in the user profile program 56 to validate the unique user identifier and responsively sends a validation message to the system controller 32 if the received unique user identifier is included in the user profile program 56. Upon receiving the validation message from the database server 42 the system controller 32 displays a listing of auction items. In addition, in one embodiment, if the received user identifier is not included in the user profile program 56, the system controller 32 may prompt the user to establish a user account and/or display the auction event without requiring the user to establish a user account and/or verify a user account.

In the illustrated embodiment, the method 200 includes the step of retrieving 204 an auction event list including a plurality of auction items 66 and displaying the list of auction items on the user computing device 14. In one embodiment, the system controller 32 transmits a user profile request to the database server 42 including the unique user identifier and retrieves the corresponding user profile account including a collection of user-defined categories indicative of preferred auction items from the database server 42. The system controller 32 determines the user profile account associated with the unique identifier, selects a plurality of auction items from the auction event list based on the user-defined categories, and displays the selected auction items on the user computing device 14.

In the illustrated embodiment, the system controller 32 displays a plurality of user selection areas 100 within the graphical interface 11 that correspond to specific operations that may be initiated by the user. For example, in the illustrated embodiment, the system controller 32 displays a plurality of auction items 66 and an associated "BID" selection area 102. Each of the areas may receive a user selection input via the user input device 28. In one embodiment, upon receiving a user selection input associated with the "BID" selection area 102, the system controller 32 increments the total bid amount associated with corresponding auction item by the bid unit bidding value, and deducts a bid unit from the total number of bid units associated with the user profile account.

In the illustrated embodiment, the method 200 includes the step of receiving 206 a first bid unit purchase request from a user and responsively generating at least one initial bid unit for use in bidding on one or more auction items 66 displayed in the auction. The method 200 also includes the steps of distributing 208 at least one sweepstakes entry into a sweepstakes event to the user in response to the received purchase request and providing 210 a sweepstakes award to the user determined as a function of the at least one sweepstakes entry. The method 200 also includes the step of allowing 212 the user to purchase at least one addition bid unit with at least a portion of the sweepstakes award.

In the illustrated embodiment, the method includes the steps of receiving 214 a second bid unit purchase request from the user to purchase at least one additional bid unit, responsively generating at least one additional bid unit for bidding on the one or more auction items, and distributing 216 one or more sweepstakes entries in response to the second bid unit purchase request. In one embodiment, the system controller 32 may distribute a number of sweepstakes entries to the user as a function of a number of initial bid units purchased by the user. For example, the system controller 32 may distribute a first number of sweepstakes entries to the user as a function of the first bid unit purchase request and distribute a second number of sweepstakes entries to the user as a function of the second bid unit purchase request. In one embodiment, the second number of sweepstakes entries is different than the first number of sweepstakes entries. In another embodiment, the second number of sweepstakes entries may be less than, greater than, or equal to the first number of sweepstakes entries.

In the illustrated embodiment, the method includes the steps of receiving 218 a bid associated with an auction item and responsively increasing 220 a bid amount associated with the auction item by the corresponding bid unit bidding value. In one embodiment, the system controller 32 may also establish a bid period associated with the auction item, determine a final bid received during the bid period, and award the auction item a user associated with the final bid. In another embodiment, the system controller 32 may establish a final bid period associated with the auction item, receive one or more bids associated with the auction item, determine if a bid is received within the final bid period, and responsively increase the bid period a predefined amount of time if a bid is received within the final bid period.

In the illustrated embodiment, the method 200 also includes the step of receiving 222 a request to reveal the sweepstakes award associated with the at least one sweepstakes entry, responsively determining the sweepstakes award, and allow 224 the user to select one of an instant reveal mode wherein the sweepstakes award is displayed to the user and a game mode wherein at least one game is displayed to the user, the outcome of the at least one game being indicative of the sweepstakes award. Upon receiving a request to reveal the sweepstakes award, the system controller 32 displays a graphical interface 11 (shown in FIG. 4) that includes an "instant reveal" selection area and a "fun reveal" selection area. The "instant reveal" selection is associated with the instant reveal mode and the "fun reveal" selection is associated with the game mode. In the illustrated embodiment, upon selection of the "instant reveal" selection area, the system controller 32 operates the game program 70 in the instant reveal mode, and upon selection of the "fun reveal" selection area, the system controller 32 operates the game program 70 in the game mode.

In the illustrated, the method 200 includes the steps of receiving 226 a request to reveal the sweepstakes award with the simulated game mode and responsively displaying a plurality of user-selectable simulated games 62, receiving 228 a game request indicative of one simulated game of the plurality of simulated games, and responsively displaying a simulated game outcome associated with the selected simulated game that is indicative of the sweepstakes award. In one embodiment, the method 200 may include the steps of allowing the user to allocate a portion of the sweepstakes entries over a plurality of games, displaying a first game (shown in FIG. 6) based on a received first game request, receiving a first sweepstakes entry allocation from the plurality of sweepstakes entries associated with the first game, and, responsively displaying an outcome of the first game that is indicative of a first portion of the sweepstakes award associated with the first sweepstakes entry allocation. In addition, the method 200 may include the steps of displaying a second game based on a received second game request, receiving a second sweepstakes entry allocation, and responsively displaying an outcome of the second game that is indicative of a second portion of the sweepstakes award associated with the second sweepstakes entry allocation.

Figure 9:
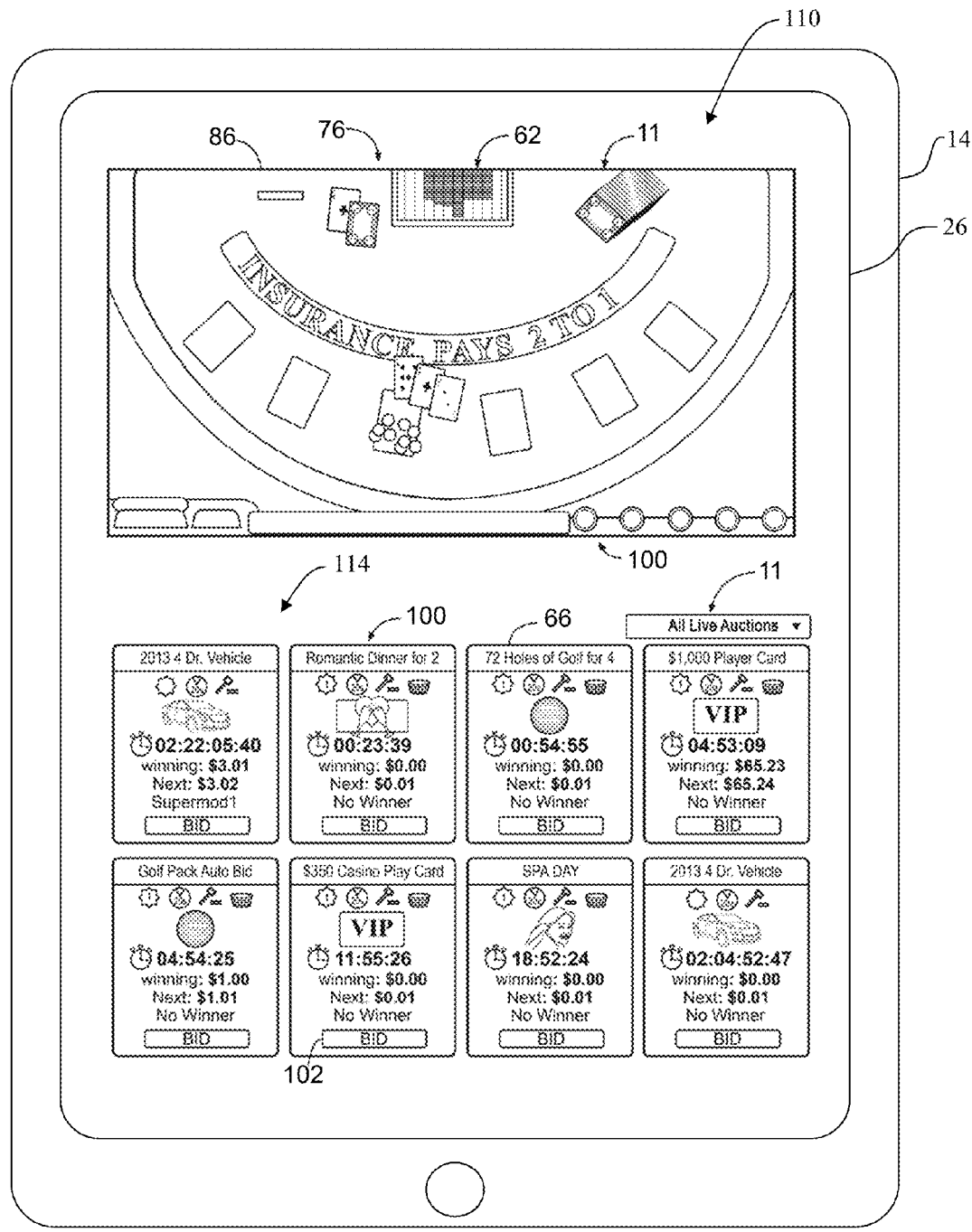
FIG. 9 is an exemplary entertaining graphical display of a game screen that may be used with the method shown in FIG. 2, according to an embodiment of the present invention.
Figure 10:
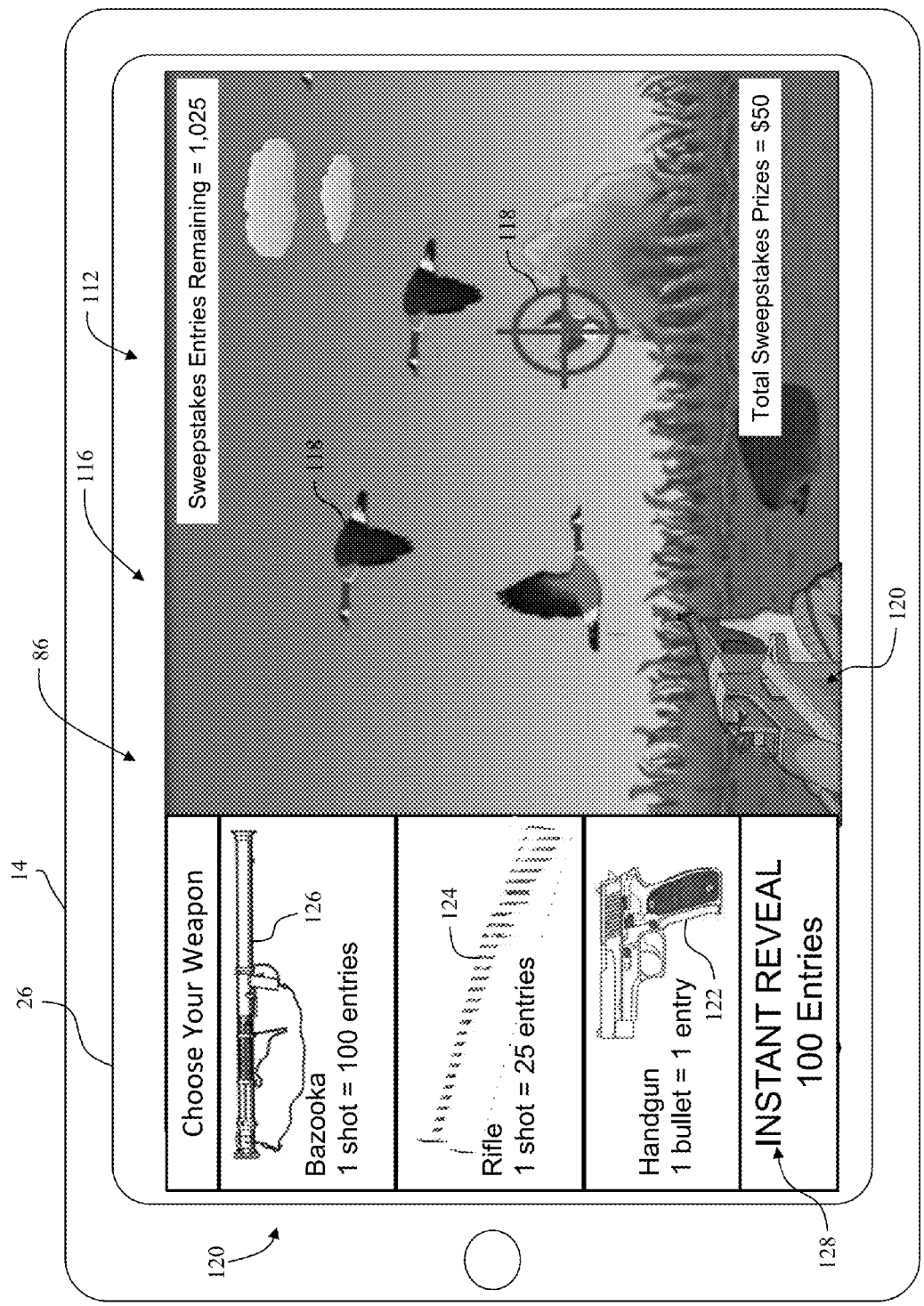
FIG. 10 is another exemplary entertaining graphical display for amusement purposes of a simulated skill-based game that may be used with the method shown in FIG. 2, according to an embodiment of the present invention.

FIG. 9 is an exemplary entertaining graphical display of a game screen 110 that may be generated and displayed by the system 10 and may be used with method 200. FIG. 10 is another exemplary entertaining graphical display for amusement purposes of a simulated skill-based game 112 that may be displayed by the system 10 and may be used with method 200. In the illustrated embodiment, in method step 228, the system controller 32 may simultaneously display an auction 114 including a plurality of auction items 66 and the simulated game 86 on the display device 26. More specifically, in one embodiment, the system controller 32 may display the game screen 110 including a first portion being displayed with the plurality of auction items 66 and a second portion being displayed with the game 62. In addition, the system controller 32 may also provide the player the associated sweepstakes awards during simulated game play and allow the player to use the sweepstakes awards to purchase additional bid units for use in bidding on the auction items 66 being displayed in the auction 114. For example, in one embodiment, the system controller 32 may display the simulated game 86 and allow the player to select a number of sweepstakes entries to wager on the game outcome. The system controller 32 may generate the game outcome indicative of the sweepstakes awards and reveal the corresponding sweepstakes awards in an outcome of the game. In addition, the system controller 32 may allow the user to use the sweepstakes awards to purchase bid units for use in bidding on auction items being displayed in the auction 114. Moreover, in one embodiment, if the sweepstakes award includes bid units, the system controller 32 may also award the bid units to the player via the game outcome and allow the player to immediately use the bid units in the auction 114. By simultaneously displaying the auction 114 and the simulated game 86, the excitement of the player is increased as sweepstakes awards are provided via the game outcome for immediate use in bidding on the displayed auction items 66.

Referring to FIG. 10, in one embodiment, in method step 228, the system controller 32 may display a simulated skill-based game 112 to the player for use in revealing sweepstakes awards to the player. In some embodiments, the simulated skill-based game 112 may include any game that allows the player to affect the outcome of the skill-based game through a series of player choices and/or player selections. The skill-based game may also include a player skill component associated with the player's selection that may include physical or manual dexterity, digital dexterity, hand-eye coordination (e.g., aim), reflexes, memory, cognitive processing, knowledge, and/or strategy-based selection. Skill-based games may include, but are not limited to including, target shooting games, catapult-type games, sporting games, memory games, matching games, and/or any suitable game that includes a skill component and that enables the outcome of the game to be at least partially determined based on a players selection.

For example, in one embodiment, the system controller 32 may display the skill-based game 112 including a shooting game 116 that includes a plurality of targets 118 and a plurality of player selectable weapons 120 for use in shooting projectiles towards the targets 118, and contacting the targets 118 to reveal one or more corresponding sweepstakes awards. The player selectable weapons 120 may be, for example, a handgun 122, a rifle 124, and a bazooka 126. The system controller 32 may assign a purchase value to each of the player selectable weapons 120 that is indicative of a number of sweepstakes entries that are required to purchase and/or use the weapon 120 during the skill-based game 112. For example, as shown in FIG. 10, the system controller 32 may allow a player to purchase one shot and/or use of the bazooka for 100 sweepstakes entries, one shot and/or use of the rifle 124 for 5 sweepstakes entries, and/or one shot and/or use of the handgun 122 for 1 sweepstakes entry. In addition, the system controller 32 may assign one or more sweepstakes awards to one or more targets 118 being displayed during the skill-based game 112. As the player operates the weapon 120 to hit one or more targets 118, the system controller 32 detects and displays the corresponding sweepstakes award associated with the sweepstakes entry use to purchase and/or use the weapon 120.

Figure 8:
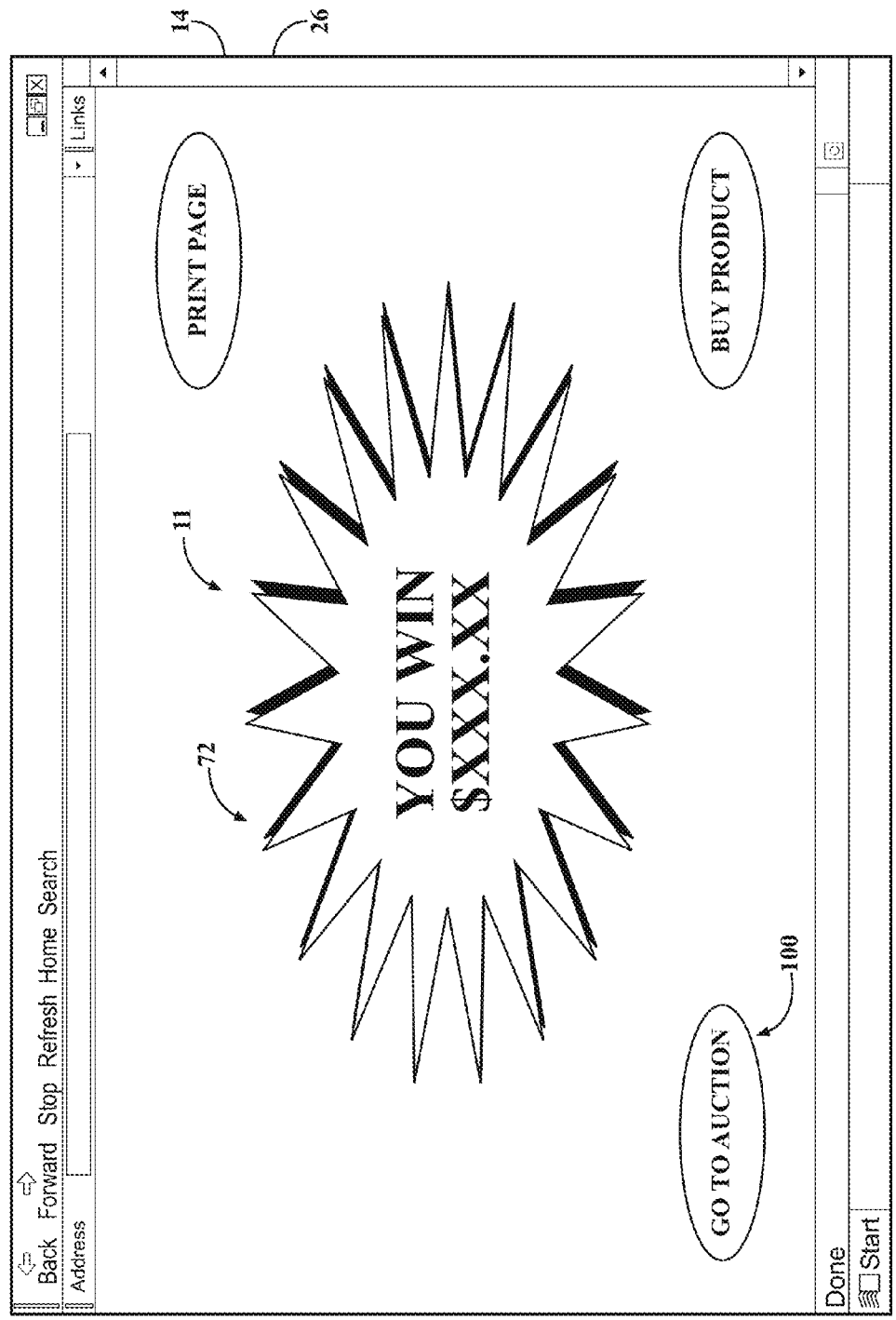
FIG. 8 is an exemplary entertaining graphical display for amusement purposes of an instant reveal simulated game that may be used with the method shown in FIG. 2, according to an embodiment of the present invention.

In some embodiments, the system controller 32 may also allow the player to purchase or select an instant reveal item 128 to cause the system controller 32 to conduct an instant reveal mode to reveal the sweepstakes award in the instant reveal game 72 (as shown in FIG. 8). In other embodiments, the system controller 32 may also allow the player to either purchase or select the instant reveal item 128 to cause the system controller 32 to conduct an instant reveal mode, which may be conducted during a game, such as game 112, or thereafter. Alternatively, the instant reveal mode may only be conducted after the game through a different game interface, such as game 72 shown in FIG. 8. For example, the system controller 32 may assign a predefined number of sweepstakes entries to the instant reveal item 128 and allow the user to purchase the instant reveal item 128 for a corresponding number of sweepstakes entries. In some embodiments, purchasing an instant reveal may result in the provision of additional bid units and/or sweepstakes entries. If the player selects the instant reveal item 128, the system controller 32 may select a corresponding number of sweepstakes entries from the corresponding sweepstakes account, determine the sweepstakes awards associated with the selected sweepstakes entries, and display the sweepstakes awards to the player, either during the game or thereafter.

In one embodiment, the system controller 32 may display the game 86 via an application installed on a mobile computing device 22 and display the instant reveal item 128 as an item that may be purchased during play of the game, e.g., an "in-app purchase" item. For example, as the player is playing the skill-based game 112, the system controller 32 may periodically display the instant reveal item 128 during game play and allow the player to purchase the instant reveal item 128. In one embodiment, the instant reveal item 128 may be associated with a corresponding level of skill, points, and/or achievements that are attained by the player during game play. For example, in one embodiment, the system controller 32 may display the instant reveal item 128 after the player has obtained a predetermined number of points within the skill-based game 112 and/or hit a predefined number of targets that may be indicative of a level of skill.

Figure 11:
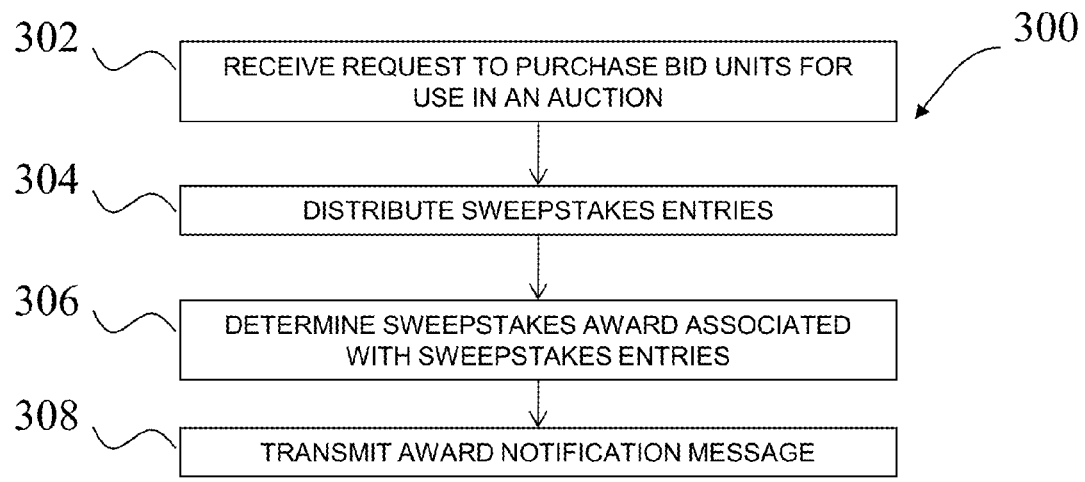
FIG. 11 is a flowchart of another method that may be used with the system shown in FIG. 1 for allowing a user to participate in an auction via a user computing device, according to an embodiment of the present invention.
Figure 12:
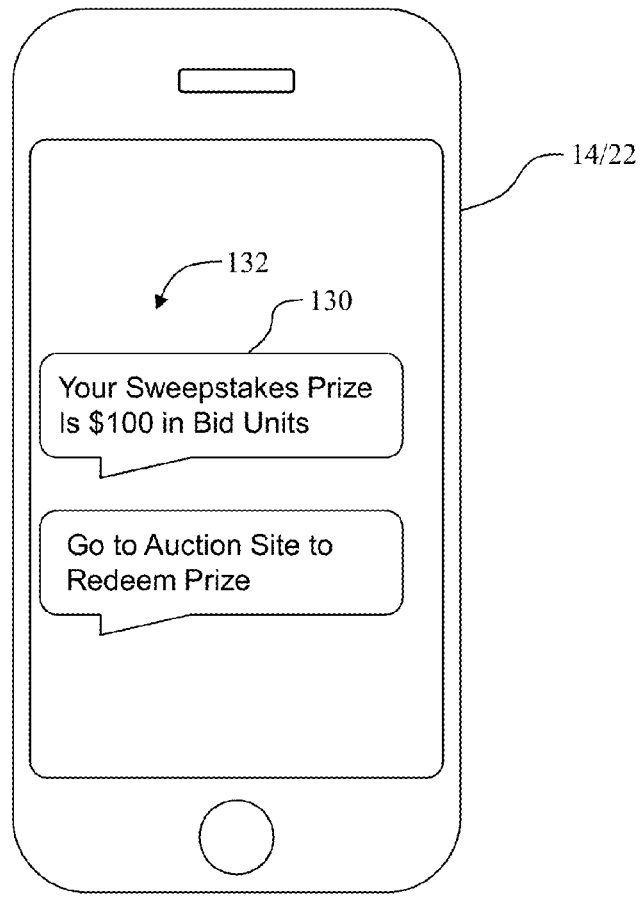
FIG. 12 is an graphical display of a notification screen that may be used with the method shown in FIG. 11, according to an embodiment of the present invention.

FIG. 11 is a flowchart of a method 300 that may be used with the system 10 for allowing a user to participate in an auction via a user computing device 14. FIG. 12 is a graphical display of an award notification message 130 that may be used with the method 300. In the illustrated embodiment, in method step 302, the system controller 32 receives a request to purchase one or more bid units for use in an auction such as, for example the auction 114. In method step 304, the system controller 32 distributes at least one sweepstakes entry to the player in response to the received request. For example, in one embodiment, the sweepstakes server 38 may assign a number of sweepstakes entries as a function of the number of bid units being purchase by the player. Moreover, the sweepstakes server 38 may assign a predefined number of sweepstakes entries to the player in response to the received bid purchase request.

In method step 306, the system controller 32 determines a sweepstakes award being associated with each sweepstakes entry being distributed to the player. In method step 308, the system controller 32 transmits an award notification message 130 to the player via the user computing device 14 to notify the player of the corresponding sweepstakes award. In one embodiment, the system controller 32 may transmit the award notification message 130 to a corresponding mobile computing device such as, for example, a cell phone via a text message 132 to the player. In the illustrated embodiment, the system controller 32 is configured to transmit the award notification message 130 via at least one transmission method including, but not limited to, a text message, an email message, postcard, a mailed letter, a blog post, an instant message, an RSS Feed, an automated phone call, a social media account post, and/or any suitable transmission method to enable the system 10 to transmit the notification message to the player. In addition, the system controller 32 may select a transmission method as a function of a corresponding user profile account. For example, in one embodiment, the user profile account may include user contact information including, but not limited to, a cell phone number, home phone number, mobile device identification number, a website, and/or a social media web account such as, for example, a Facebook account, a Twitter account, and/or a LinkedIn account. The system controller 32 may select a transmission method for transmitting the award notification message 130 as a function of the contact information included in the corresponding user profile account. For example, if the user profile account includes a mobile phone number, the system controller 32 may select a text message 132 and/or an automated phone message to transmit the award notification message 130.

In one embodiment, the system controller 32 may transmit the award notification message 130 after the user has participated in the auction, conducted an instant reveal mode operation, and/or conducted a game reveal mode operation. In addition, the system controller 32 may transmit the award notification message 130 after a predefined period of time has elapsed since receiving the request to purchase a bid unit. Moreover, the system controller 32 may transmit the award notification message 130 after a predefined period of time has elapsed such as, for example a predefined number of days after the sweepstakes entries have been assigned. In addition, the system controller 32 may detect a number of days since a bid unit purchase was initiated by the player and/or the number of days since the player has viewed and/or participated in the auction, and transmit the award notification message 130 after a predefined number of days have elapsed. For example, if the player has not purchased bid units and/or accessed the auction 114 within a predefined number of hours/days/weeks/months, the system controller 32 may transmit the award notification message 130 to the player to encourage the player to access the auction 114 and/or purchase additional bid units. In one embodiment, the system 10 may allow the user to participate in an initial auction and display the award notification message 130 to the user during a subsequent auction session initiated by the user.

In one embodiment, the system controller 32 may require the player to perform a user action to redeem the sweepstakes awards assigned to the player. In addition, the system controller 32 may generate and transmit the award notification message 130 to the player including a notification of the required user action to be initiated by the player to redeem the sweepstakes award. Moreover, the system controller 32 may also detect a user action being initiated by the player and provide the sweepstakes award to the player if the detected user action is the required user action. For example, the system controller 32 may assign a user action to one or more of the sweepstakes awards being assigned to the player, and transmit the award notification message 130 including a notification of the required action. The user action may be, for example, accessing an auction 114, requesting a purchase of an additional bid unit, submitting at least one bid on an auction item 66, a bid unit purchase, participation in an auction, initiating an instant reveal mode, initiating a game reveal mode, accessing the server system 12 via a mobile communication device, and/or any suitable user action that allows the system 10 to function as described herein. Upon detecting the required user action, the system controller 32 may provide the corresponding sweepstakes awards to the player.

Figure 13:
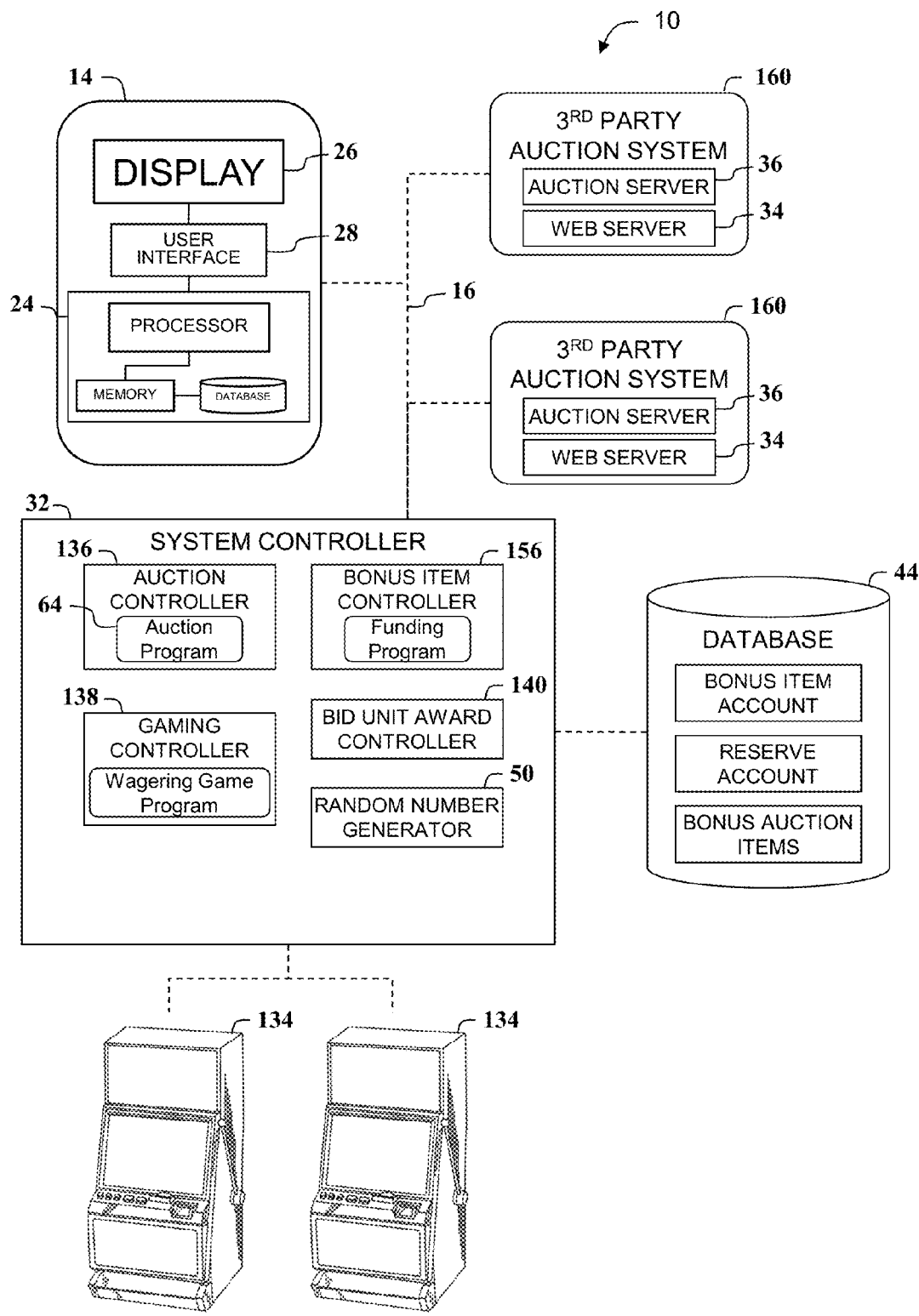
FIG. 13 is another schematic representation of the system shown in FIG. 1, according to an embodiment of the present invention.
Figure 14:
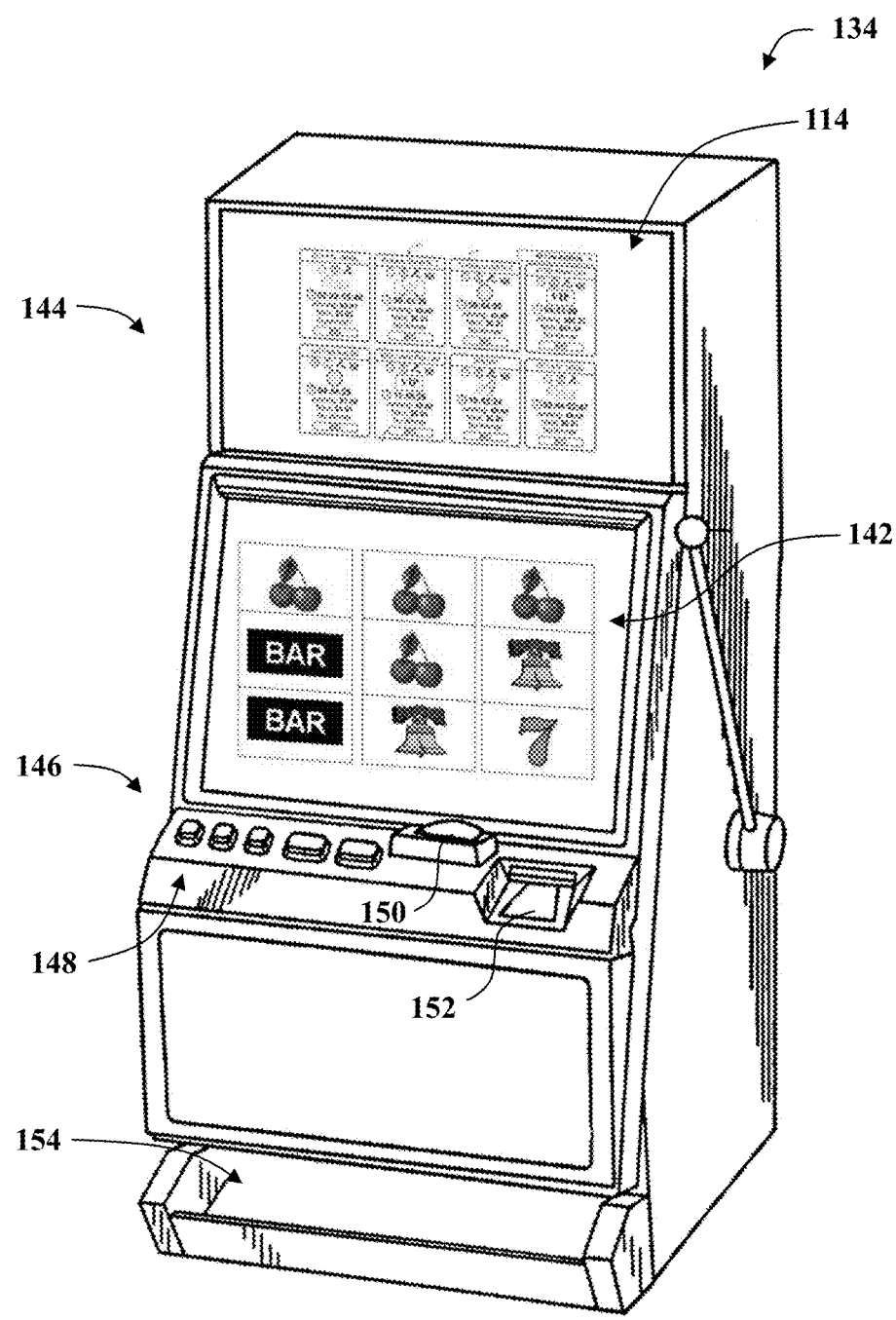
FIG. 14 is a perspective view of a gaming machine that may be used with the system shown in FIGS. 1 and 13, according to an embodiment of the present invention.
Figure 21:
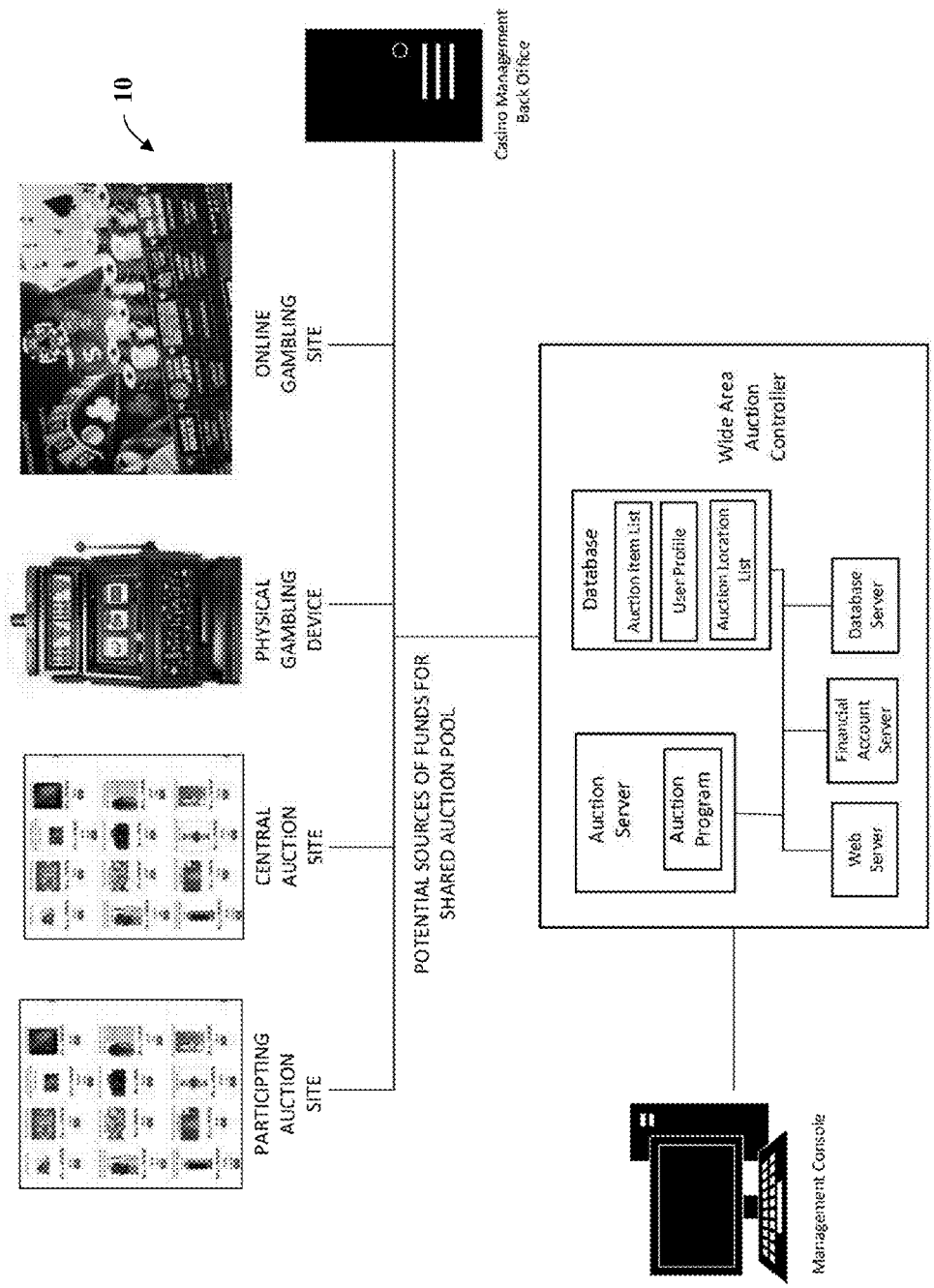

FIGS. 13 and 21 are additional schematic representations of the system 10. FIG. 14 is a perspective view of a gaming machine 134 that may be used with the system 10. In the one embodiment, the system controller 32 may include an auction controller 136, a gaming controller 138, and a bid unit award controller 140. The auction controller 136 includes the auction program 64 and is configured to display and conduct an on-line "penny auction" via a website as described herein, including allowing the user to place a bid on a auction item 66 using bid units to increase the total bid price by the value of the bid unit. Moreover, the auction controller 136 retrieves information associated with each auction item 66 from the database 44, receives a user bid request from a user computing device 14 updates the bid information associated with corresponding auction item 66.

The gaming controller 138 includes a game program that enables the gaming controller 138 to generate and conduct wagering games including allowing players to place wagers on the wagering games via a user computing device 14 and to play the games in response to player instructions received via the user computing device 14. More specifically, the gaming controller 138 retrieves game features and game elements from the database 44 and displays the wagering game on the display device 26. For example, in one embodiment, the database 44 may include including indicia and/or symbols for use in a game, e.g., cards used by a card game, roulette wheel and symbols used in a roulette game, and reels used in a reel game, symbol weights, paytables, and/or winning combination tables which represent relationships between combinations of random numbers and types of awards, and/or image data for producing game images and/or screens on the display device 26. In addition, the gaming controller 138 receives signals indicative of the player input such as, for example, receiving a wager including an amount of wagering credits and/or monetary funds, generates an outcome of the wagering game based on the predetermined game rules and the received player selections, and displays the game outcome on the display device 26. Moreover, during play of a wagering game, the gaming controller 138 receives random numbers from the RNG 50 and uses the random numbers generated by the RNG 50 to determine if a winning condition has occurred in the outcome of the wagering game and to determine whether or not to provide an award to a player. For example, in one embodiment, the gaming controller 138 may generate a slot-type game and use the RNG 50 to randomly select an arrangement of symbols to be displayed on video reels, and to provide an award to the player as a function of the displayed symbols. The gaming controller 138 may generate and display any type of wagering game including, but not limited to, a video slot game, a keno game, a blackjack game, a video poker game, or any type of wagering game that allows a player to make a wager, play a game, and potentially provide the player an award based on an outcome of the game and a paytable associated with the wagering game. In general, the term "award" may include, but is not limited to, a payout, in terms of wagering credits and/or money, in-game award, such as free games and/or a bonus features, and/or bid units for use in an auction.

The bid unit award controller 140 communicates with the gaming controller 138 and the auction controller 136 to provide awards to the player as a function of wagers being placed during play of a wagering game and/or bid units being purchased for use in an auction. In one embodiment, for example, the bid unit award controller 140 may provide the player an award including an amount of bid units for placing a wager on a wagering game. Moreover, the bid unit award controller 140 may provide an award to the player including an amount of wagering credits for use in playing the game for a bid unit purchase request made by the player. For example, in one embodiment, the gaming controller 138 may randomly determine an outcome of the wagering game, determine if the outcome of the game is a winning outcome and responsively provide the award to the player including an amount of wagering credits for use in placing additional wagers on the wagering game. The bid unit award controller 140 may determine if the player places another wager using the awarded wagering credits, and responsively provide one or more bid units to the player as an award for placing the additional wager. In addition, the bid unit award controller 140 may receive a request from the player to purchase additional bid units for use in placing bids in an auction, and provide the player an amount of wagering credits as an award for purchasing the additional bid units.

Referring to FIG. 14, in one embodiment, the user computing device 14 may include an electronic gaming machine (EGM) 134 such as, for example, a video slot machine located within a casino gaming property. The system controller 32 may communicate with the gaming machine 134 to generate and display the auction on the gaming machine 134 and/or generate and/or monitor wagering game play on the gaming machine 134. For example, in one embodiment, that auction controller 136 may communicate with the gaming machine of the network 16 to generate and display the auction 114 on the gaming machine 134. In addition, in one embodiment, the gaming controller 138 may communicate with the gaming machine 134 to generate and display the wagering game 142 on the gaming machine 134.

In the illustrated embodiment, the gaming machine 134 includes a display device 144 that may be configured to display the auction 114 and/or one or more wagering games 142. The display device 22 includes a display 26 and a user input device 28. The display 26 is configured to display game screens that include graphical user interfaces displaying information and selection areas to allow a player to interact with the gaming machine 134. The user input device 146 may include a plurality of input buttons 148, a coin slot 150, a bill acceptor 152, and a coin tray 154 for dispensing coins to the player. The input buttons 148 may include one or more betting switches to allow a player to place a wager and initiate a wagering game and a payout button for ending a gaming session and dispensing accumulated gaming credits to the player. In one embodiment, the gaming machine 134 may include a controller (not shown) that is configured to control the operations of the display device 144 and the user input device 146 to allow a player to play wagering games and/or participate in an auction 114. For example, in one embodiment, the system controller 32 may communicate with the gaming machine controller to display the auction 114 on the gaming machine display device 144 and to allow the player to access bid units stored in a corresponding user profile account to allow the player to place bids on the auction 114 via the gaming machine 134.

In addition, the system controller 32 may allow the player to purchase wagering credits for use in placing a wager on wagering games being played via the gaming machine 134 and store the wagering credits in the corresponding user profile account. For example, the system controller may generate a wagering credit account that is stored in the financial account server 40 and associated with the corresponding user profile account. The wagering credit account may be accessed by the player via the gaming machine 134 to download wagering credits from the financial server 40 to the gaming machine 134 for use in wagering on the games.

Referring again to FIG. 13, in the illustrated embodiment, the system controller 32 also includes a bonus item controller 156 that is configured to generate and fund a bonus item account with a portion of bid unit purchase being made by the players. The bonus item account is used to store monetary funds received from players for the purchase of bid units for use in purchasing one or more bonus auction items that may be displayed in the auction 114 for bid by one or more players. The bonus auction items may be auction items that have a higher value and/or greater demand than other auction items 66 being displayed in the auction 114.

In the illustrated embodiment, the bonus item controller 156 communicates with the auction controller 136 and the gaming controller 138 to monitor bid unit purchases made by the player and/or wagers placed by the player on a wagering game. The bonus item controller 156 contributes a portion of each bid unit purchased and/or purchased wagering credit to the bonus item account for use in providing a bonus auction item 158 for use in the auction 114. For example, in one embodiment, the bonus item controller 156 may receive a request from the player to purchase bid units for use in placing bids associated with the auction items and transfer a portion of the amount of monetary funds received from the player to the bonus item account and responsively increase an account balance of the bonus item account. Moreover, the bonus item controller 156 may receive a request from the player to purchase additional wagering credits and transfer a portion of the monetary funds used to purchase the wagering credits to the bonus item account.

The bonus item controller 156 may also be configured to monitor a balance of the bonus item account and select and display a bonus auction item 158 if the account balance is greater than or equal to a predefined amount. In one embodiment, the predefined amount may be indicative of the purchase price of the bonus auction item and/or shipping costs. For example, in one embodiment, the bonus item controller 156 may determine if the bonus item account balance is equal to a predefined account balance and responsively select a bonus auction item from a list of bonus auction items contained in the database 44 and display the selected bonus auction item in the auction 114. In addition, in one embodiment, the system controller 32 may communicate with a 3rd party item supplier system and/or website (not shown) and select the bonus auction item being offered by the 3rd party item supplier system and/or website. In addition, upon displaying the bonus auction item 158 in the auction 114, the system controller 32 may transfer the funds contained in the bonus item account to the 3rd party supplier website to facilitate purchasing the bonus auction item 158 from the 3rd party supplier website.

In the illustrated embodiment, the bonus item controller 156 may also generate and store a reserve account in the database 44. The reserve account may also be funded from a portion of each bid units and/or wagering credits being purchased by a player. For example, the bonus item controller 156 may transfer another portion of the amount of monetary funds received from the player to the reserve account. Moreover, the bonus item controller 156 may contribute a first amount of a players bid unit purchase and/or wagering credit purchase to the bonus item account and contribute a second amount of the players bid unit purchase to the reserve account. The second amount being less than the first amount. In the illustrated embodiment, the bonus item controller 156 may determine if the bonus item account balance is less than a predefined account balance and responsively transfer funds from the reserve account into the bonus item account. For example, in one embodiment, the system controller 32 may transfer funds from the bonus item account to a 3rd party supplier system to purchase the bonus auction item 158. Upon detecting the bonus item account balance falling below a predefined account balance, the bonus item controller 156 may transfer funds from the reserve account to the bonus item account to replenish the account balance of the bonus item account and/or provide additional funds for use in purchasing the bonus auction item 158.

Figure 17:
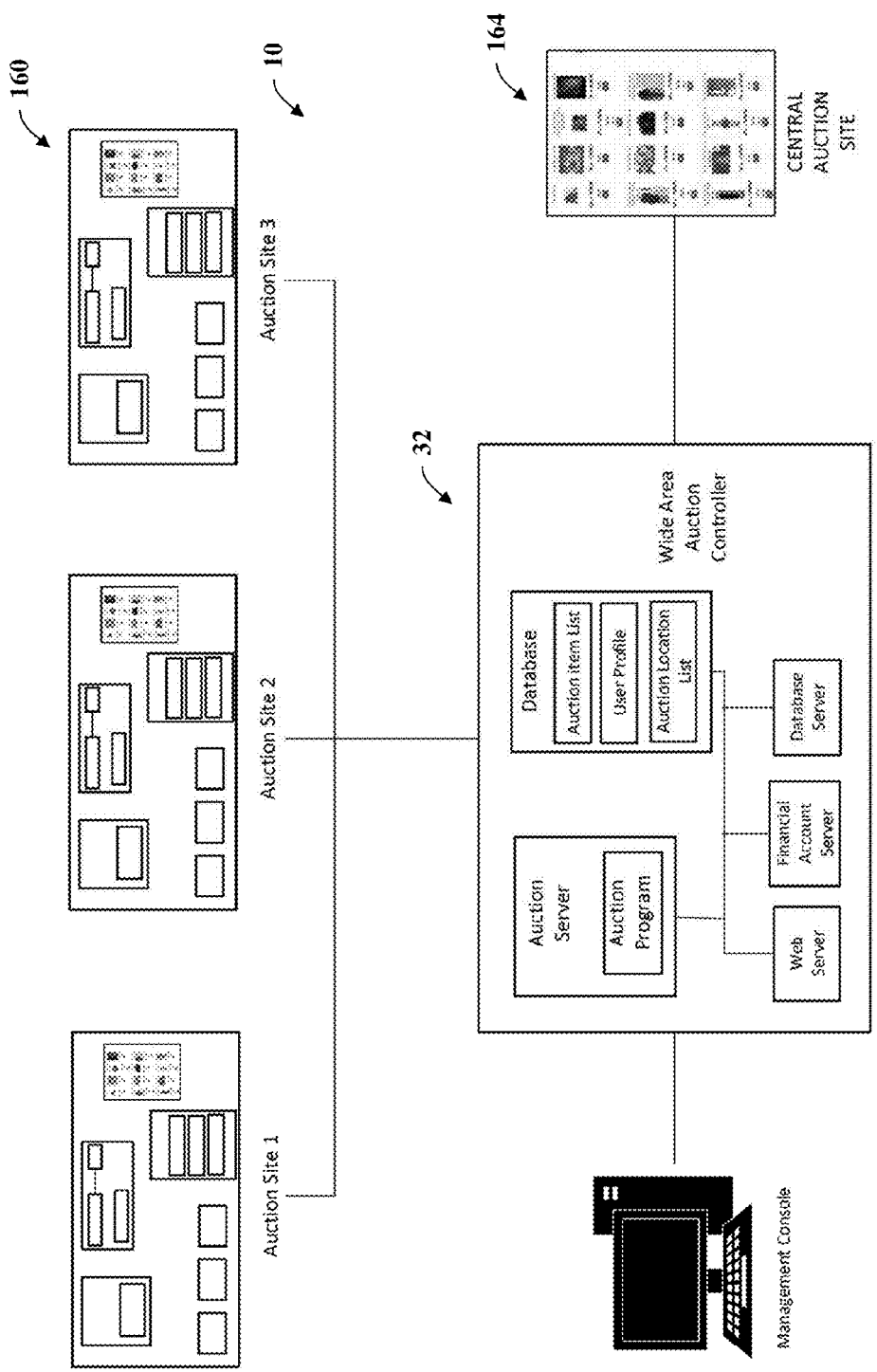
FIGS. 17-21 are schematic illustrations of the system shown in FIG. 13, according to embodiments of the present invention.

In one embodiment, the system controller 32 may communicate with one or more independent 3rd party auction systems 160 via the network 16 (shown in FIGS. 13 and 17). Each independent 3rd party auction system 160 includes an auction server 36 having a corresponding auction program for use in generating and conducting online "penny auctions" for players. In the illustrated embodiment, the system controller 32 communicates with each of the independent 3rd party auction systems 160 via the network 16 to monitor the bid unit purchase requests received by each of the independent 3rd party auction systems 160 from associated players. In addition, the system controller 32 may receive a portion of the monetary funds received for each bid unit purchased by players using one or more of the independent 3rd party auction systems 160 and transfer the received funds to the bonus item account for use in purchasing the bonus auction item 158. For example, in one embodiment, the bonus item controller 156 may determine a contribution amount associated with each 3rd party server as a function of a corresponding amount of bid purchases received from players by each of the independent 3rd party auction systems 160 and transmit a funding request to each of the independent 3rd party auction systems 160 including the corresponding contribution amount. Moreover, the bonus item controller 156 receives a response from at least one of the independent 3rd party auction systems 160 including the corresponding contribution amount and responsively increases the account balance of the bonus item account as a function of the received contribution amount. In one embodiment, for example, the system controller 32 may receive a notification message each time a player purchases bid units from an independent 3rd party auction system 160 including a corresponding amount of the purchase and determine a contribution amount associated with the independent 3rd party auction systems 160 as a function of the purchased bid units.

Figure 15:
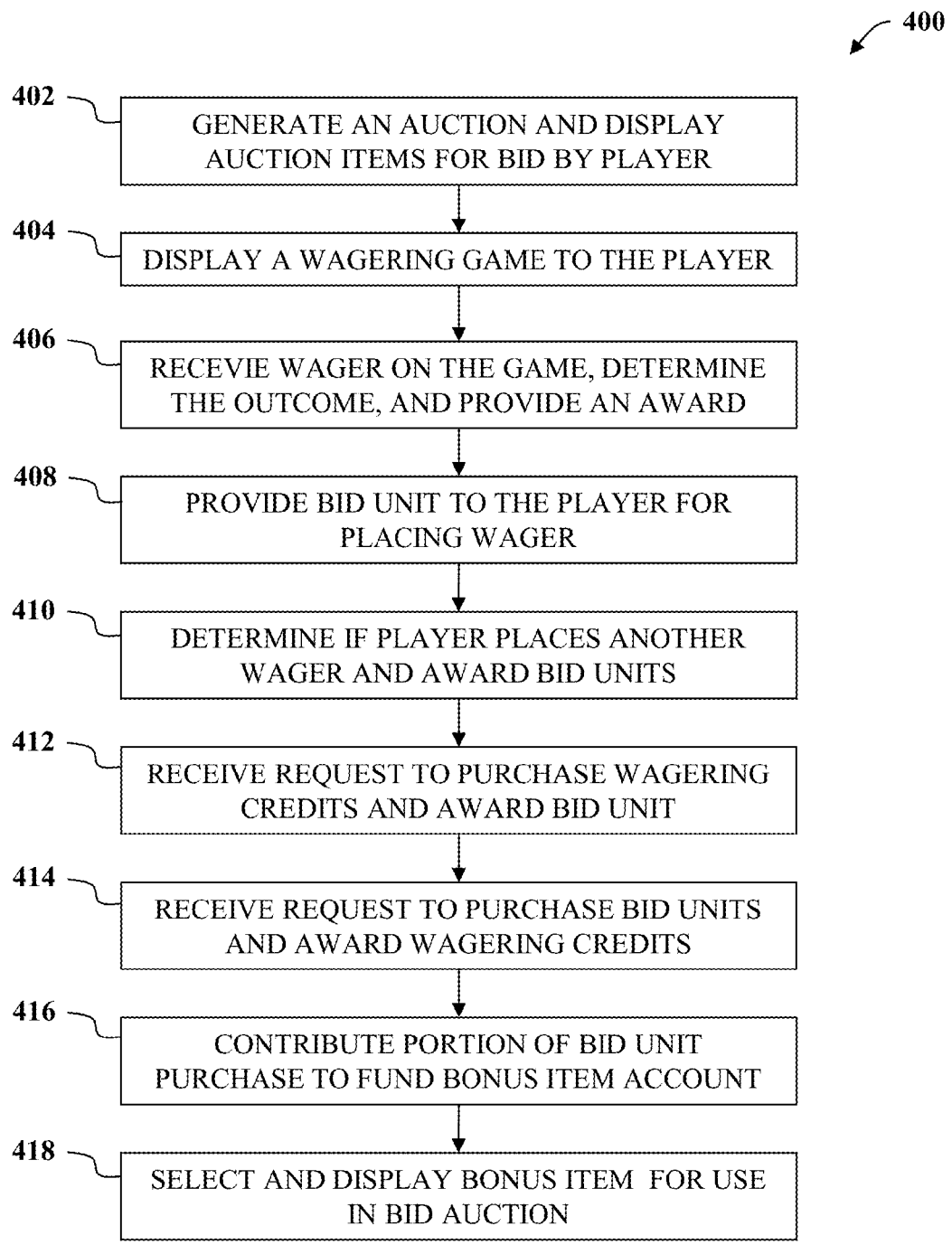
FIG. 15 is a flowchart of a method that may be used with the system shown in FIGS. 1 and 13 for allowing a user to participate in an auction via a user computing device, according to an embodiment of the present invention.
Figure 16:
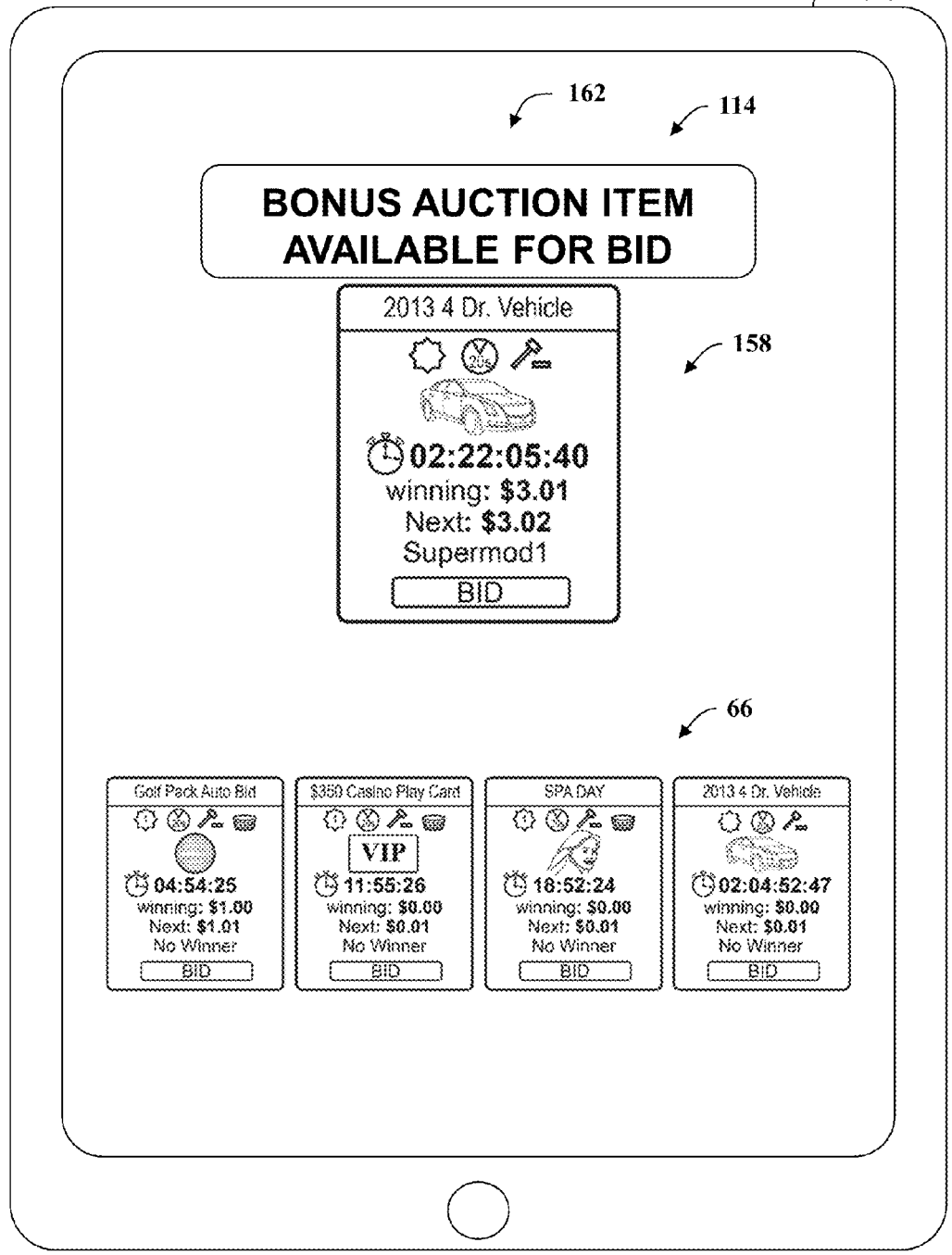
FIG. 16 is an exemplary entertaining graphical display of an online auction that may be used with the method shown in FIG. 15, according to an embodiment of the present invention.

FIG. 15 is a flowchart of a method 400 that may be used with the system 10 for providing an auction to a player via a user computing device 14. The method 400 includes a plurality of steps. Each method step may be performed independently of, or in combination with, other method steps. Portions of the method 400 may be performed by any one of, or any combination of, the components of the system 10. FIG. 16 is an entertaining graphical display of an online auction that may be displayed by the system 10.

In the illustrated embodiment, in the method step 402, the system controller 32 generates and displays the auction 114 on the user computing device 14 and allows the player to bid on items being displayed in the auction 114. For example, in one embodiment, the auction controller 136 may receive a request to display information including an auction event from a player via a corresponding user computing device, retrieve an auction event list from the database 44 including a plurality of auction items 66, and generate and display a "penny auction" on an auction website 162 (shown in FIGS. 9 and 16) including the plurality of auction items 66 on a user computing device 14. In one embodiment, the auction controller 136 may display the auction 114 on one or more gaming machines 134. In addition, the auction controller 136 may receive a unique user identifier from the player, retrieve a corresponding user profile account including an amount of bid units, and allow the player to request to place a bid associated with an auction item using a bid unit. The auction controller 136 conducts the auction and allows the player to participate in the auction by placing bids on player selected items displayed in the auction 114 via an auction website 162.

In method step 404, the system controller 32 receives a request from the player and responsively displays a wagering game 142 on the user computing device 14. In one embodiment, the system controller 32 may simultaneously display the auction 114 and the wagering game 142 on the user computing device 14. In another embodiment, the auction 114 and wagering game 142 may be displayed on independent websites. In addition, in one embodiment, the auction 114 and wagering game 142 may both be displayed on the gaming machine 134 (shown in FIG. 14).

In method step 406, the system controller 32 receives a wager from the player, randomly generates an outcome of the game 142, and provides an award to the player as a function of the game outcome and the wager. For example, in one embodiment, the gaming controller 138 generates and displays the wagering game 142 on the user computing device 14, receives a signal indicative of a wager being placed on the wagering game 142 by the player, randomly generates an outcome of the wagering game 142, and provides an award to the player as a function of the outcome, the wager, and a predefined paytable. In one embodiment, the gaming controller 138 displays a slot-type game (shown in FIG. 14) including a plurality of reels being displayed with a plurality of game symbols and one or more paylines that indicate one or more combinations of game symbols. During game play, the player makes a wager and the gaming controller 138 randomly generates an outcome for the game, spins the reels, and selectively stops the reels to display the game outcome. The gaming controller 138 determines if a pattern of symbols being formed along the paylines match a winning combination, and responsively provides an award to the player as a function of the combination of symbols formed along the payline, the wager, and a predetermined paytable. Many variations to the above described general play of a slot game fall within the scope of the present invention, including any type of game upon which a player could make a wager and/or purchase a game play including, but not limited to, a bingo game, a blackjack game, a video poker game, or any type of game that enables the system 10 to function as described herein.

In one embodiment, the system controller 32 may provide an award including an amount of wagering credits determined as a function of the game outcome. In addition, the system controller 32 may provide an award including an amount of bid units that is determined as a function of the game outcome.

In method step 408, the system controller 32 provides a bid unit to the player in response to the player having placed a wager on the wagering game. For example, in one embodiment, the bid unit award controller 140 may determine if the player has placed a wager on the wagering game 142 and responsively provide a bid unit to the player for use in placing bids associated with auction items displayed in the auction. In addition, the bid unit award controller 140 may determine an amount of the wager placed by the player and provide an amount of bid units that is determined as a function of the amount of the wager. Moreover, the bid unit award controller 140 may provide one or more bid units if the player has wagered a predetermined amount of wagering credits and/or monetary funds on the wagering game 142.

In method step 410, the system controller 32 determines if the player achieves a winning outcome and places another wager on another round of the wagering game, and responsively provides the player one or more bid units. In one embodiment, the gaming controller may determine if the outcome of the game is a winning outcome and responsively provide the award to the player including an amount of wagering credits for use in placing wagers on the game. The bid unit award controller 140 may determine if the player places another wager using the awarded wagering credits, and responsively provide an amount of bid units to the player.

In method step 412, the system controller receives a request from the player to purchase wagering credits for use with the wagering game 142 and provides the player an amount of bid units in response to receiving the request. In one embodiment, for example, the bid unit award controller 140 receives a request from the player to purchase a number of wagering credits and provides the player an amount of bid units that are determined as a function of the number of wagering credits purchased by the player.

In method step 414, the system controller 32 receives a request from the player to purchase bid units for use in placing bids with the auction 114 and provides the player an amount of wagering credits for use in placing wagers on the game. In one embodiment, the bid unit award controller 140 may receive a request from the player to purchase bid units, determine an amount of monetary funds associated with the purchase request, and provide the player an amount of wagering credits that is determined as a function of the amount of the bid unit purchase. For example, in one embodiment, a player may purchases a $100 bid pack and receive chips for free play, for example, poker,—at a table or online with no monetary pay out (e.g., Free to Play (F2P) Facebook™ Scenario). Additional chips can be purchased by purchasing more bid packs. Moreover, a player may purchase a $100 bid pack and receive ($100) chips to play, for example, poker,—at a table or online with a monetary pay out per poker pay out rules (e.g., 2. Pay to Play (P2P) Poker Stars™ Scenario). In addition, a player may purchase a $100 bid pack and receive (any amount) of free chips to play in a physical or online poker tournament with real monetary awards. Real money awards will be per tournament rules, for example, a share of a common pool (e.g., Tournament Scenario).

In method step 416, the system controller 32 contributes a portion of the monetary funds received from the bid unit purchase to the bonus item account for use in funding a purchase of a bonus auction item. For example, the bonus item controller 156 may receive a request from the player to purchase bid units for use in placing bids associated with the auction items, determine the amount of monetary funds associated with the purchased bid units, and transfer a portion of the amount of monetary funds received from the player to the bonus item account and responsively increase an account balance of the bonus item account.

Figure 18:
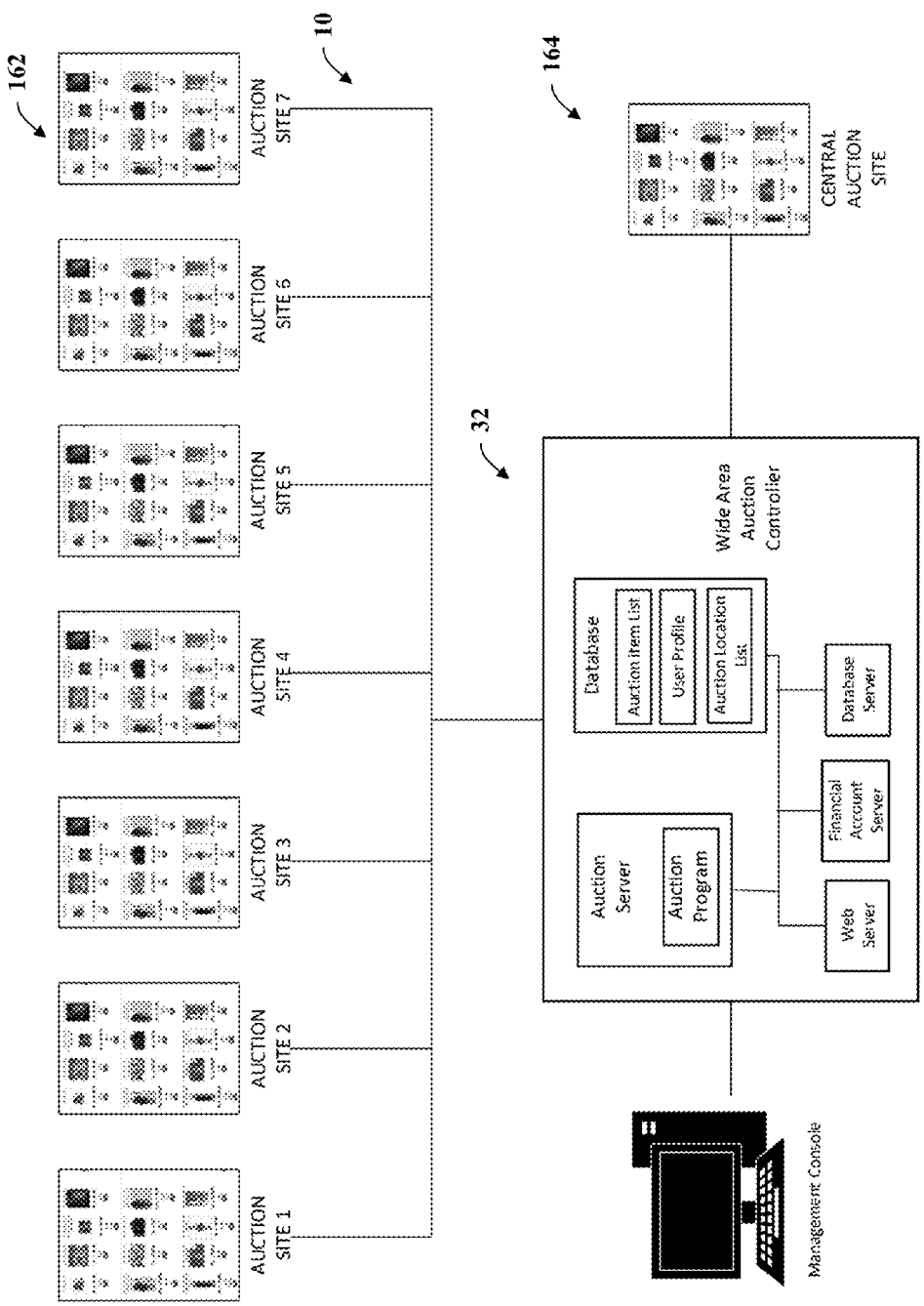
Figure 19:
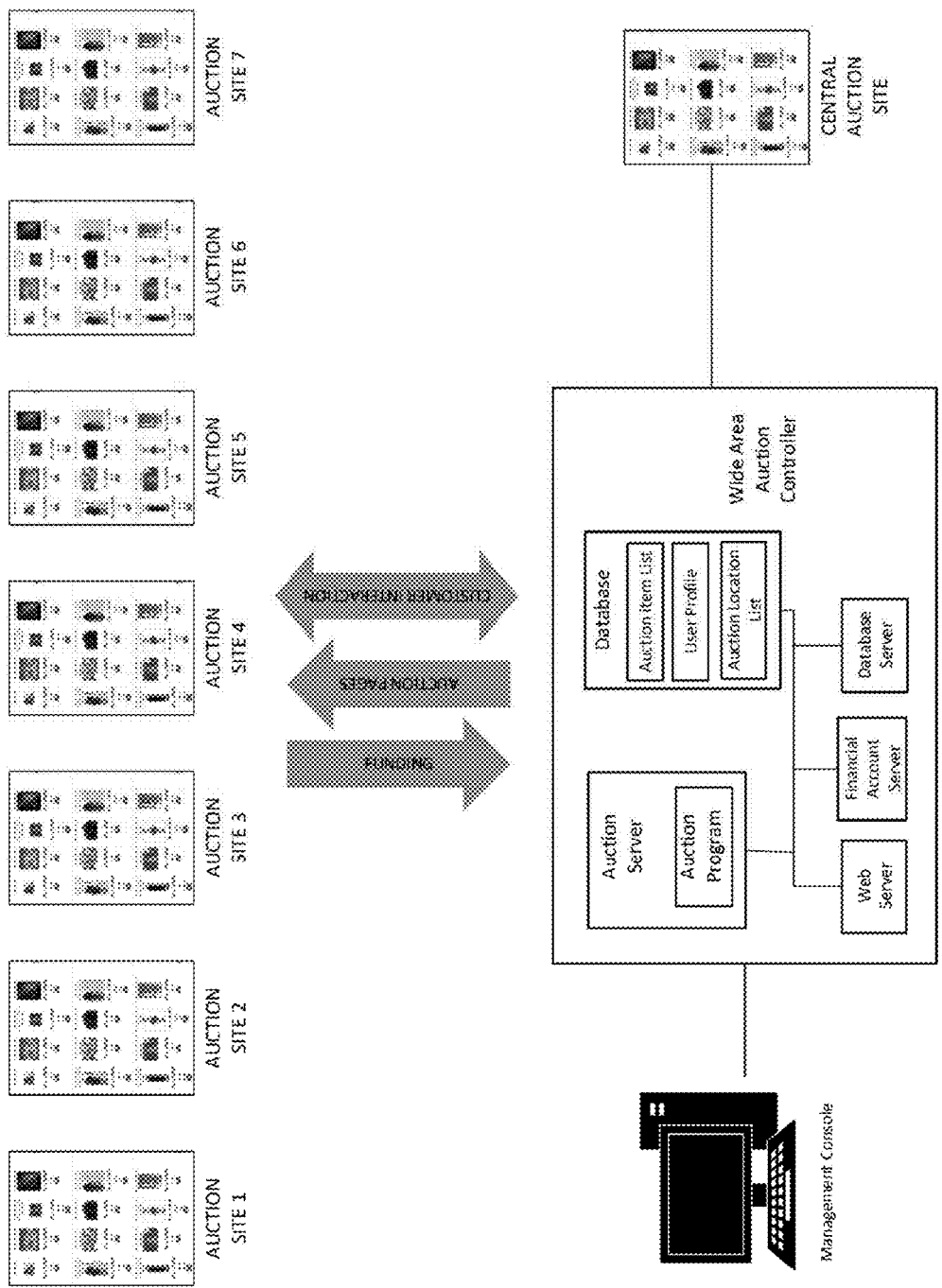
Figure 20:
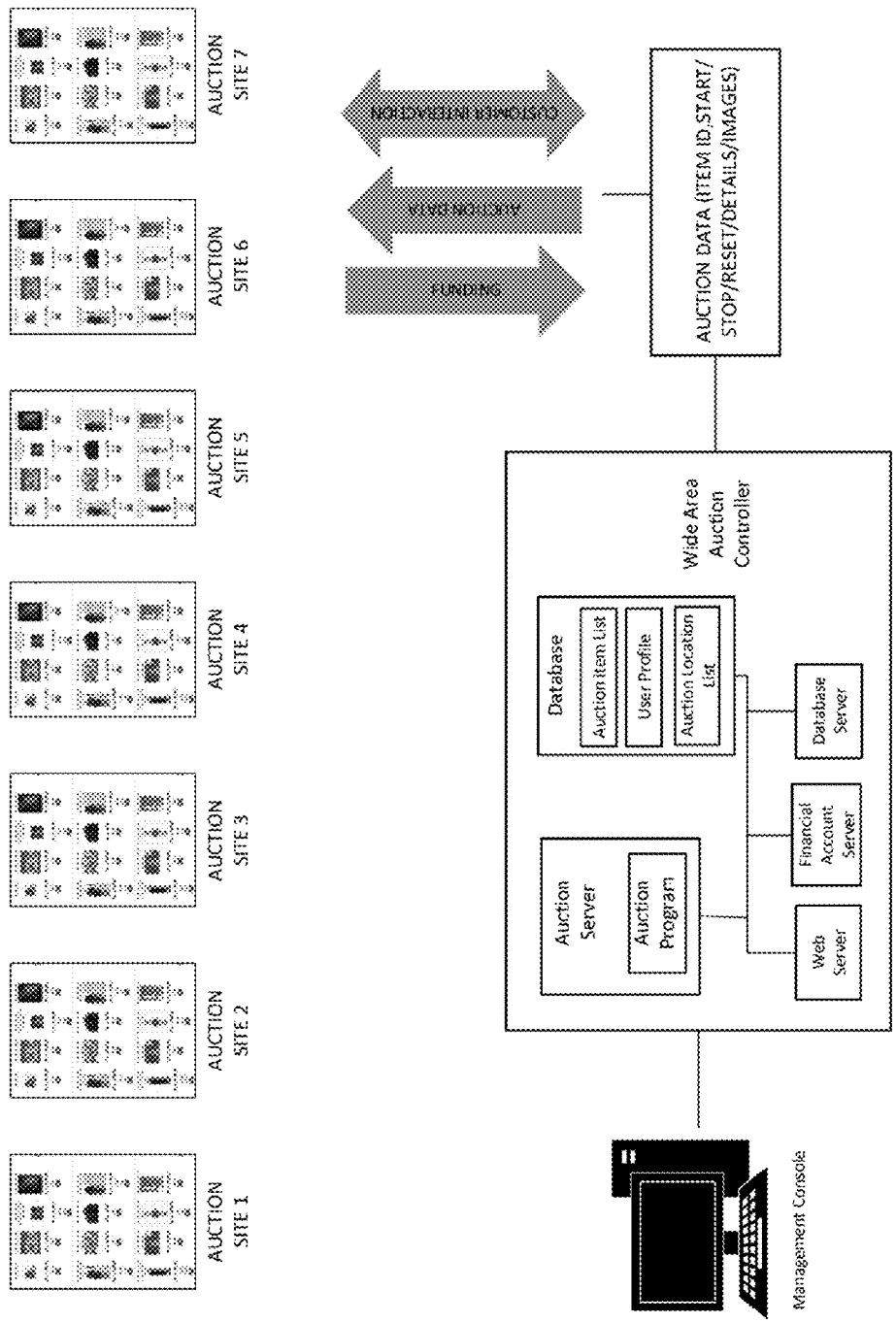

In method step 418, the system controller 32 determines if the balance in the bonus item account is equal to a predefined account balance and responsively selects and displays a bonus auction item 158 in the auction 114. Moreover, the bonus item controller 156 determines if the bonus item account balance is equal to a predefined account balance, responsively selects a bonus auction item from a list of bonus auction items contained in the database 44, and displays the selected bonus auction item in the auction. In one embodiment, the system controller 32 may display the bonus auction item in the auction 114 with the other auction items 66. In another embodiment, the system controller 32 may display a separate auction website 162 that includes one or more bonus auction items 158 funded from the bonus item account. In addition, the system controller 32 may conduct and display the same auction in each a separate auction website 162 with each separate auction website 162 including a different layout and/or image characteristics such as, for example, a website branding and/or website domain. For example, in one embodiment, the system controller 32 may communicate with a plurality of independent 3rd party auction servers, determine a contribution amount associated with each 3rd party server as a function of a corresponding amount of bid purchases received from players by each of the 3rd party servers, transmit a funding request to each of the 3rd party auction servers, the funding request including the corresponding contribution amount, and receive a response from at least one 3rd party auction server including the corresponding contribution amount and responsively increase the account balance of the bonus item account as a function of the received contribution amount. Upon determining that the bonus item account balance is equal to a predefined account balance, the system controller 32 may display a central auction website 164 (shown in FIGS. 17-19) that is accessible by the players, and display selected bonus action items on the central auction website 164. In another embodiment, the system controller 32 may generate and display a plurality of auctions 114 via a plurality of auction websites 162, and generate and display the central auction website 164 independently from the auction websites 162 (shown in FIGS. 18-20). FIG. 17 illustrates a central auction site with independent remote auction websites. FIG. 18 shows clones of the central auction sites, that is, broadcasts of the central auction site. FIG. 19 shows bidirectional data flow between the central auction controller to clone websites so that data, such as customer information, and auction pages are transmitted to the clone websites, and data, such as funding information is transmitted to the central auction controller. FIG. 20 has no central auction site but is similar to FIG. 18 and FIG. 19 in operation.

Figure 22:
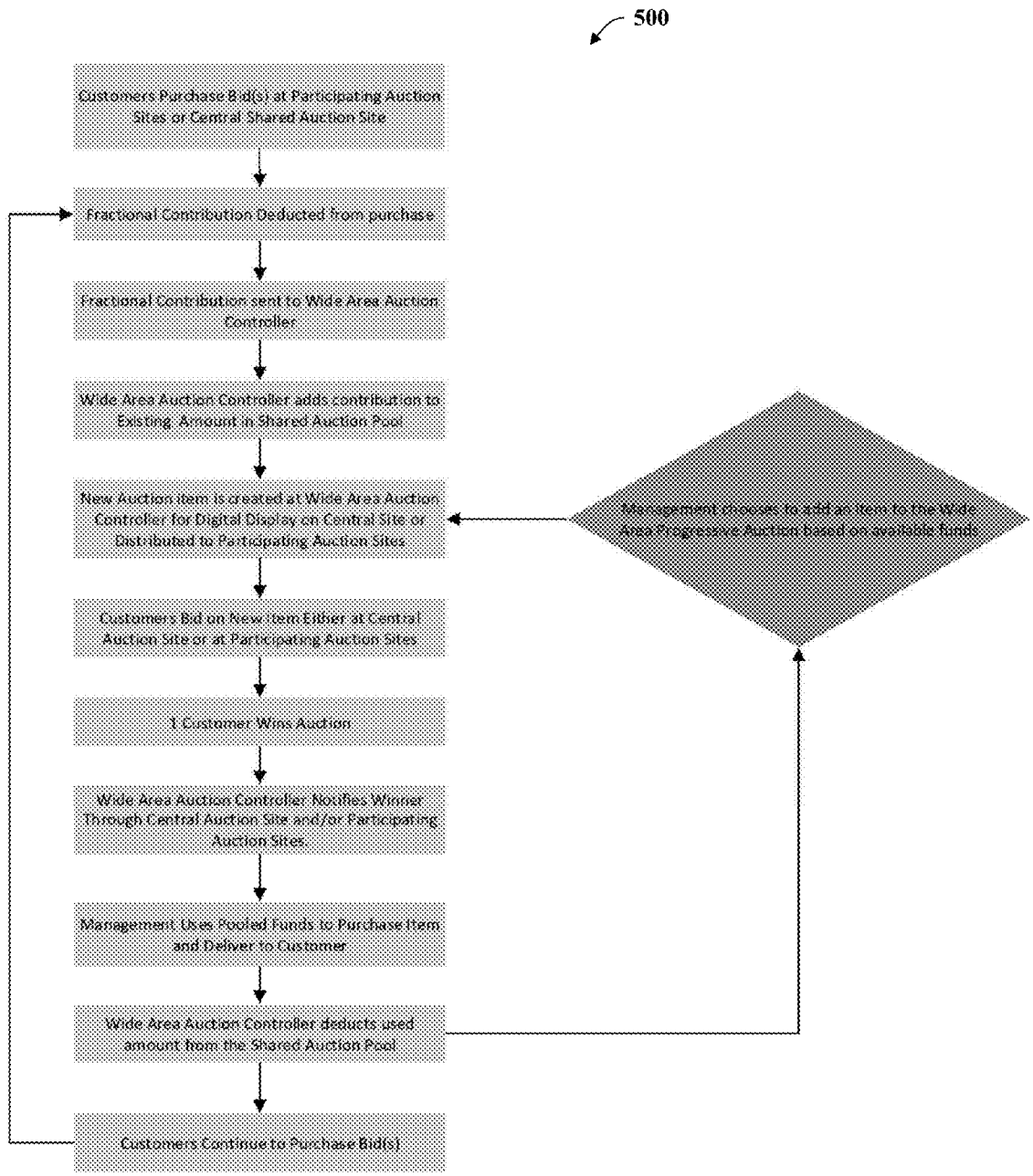
FIG. 22 is a flowchart of another method that may be used with the system shown in FIGS. 1 and 13 for allowing a user to participate in an auction via a user computing device, according to an embodiment of the present invention.

FIG. 22 is a flowchart of another method 500 that may be used with the system 10 to allow a user to participate in an auction via a user computing device 14. Method 500 includes a plurality of steps that may each be performed independently of, or in combination with, other method steps. Portions of the method 500 may be performed by any one of, or any combination of, the components of the system 10. In the illustrated embodiment, during method 500, the system controller 32 allows the customer to purchase bid units at a participating auction site 162 and/or at the central auction site 164. The system controller 32 deducts a fractional contribution from each purchase and sends the fractional contribution to a Wide Area Auction Controller such as, for example, the bonus item controller 156. The Wide Area Auction Controller adds the contribution to an existing account balance being stored in a shared auction pool, such as the bonus item account. The Wide Area Auction Controller creates a new auction item for digital display on the central auction website 164 or distributes the new auction item to each participating 3rd party auction server 160. Customers/players are able to bid on the new item through the central auction website 164 and/or the participating 3rd party auction websites. The Wide Area Auction Controller determines the customer/player who wins the auction and notifies the winner through the central auction website 164 and/or the participating 3rd party auction websites. The auction operators use the pooled funds to purchase the new item and deliver the new item to the customer. The Wide Area Auction Controller deducts the funds from the shared auction pool. As the customer/players continue to purchase bid units, the Wide Area Auction Controller repeats the method steps and continues to fund the shared auction pool and purchase new auction items with the pooled funds.

Figure 23:
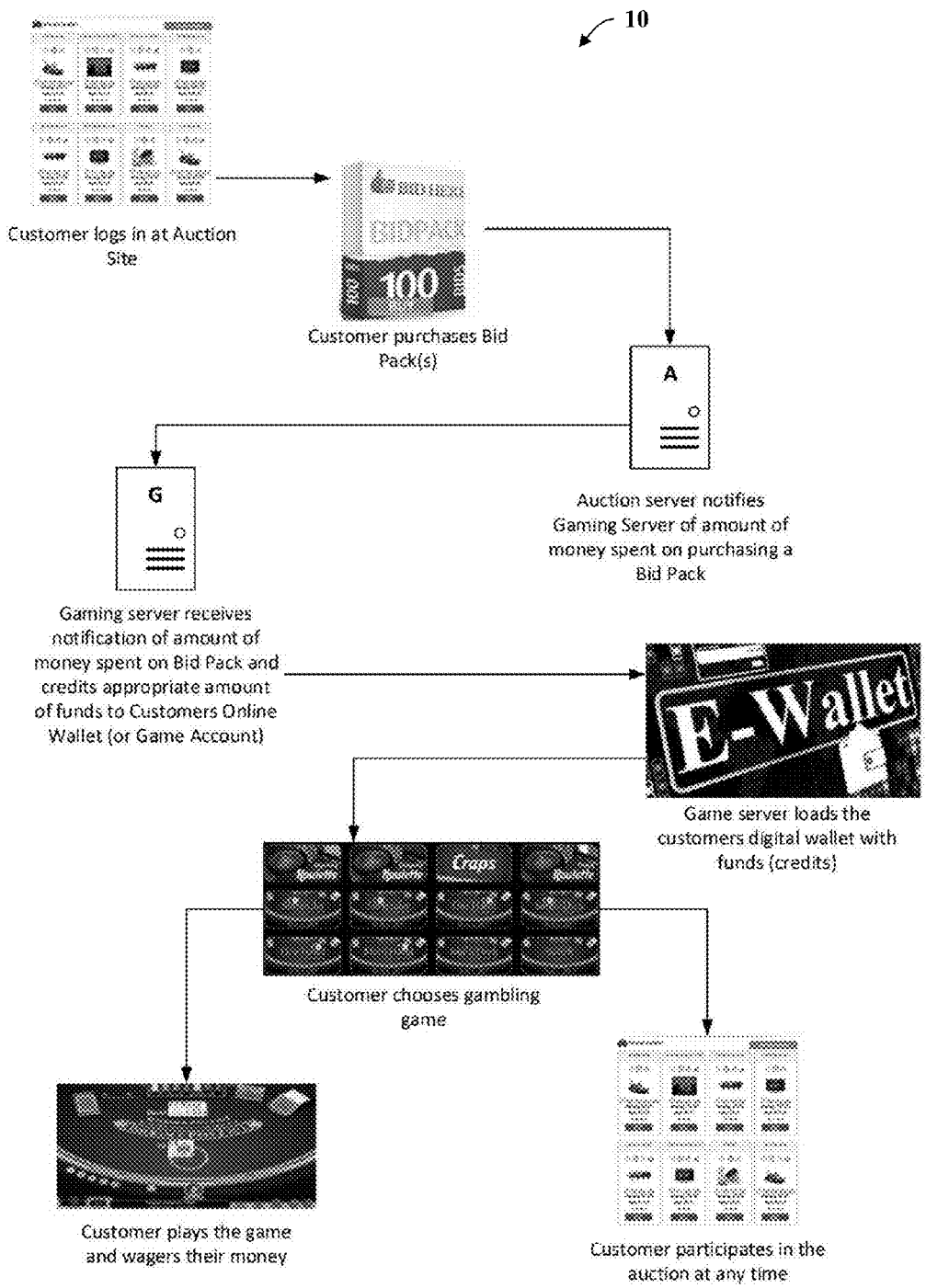
FIG. 23-28 are functional diagrams of the system shown in FIGS. 1 and 13, according to an embodiment of the present invention.

Referring to FIG. 23, in one embodiment, the system 10 allows a customer to log into the auction site 162 and purchase bid unit packs. The auction controller 136 notifies the gaming controller 138 of the amount of money the player spent on the bid packet purchase. The gaming controller 138 receives the notification of the amount of money spent on the purchase and credits an amount of funds to the customer's online e-wallet account and/or financial account. The gaming controller 138 loads the players e-wallet with the funds and/or wagering credits and allows the player to select a wagering game for play. The system 10 allows the player to place wagers on one or more wagering games and/or participate in an auction being conducted by the system 10.

Figure 24:
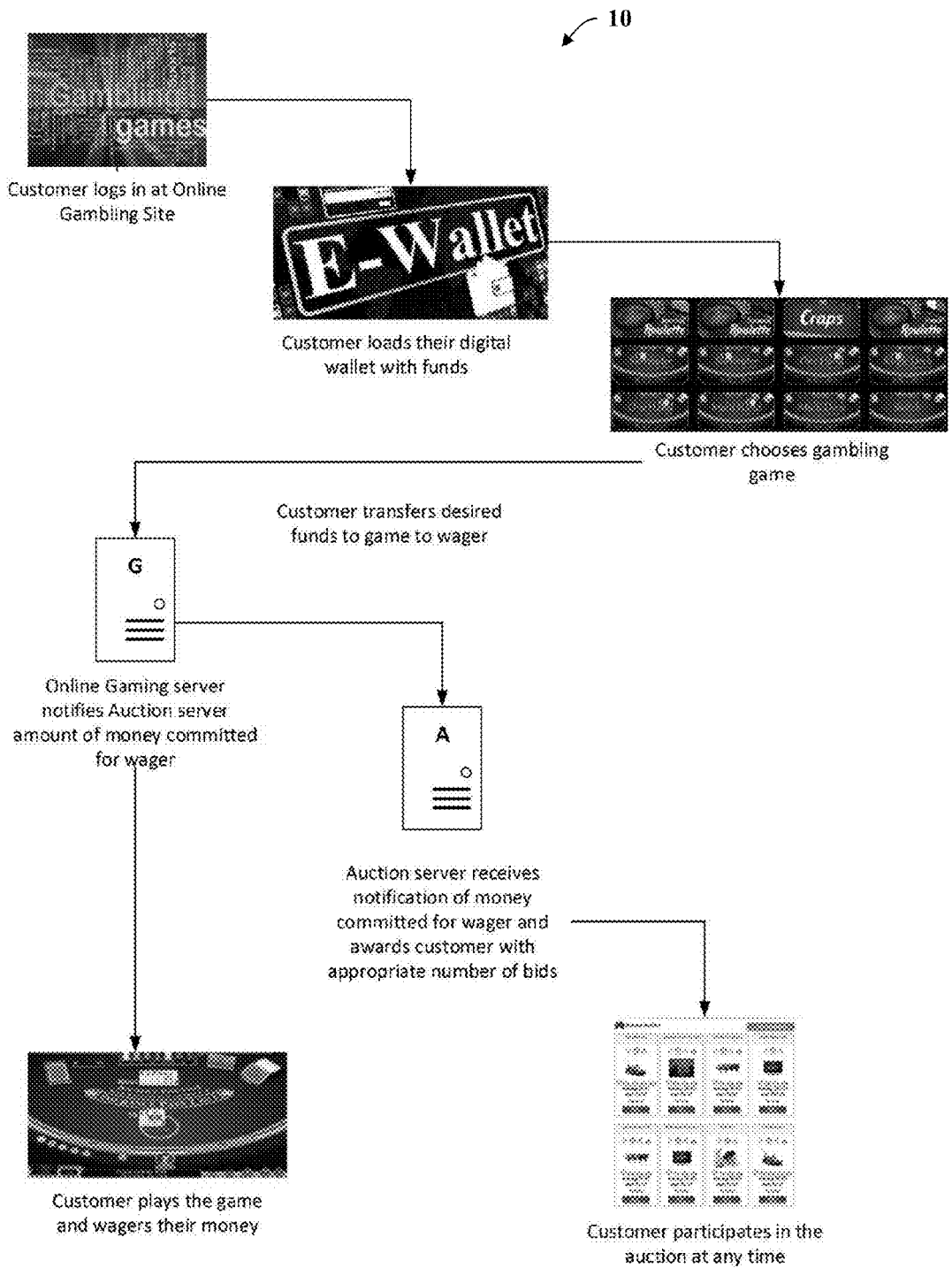
Figure 25:
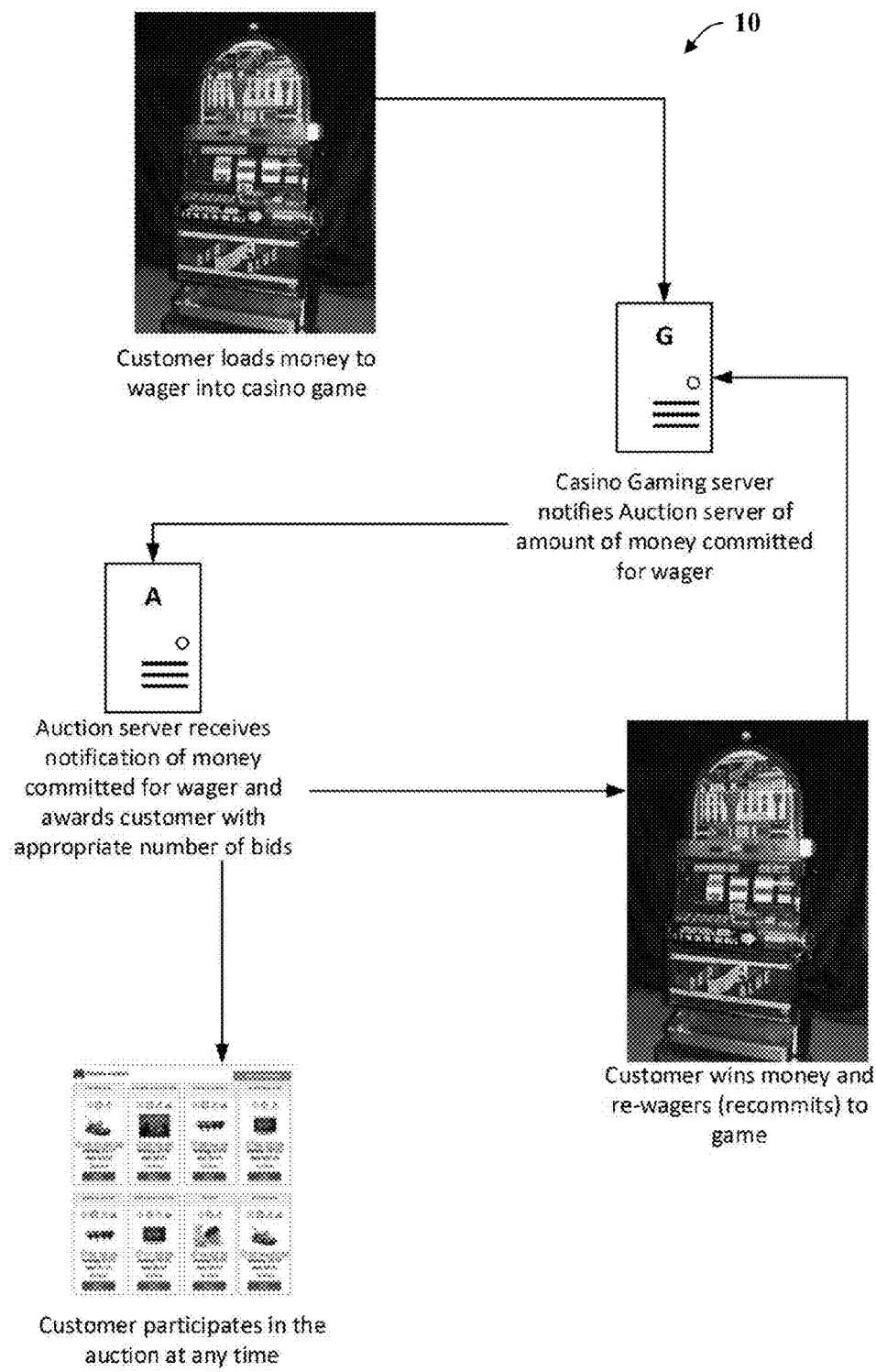
Figure 26:
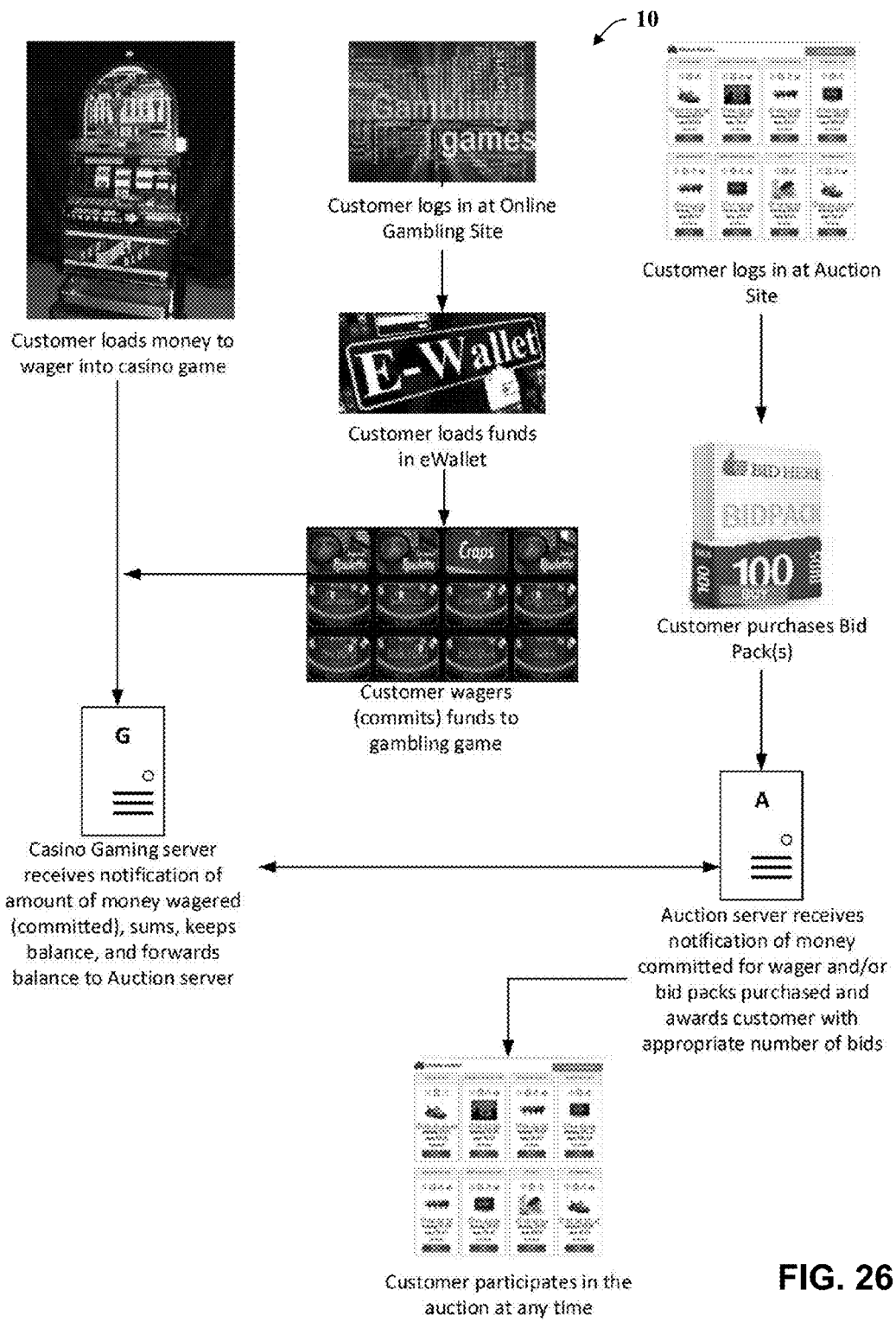

Referring to FIGS. 24-26, in another embodiment, the system 10 allows the player to log onto an online gambling website, load a digital e-wallet with funds for use in wagering on a game, and select a wagering game. The gaming controller 138 notifies the auction controller 136 of the amount of money committed to wagering on the games. The auction controller 136 receives the notification and awards the customer/player an amount of bid units for use in an auction. In one embodiment, the player loads money into a gaming machine 134 for use in playing casino wagering games. The gaming controller 138 notifies the auction controller 136 of the amount deposited in the gaming machine 134, and the auction controller 136 responsively awards the player an amount of bid units.

Figure 27:
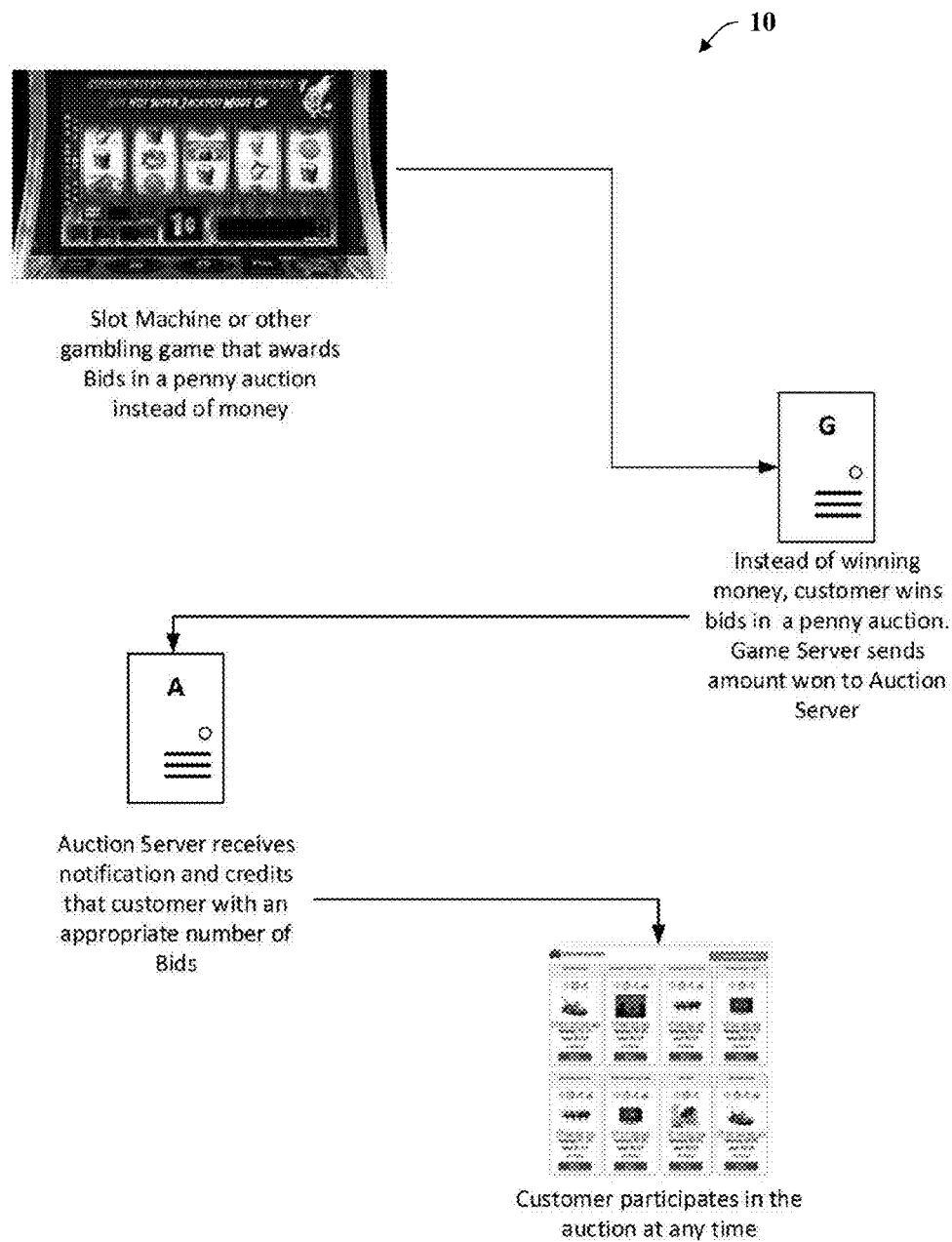
Figure 28:
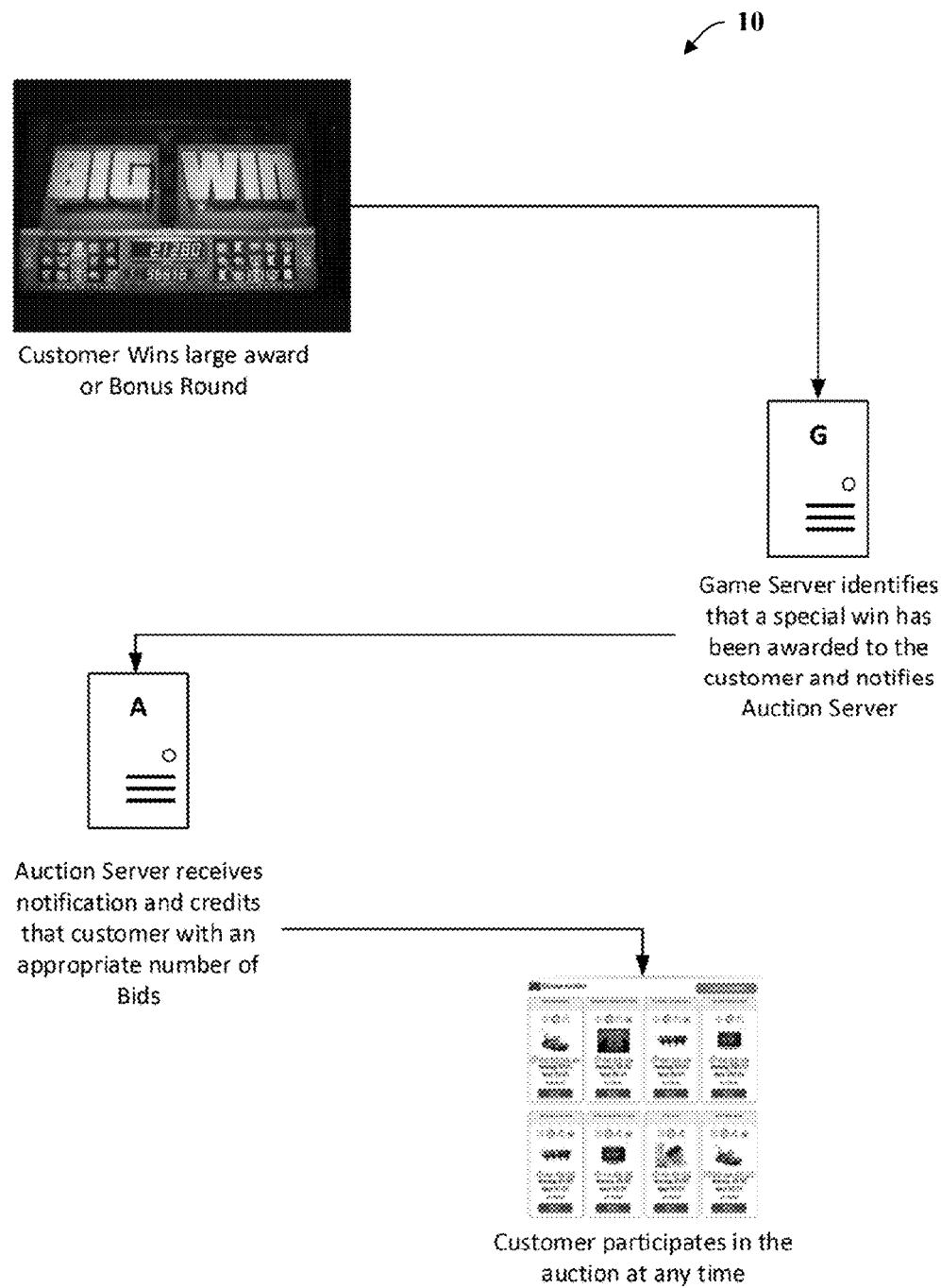

Referring to FIGS. 27 and 28, in one embodiment, the gaming machine 134 may provide an award including an amount of bid units that is determined as a function of the outcome of the game. The gaming controller 138 sends a notification of the award to the auction controller 136 which responsively credits the players account with the corresponding amount of bid units. In one embodiment, the gaming machine 134 may award an amount of bid units as a bonus round award.

Figure 29:
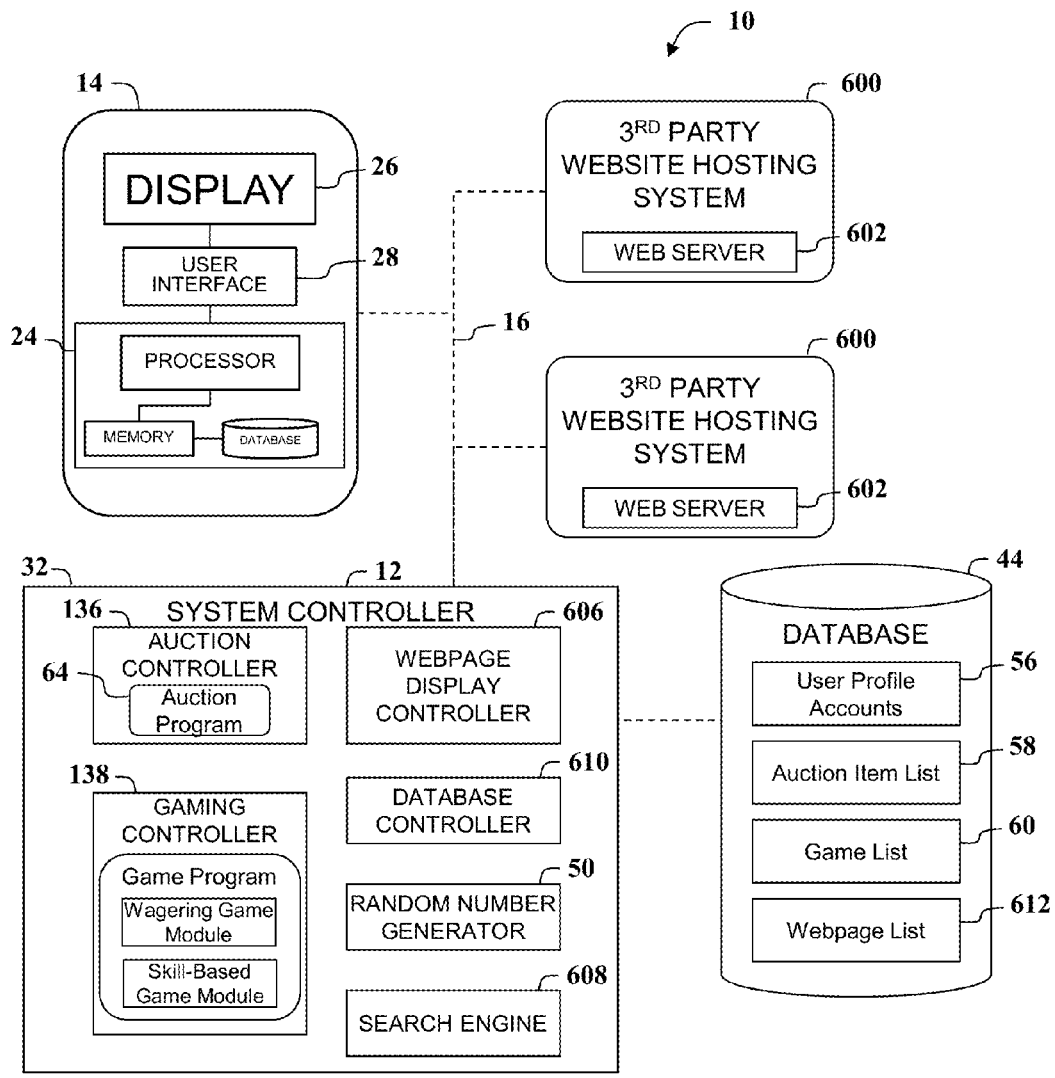
FIG. 29 is a schematic illustration of the system shown in FIG. 1, according to an embodiment of the present invention.
Figure 30:
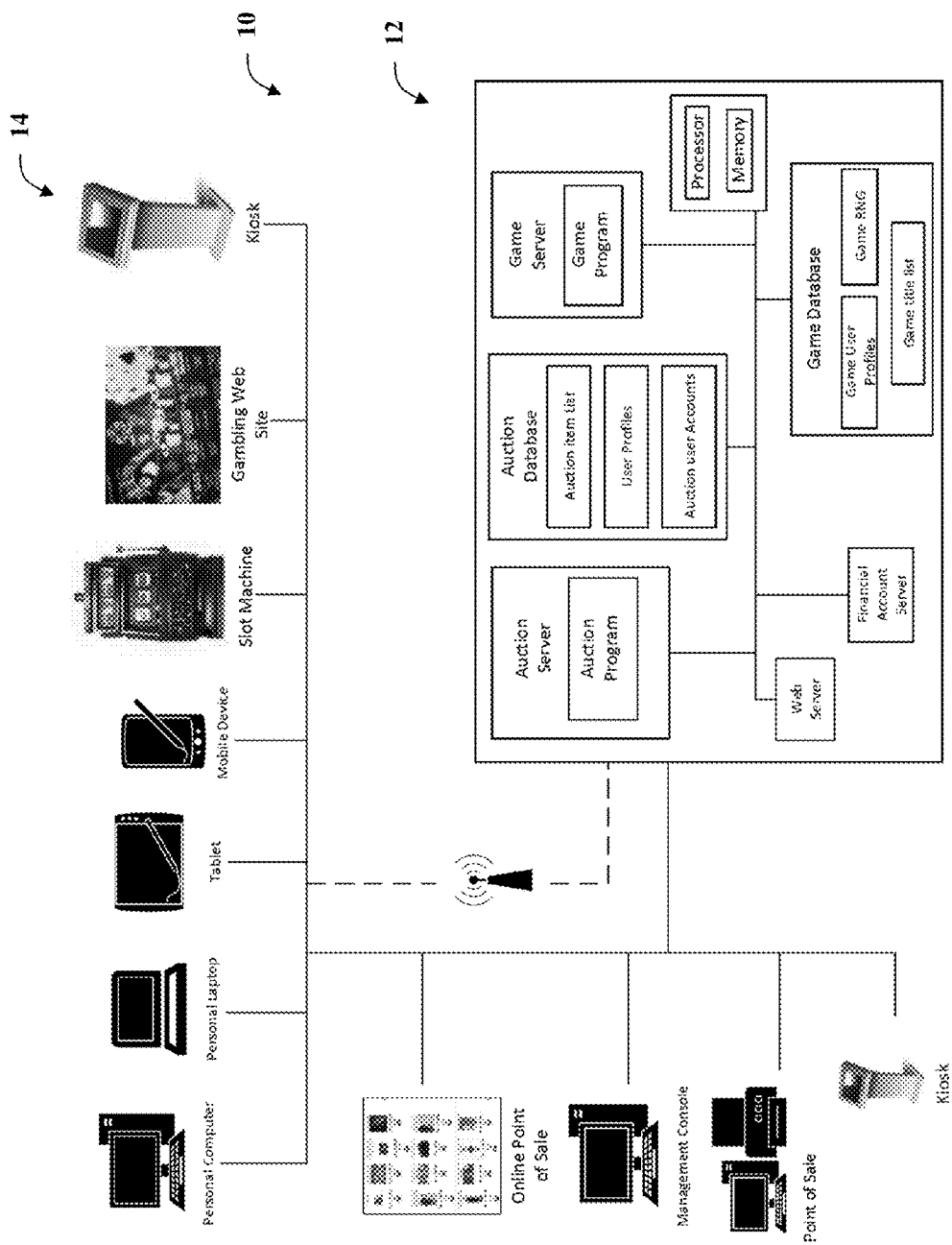
FIG. 30 is another schematic illustration of the system shown in FIG. 1, according to an embodiment of the present invention.
Figure 38:
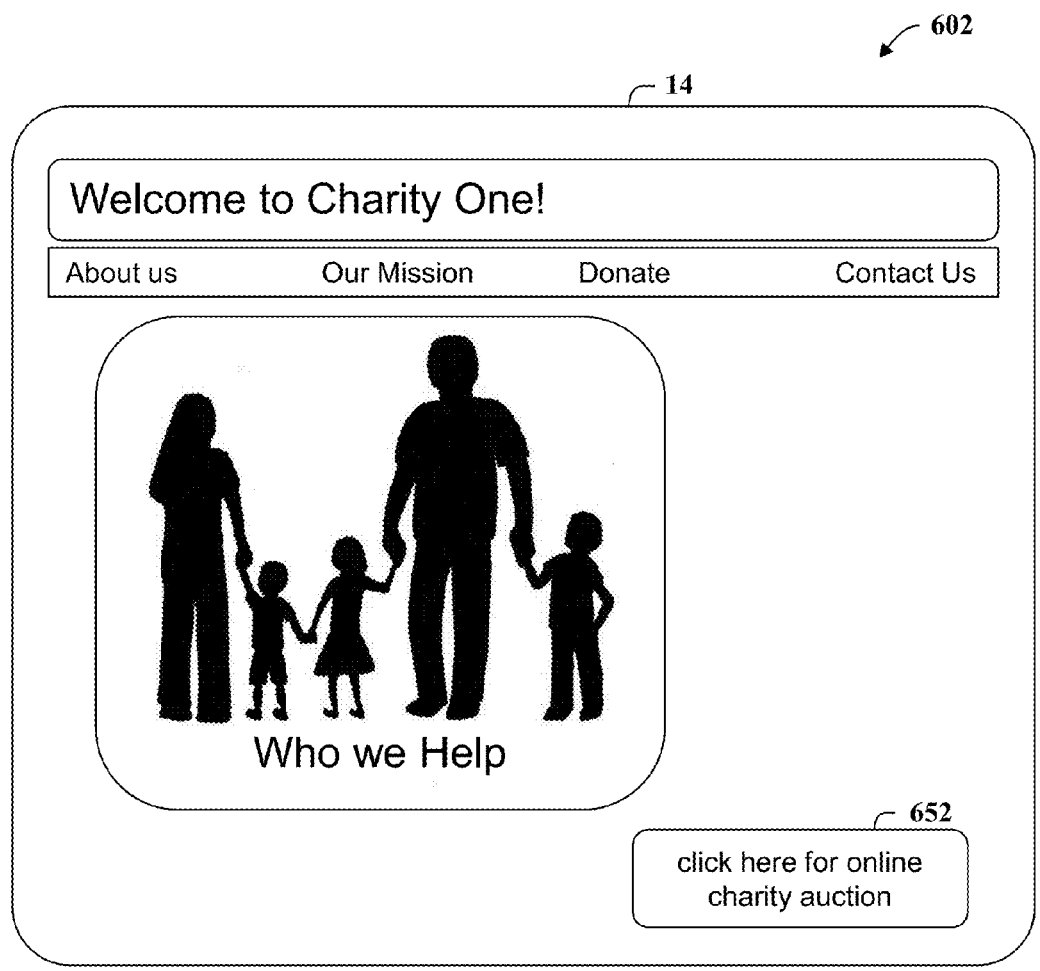
FIGS. 38-40 are exemplary screenshots from the system of FIGS. 1, 13, 17-21, 29, and 30, according to an embodiment of the present invention.

Referring to FIGS. 29 and 30, in one embodiment the system 10 includes a networked computer system that includes a plurality of 3rd party website hosting systems 600 that are coupled to the computer server 12 via the communications network 16. Each $3^{rd}$ party website hosting system 600 includes a computer system having a web server 602 that is configured to generate and display one or more host webpages 604 (shown in FIG. 38) on one or more user computing devices 14 via a web browser associated with the corresponding user computing device 14. As shown in FIG. 30, in one embodiment, the user computing device 14 may include, but is not limited to, a personal computer, a laptop computer, a tablet, a mobile communications device, a slot machine, a kiosk, a management console workstation, and/or a point of sale terminal.

In the illustrated embodiment, each $3^{rd}$ party system web server 602 is configured to host a website that is accessible by a user via one or more user computing devices 14. The web server 602 retrieves and stores web pages associated with one or more websites in response to requests received by the user via the user computing device 14 to allow users to interact with the website. For example, in one embodiment, the web server 602 receives a request from one or more user computing devices 14 to display one or more web pages 38 associated with a website hosted by the $3^{rd}$ party system web server 602, and retrieves and displays the requested web pages on a corresponding user computing device 14. In one embodiment, the website may include an e-commerce website that enables a consumer to view and purchase and/or order various goods and services from one or more merchants via the website. In other embodiments, the website may be a search engine website, an informational website, a blog, a company website, a forum website, a social-networking website, and/or any suitable type of website that may be accessed by a user.

In the illustrated embodiment, the computer server 12 includes the system controller 32 including the auction controller 136, the gaming controller 138, the RNG 50, a webpage display controller 606, a search engine 608, and a database controller 610 that is coupled to the database 44.

The database controller 610 may be programmed to perform some or all of the functions of the database server 42 and includes a memory device that is connected to the database 44 to retrieve and store information contained in the database 44. For example, in one embodiment, the database 44 may include the user profile account program 56, the auction item list 58, the game list 60, and/or a webpage list 612. In the illustrated embodiment, the auction item list 58 includes a plurality of auction item data records 614 (shown in FIG. 37) associated with a plurality if auction items 66 for use during the online auction.

Each auction item data record 614 may include an auction item identifier 616, an item description 618 including information associated with the corresponding auction item 66, an auction value 620 including information associated with a monetary value of the corresponding auction item 66, and a bid unit value 622 associated with the corresponding auction item 66. The bid unit value 622 indicates the value of the bid unit that may be required to place a bid on the corresponding auction item 66 during an online auction.

The game list 60 may include a plurality of game records 624 (shown in FIG. 36) for use by the game program to generate and display wagering games and/or skill-based games. Each game record 624 may include a game identifier 626, a game title 628, a game file 630 including information and data for use in generating and displaying the corresponding game, a difficulty level 632 associated with the corresponding game, and an auction item value 634 that is associated with the difficulty level 632 of the corresponding game. For example, in one embodiment, the auction item value 634 may include a range of monetary values associated with the auction items 66. For example, in one embodiment, each game record 624 may include game data including information associated with a corresponding skill-based game, a difficulty level of the corresponding skill-based game, and an auction item value associated with the corresponding skill-based game.

The user profile account program 56 may include a plurality of user profile account records 636 (shown in FIG. 35). Each user profile account record 636 may include a user identifier 638 and corresponding authentication information 640 such as, for example, a username and/or password that may be used to identify and authenticate a user and/or user account. In addition, each user profile account records 636 may also include game information 642 associated with games that have been played by the corresponding user including, but not limited to, a number of games played by the user, a number of games having winning outcomes, and/or a number of games having non-winning outcomes.

The webpage list 612 includes a plurality of host webpage data records 644 associated with host webpages 602 being displayed by the 3rd party website hosting systems 600. Each host webpage data record 644 may include a host webpage identifier 646 associated with a host webpage 602 and visual webpage design elements 648 associated with the corresponding host webpage 602. For example, in one embodiment, the visual webpage design elements 648 may include text files, images files, and image/text orientation data for use in generating webpages that are similar to the corresponding host webpages 602.

Figure 39:

In the illustrated embodiment, the webpage display controller 606 is programmed to perform some or all of the functions of the web server 34. For example, the webpage display controller 606 is configured to host an online auction webpage 650 (shown in FIGS. 39 and 40) that is accessible by a user via one or more user computing devices 14. The webpage display controller 606 retrieves and generates online auction webpages 650 using information contained in webpage list 612 stored in the database 44 and information and data provided by the auction controller 136. In the illustrated embodiment, the webpage display controller 606 is programmed to generate an online auction webpage 650 that is visually similar to a $3^{rd}$ party host webpage 602 to display an online auction to the user such that the user perceives that the online auction is being provided by the $3^{rd}$ party host webpage.

For example, in one embodiment, the 3rd party website hosting system 600 may display a $3^{rd}$ party host webpage 602 (shown in FIG. 38) on a user computing device 14 via an associated web browser. The $3^{rd}$ party host webpage 602 may be displayed with a hyperlink 652 including information for use in generating the online auction webpage 650. For example, in one embodiment, the hyperlink 652 may including information that enables the corresponding web browser to identify the system 10 and communicate with the webpage display controller 606 to allow the system 10 to generate and display the online auction webpage 650 on the user computing device 14 via the corresponding web browser. In addition, the hyperlink 652 may including information for use in identifying the $3^{rd}$ party host webpage 602.

For example, in one embodiment, the user may access the hyperlink 652 via the web browser to cause the corresponding user computing device 14 to transmit information to the system 10 including an auction webpage URL link. The webpage display controller 606 may be programmed to receive from the web browser of the user computing device 14 a participation request including a signal indicating activation of the auction webpage link being displayed in the $3^{rd}$ party host webpage 602 including a host webpage identifier 646. Upon receiving the participation request, the webpage display controller 606 may access the webpage list being stored in the database 44, determine a host webpage data record 644 associated with the received host webpage identifier 646, and retrieve the visual webpage design elements included with the determined host webpage data record 644. The webpage display controller 606 may also retrieve information from the auction item list 58 and communicate with the auction controller 136 to display an online auction including generating and displaying an online auction webpage 650 on the user computing device 14 via the web browser that is visually similar to the $3^{rd}$ party host webpage 602. For example, referring to FIG. 39, in one embodiment, the webpage display controller 606 generates the online auction webpage 650 including host webpage area 654 including the retrieved visual webpage design elements associated with the host webpage 602 and an auction area 656 including a plurality of auction items 66 for use during an online auction. By generating the online auction webpage 650 including visual design elements that are similar to the $3^{rd}$ party host webpage 602, the user may perceive that the online auction is being hosted and provided by the corresponding 3rd party website hosting system 600.

In the illustrated embodiment, the auction controller 136 includes the auction program 64 and is configured to display and conduct an on-line "penny auction" via the online auction webpage 650, including allowing the user to place a bid on auction items 66 using bid units to increase the total bid price by the value of the bid unit. The auction controller 136 retrieves information associated with each auction item 66 from the database 44, receives a user bid request from a user computing device 14 updates the bid information associated with corresponding auction item 66.

In one embodiment, the webpage display controller 606 may display the online auction webpage 650 including an auction item search input area 658 for receiving search queries from the user. For example, the webpage display controller 606 may receive one or more auction item search terms from the user and transmit the search terms to the search engine 608. In the illustrated embodiment, the search engine 608 is configured to receive an auction item search request from the webpage display controller 606 including one or more search terms, and generate search data including a plurality of auction item records 614 as a function of the search terms. For example, in one embodiment, the search engine 608 may initiate a search algorithm based on a Boolean model to search auction item records contained in the auction item list 58 based search terms received from the user. The search engine 608 may generate search data including auction item records 614 matching the search criteria, and generate a relevance score associated with each auction item record 614 included in the search data. The search engine 608 may also generate a auction item list as a function of the relevance scores associated with each auction item record 614 and transmits the auction item list to the auction controller 136 and/or the webpage display controller 606 for use in displaying the corresponding auction items 66 to the user via the online auction webpage 650.

Figure 33:
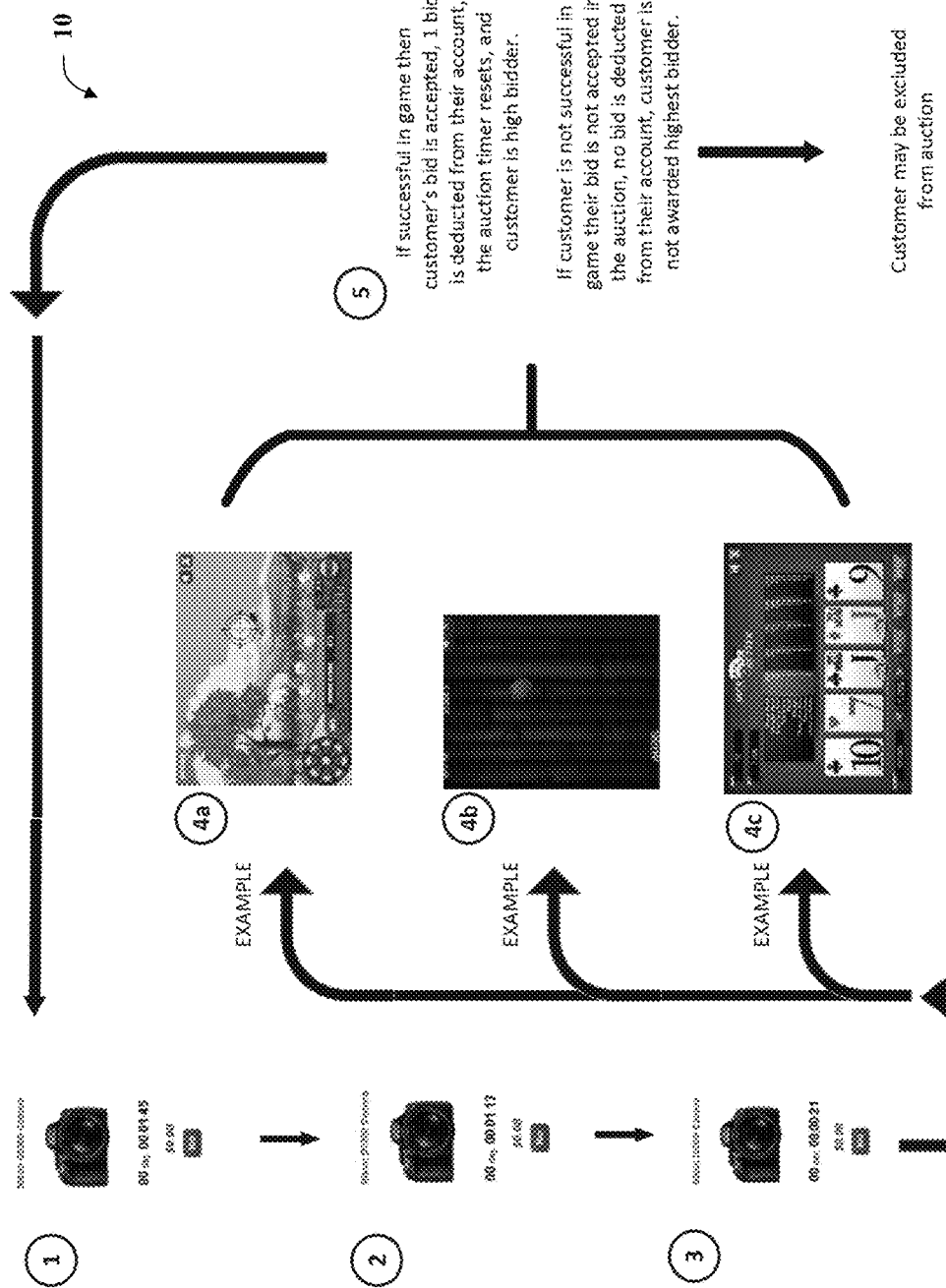
FIG. 33 is a functional diagram of the system shown in FIGS. 29 and 30, according to an embodiment of the present invention.

In the illustrated embodiment, the gaming controller 138 includes a skill-based game module that is programmed to generate skill-based games 112 (shown in FIGS. 10, 33, and 40) for use in conducting the online auction. For example, in one embodiment, the gaming controller 138 may display the skill-based game 112 to the user upon receiving the request from the user to place a bid on an auction item, and determine whether to place the corresponding bid based on the outcome of the skill-based game 112. In some embodiments, the simulated skill-based game 112 may include any game that allows the player to affect the outcome of the skill-based game through a series of player choices and/or player selections. The skill-based game may also include a player skill component associated with the player's selection that may include physical or manual dexterity, digital dexterity, hand-eye coordination (e.g., aim), reflexes, memory, cognitive processing, knowledge, and/or strategy-based selection. Skill-based games may include, but are not limited to including, target shooting games, catapult-type games, sporting games, memory games, matching games, and/or any suitable game that includes a skill component and that enables the outcome of the game to be at least partially determined based on a players selection.

In one embodiment, the game program may also include a wagering game module that is programmed to generate and display simulated wagering games to the user using the RNG 50. For example, the system controller 32 may randomly generate an outcome of a simulated casino-type game 62 (shown in FIG. 5-7) and determine whether to place the corresponding bid based on the outcome of the simulated casino-type game 62.

In the illustrated embodiment, the computer server 12 is configured to receive from a web browser of a user computing device 14 a participation request that includes a signal indicating activation of an auction webpage link being displayed in a host webpage 602. For example, in one embodiment, the computer server 12 may receive a signal indicating the user accessing the hyperlink 652 being displayed on the 3$^{rd}$ party host webpage 602. The computer server 12 receives the participation request including the signal including a host webpage identifier and accesses the webpage list 612 contained in the database 44 and determines a host webpage data record 644 associated with the received host webpage identifier 646. The computer server 12 than retrieves the visual webpage design elements included with the determined host webpage data record 644 and generates an auction webpage 650 for use in implementing the online auction. The computer server 12 displays the online auction including generating and displaying the auction webpage 650 on the user computing device 14 via the web browser. The auction webpage 650 is displayed with the retrieved visual webpage design elements associated with the host webpage 602 so that the auction webpage 650 is visually similar to the host webpage 602. The computer server 12 also retries a plurality of auction items 66 from the auction item list 58 and displays the auction items 66 in the auction area 656 of the auction webpage 650.

In one embodiment, the computer server 12 is programmed to receive participation requests from a plurality of user computing devices 14, determine a number of users associated with the received participation requests, and initiate the online auction if the determined number of users associated with the received participation requests is greater than a predefined number of users. For each of the users, the computer server 12 may generate a plurality of auction webpages 650 based on the number of host webpages 602 being used to access the system 10 so that each user is provided with an auction webpage 650 that is visually similar to the corresponding host webpage 602 used to access the online auction.

In the illustrated embodiment, during implementation of the online auction, the computer server 12 allows user to place bids on auction items 66 during a corresponding bidding period. At the conclusion of the bid period, the computer server 12 determines the user having the highest bid and awards the corresponding auction item to the user having the highest bid at the end of the corresponding bidding period. In one embodiment, the computer server 12 may extend the bidding period a predefined time increment if a bid is received within a predefined elapsed time period prior to the conclusion of the bidding period. For example, the computer server 12 may establish a bidding period equal to about 2 minutes and extend the bidding period an additional 20 seconds if a bid is received within 10 seconds from the lapse of the original bidding period.

In the illustrated embodiment, the computer server 12 may require the user to complete a skill-based game before placing a bid on an auction item. For example, the computer server 12 may receive from the web browser a signal indicating a bid request from the user including a selected auction item 66 and a bid unit. In response to receiving the bid request, the computer server 12 is programmed to generate and display a skill-based game 112 (shown in FIG. 40) to the user via the auction webpage 650 being displayed on the user computing device 14 in response to the received bid request. The user is then required to play the skill-game using various skill inputs using the user computing device 14. The computer server 12 receives the skill input from the user and determines an outcome of the skill-based game 112 as a function of the received skill input, and determines whether to generate the bid associated with the bid request as a function of the outcome of the skill-based game 112. In one embodiment, the computer server 12 may be programmed to generate a bid associated with the received bid request if the outcome of the skill-based game is a winning outcome. The winning outcome may include obtaining a predefined score value, completing one or more skill-based tasks, and/or any suitable measure of skill that may be associated with the skill-based game. For example, the computer server 12 may be programmed to determine a score value associated with outcome of the skill-based game 112 and generate the bid associated with the received bid request if the determined score value is greater than a predefined score value. The computer server 12 may also be programmed to provide one or more bid units to the user as a function of the outcome of the skill-based game 112.

In one embodiment, the computer server 12 may establish a predefined period of time in which to complete the skill-based game 112, and generate the bid associated with the received bid request if the user completes the skill-based game within the predefined period of time. For example, the computer server 12 may require the user to complete the skill-based game 112 prior to the expiration of the corresponding bidding period. In another embodiment, the computer server 12 may initiate the skill-based game 112 only within a predefined elapsed period remaining in the bidding period. For example, upon receiving the bid request, the computer server 12 may determine an amount of time remaining in the bidding period and initiate the skill-based game 112 if the amount of time remaining is equal to, or less than, a predefined period of time. For example, the computer server 12 may initiate the skill-based game 112 if the corresponding bid request is received within 20 seconds of the expiration of the bidding period. In another embodiment, the computer server 12 may initiate the skill-based game 112 if the amount of time remaining in the bidding period is greater than the predefined period of time, e.g., receiving a bid request with more than 20 seconds remaining in the bidding period.

The computer server 12 may also be programmed to determine a monetary value associated with the selected auction item 66 and generate the skill-based game 112 as a function of the determined value of the selected auction item 66. For example, in one embodiment, the computer server 12 may access auction item list 58 to determine a value of the selected auction item 66, access the game list 60 to select a game record 624 associated with the determined value of the selected auction item 66, and generate the skill-based game using the game data and difficulty level associated with the selected game record 624. In another embodiment, the computer server 12 may initiate the skill-based game 112 if the associated value of the selected auction item 66 is greater than, or equal to, a predefined auction item value. The computer server 12 may also increase a difficulty level of the skill-based game 112 being played by the user for each subsequent bid request being issued by the user. For example, in one embodiment, the computer server 12 may receive a subsequent bid request from the user, initiate another skill-based game having an increased level of difficulty, and generate a bid associated with the received subsequent bid request if the outcome of the another skill-based game is a winning outcome.

In the illustrated embodiment, the computer server 12 may update a user profile record 636 associated with the user to include the results of each skill-based game 112 previously played by the user. In one embodiment, upon receiving a bid request from a user, the computer server 12 may access the corresponding user profile record 636 to determine a number of skill-based games previously played by the user and having a corresponding non-winning outcomes. The computer server 12 may also exclude the user from participation in the online auction if the number of skill-based games previously played by the user and having a corresponding non-winning outcome is greater than a predefined number of skill-based games.

During operation of the online auction with a plurality of users, the computer server 12 may also be programmed to receive participation requests from a plurality of users and initiate an instance of the skill-based game for each of the plurality of users. The computer server 12 determines the outcome of each of the corresponding skill-based games, qualify users having winning outcomes for participation in the online auction, and generate and display a graphical representation of qualified users including each user having obtained a winning outcome in each corresponding skill-based game. For example, in one embodiment, the computer server 12 may receive a plurality of bid request corresponding to the same auction item 66, and initiate a qualifying round of games that requires each user to obtain a winning outcome in a skill-based game before being allowed to bid on the selected auction item. As the various users complete the skill-based games, the computer server 12 displays images indicating the qualified users on the auction webpage to notify the users of the number of potential bidders participating the online action.

In some embodiments, if the customer does not successful negotiate the skill game, or achieve a pre-defined score, the customer's bid is disqualified, no bid is placed in the auction, and a bid is not deducted from their bid account. In some embodiments, the auction controller will not begin the auction until a pre-defined number of customers are participating in an auction. In some embodiments, the auction controller will exclude any customers from continuing to participate in a particular auction if they fail to negotiate the skill game, or achieve a qualifying score to place a bona fide bid.

In one embodiment, the auction controller may access the auction item list 58 to determine a value of the selected auction item 66 and start an auction at a pre-defined reserve price. For example, in one embodiment, the computer server 12 may access the auction item list 58 to determine a value of the selected auction item 66, determine a reserve price as a function of the corresponding auction item value, and start the auction at the determined reserve price. In addition, the auction controller 136 may offer bids for sale at different bid values including higher or lower prices. The bids purchased at higher or lower prices could be used to bid on products of higher or lower values. For example, the auction controller 136 access the auction item list 58 to determine a bid unit value 622 that is associated with a selection auction item 66, and require corresponding bid requests to include bids having a value equal to the determined bid unit value.

In one embodiment, the auction controller 136 may offer different priced bids to be used in the various auctions. For example, more costly bids may be used to bid upon more costly auction items, and less costly bids may be used to bid on less costly auction items.

In some embodiments, the auction controller 136 may present a graphical representation of the customers who are still qualified to compete in an auction and data regarding their placement, game history, win/loss record, position, and/or or score. In some embodiments, the gaming controller 138 may successively increase the difficulty of the skill game presentations in an auction. In some embodiments, the auction controller will successively decrease the amount of time in which a customer may successfully negotiate a skill game. In some embodiments the game controller will increase or decrease a qualifying score that a customer must achieve in a skill game to place a bona fide bid. In some embodiments the auction controller will change or alternate the skill game which customers must successfully negotiate to place a bona fide bid. In some embodiments, the auction controller may award a prize, award, or prizes to customers who successfully negotiate a skill game at any point in the auction. For example, as a bonus.

In one or more embodiments, the auction controller 136 may award a prize, award, or prizes to customers who do not successfully negotiate a skill game at any point in the auction. For example as a consolation award or prize. In some embodiments, the gaming controller 138 could alternate skill games required to bid in auctions. For example, easier games for smaller valued products and more difficult games for higher valued products. In some embodiments, the auction and skill game could be played on a slot machine or online gambling web site. In some embodiments, the auction and skill game could be played on a stand-alone kiosk or gaming computer terminal. In some embodiments, the auction and skill game could be played on a customer's personal computer, laptop, tablet, or smart phone. In some embodiments, the customer may be awarded bid units to participate in auctions as an award or prize for other activities, such as making a pre-defined level of purchase, attaining a predefined score level in a skill game, attaining a predefined level of advancement in a skill game, winning a pre-defined number of skill games, or auctions.

In one embodiment, the system 10 implements a method of conducting an auction. The method includes receiving a first bid unit purchase request from a user and responsively generating at least one initial bid unit for bidding on one or more auction items displayed in the auction. The at least one bid unit is qualified as a bone fide bid in the auction after the user successfully completes a game of skill.

Figure 31:
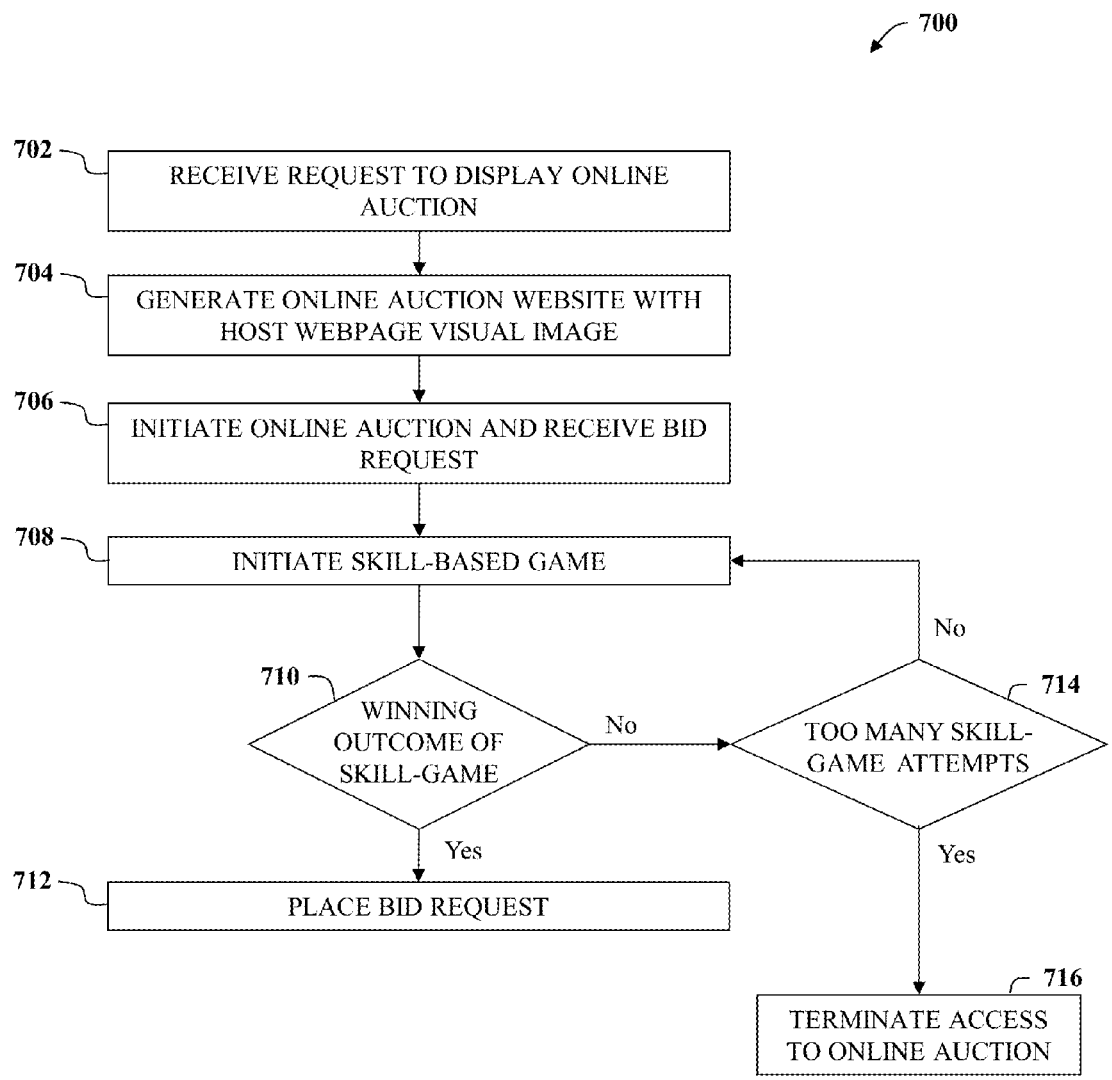
FIGS. 31 and 32 are flowcharts of methods that may be used with the system shown in FIGS. 29 and 30, according to an embodiment of the present invention.
Figure 32:
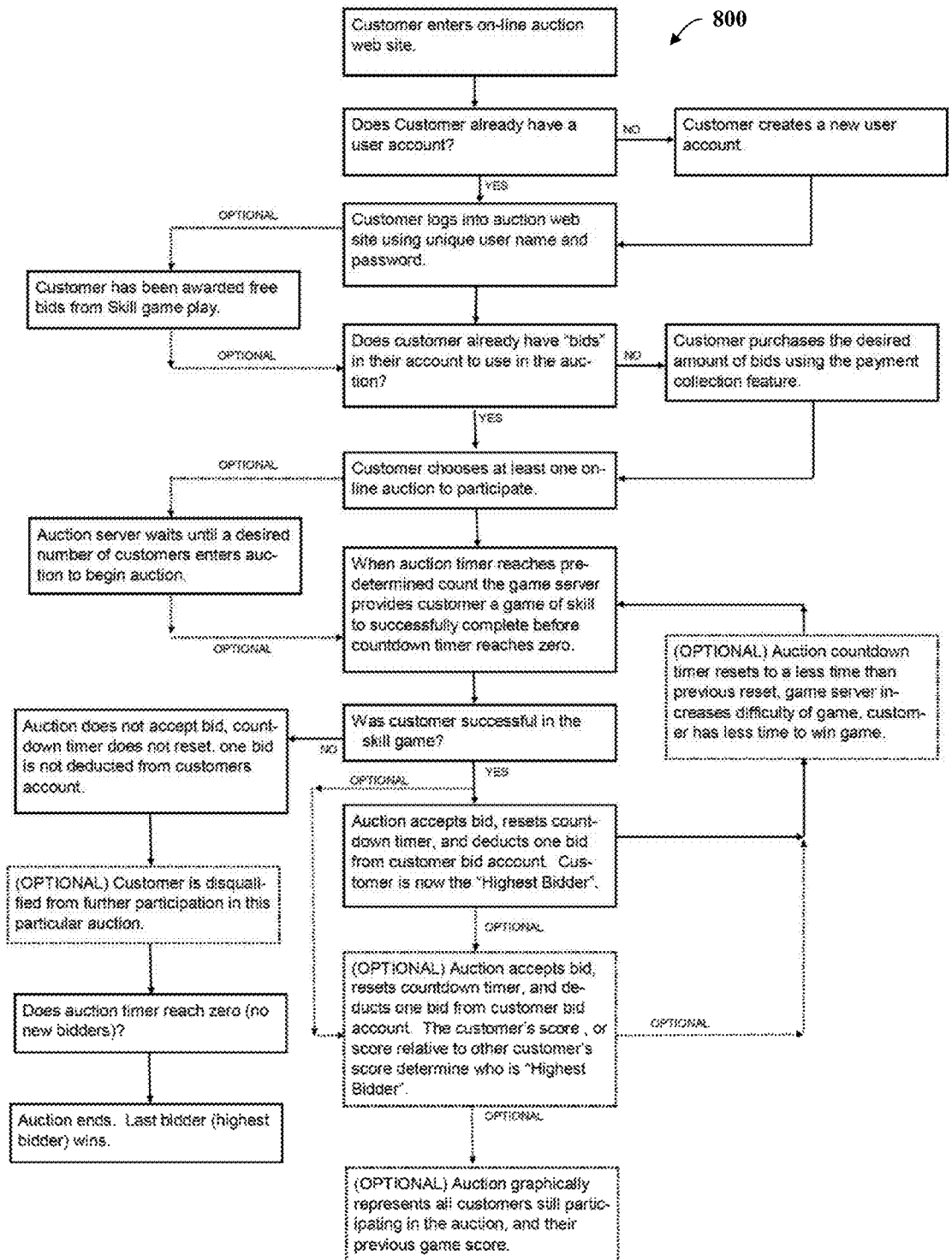

FIGS. 31 and 32 are flowcharts of methods 700 and 800 that may be used for operating the networked computer system 10 to provide an online auction webpage to a user via a user computing device 14. The method 700 and 800 include a plurality of steps. Each method step may be performed independently of, or in combination with, other method steps. Portions of the methods 700 and 800 may be performed by any one of, or any combination of, the components of the system 10.

Referring to FIG. 31, in the illustrated embodiment, in method step 702, the system controller 32 receives a request from a user to display an online auction. For example, in one embodiment, the system controller 32 may receive from a web browser of a user computing device 14 a participation request including a signal indicating activation of an auction webpage link being displayed in a host webpage 602. The host webpage 602 may be displayed by a 3rd party website hosting system 600 and the signal may include a host webpage identifier 646 associated with the host webpage 602.

In method step 704, upon receiving the participation request, the system controller 32 generates an online auction webpage 650 with visual images associated with the host webpage 602 so that the auction webpage 650 includes visual elements that are similar to visual elements being displayed on the host webpage 602. The system controller 32 accesses the database 44 including a webpage list 612 including a plurality of host webpage data records 644, determines a host webpage data record associated with the received host webpage identifier, and retrieves the visual webpage design elements included with the determined host webpage data record. The system controller 32 also accesses the auction list including a plurality of auction items and displays the online auction including generating and displaying the auction webpage 650 on the user computing device 14 via the web browser. The auction webpage includes the retrieved visual webpage design elements associated with the host webpage and a plurality of auction items.

In method step 706, the system controller 32 initiates the online auction and receives a bid request from the user via the auction webpage 650. For example, the system controller 32 may receive from the web browser a signal indicating a bid request from the user including a selected auction item and a bid unit.

Figure 40:
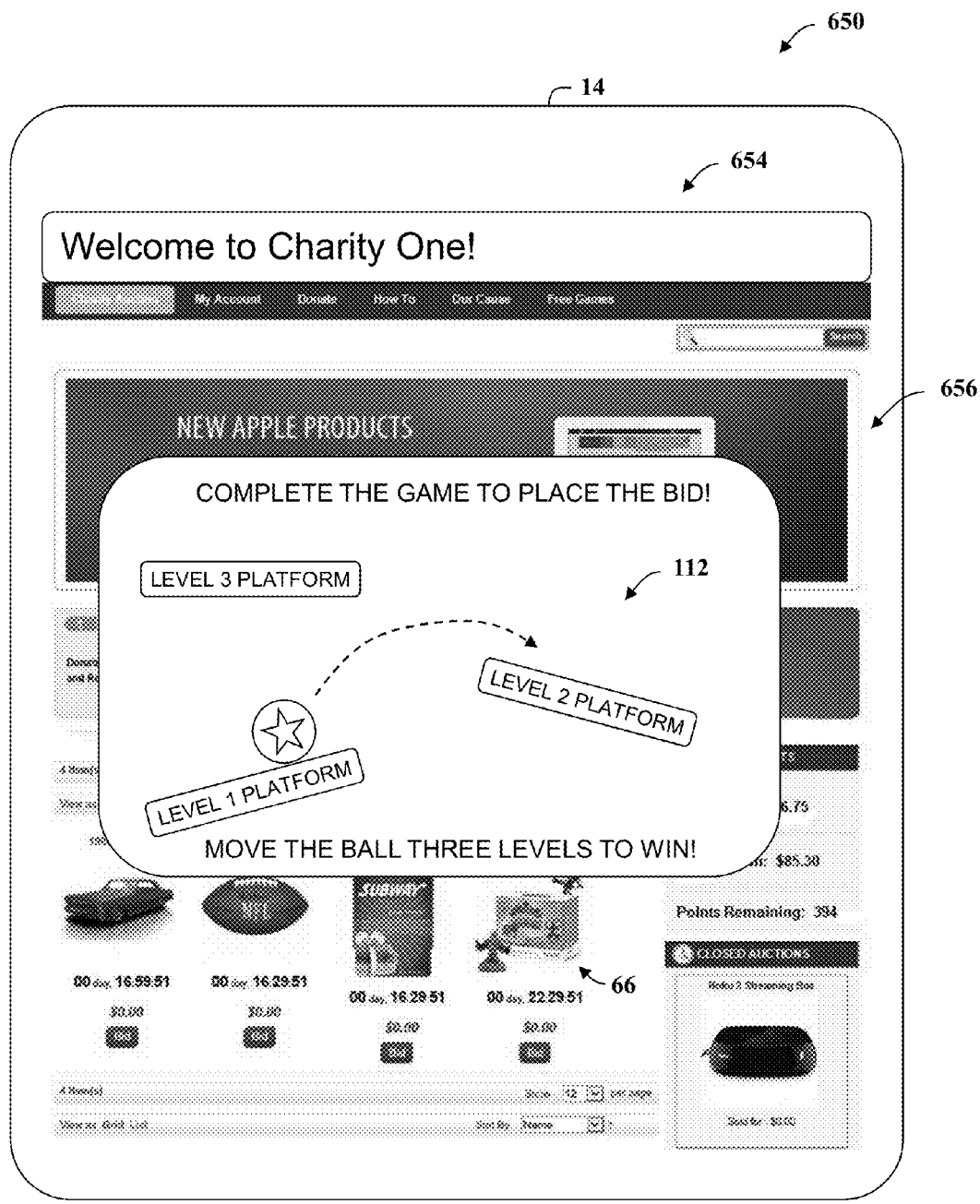

In method step 708, upon receipt of the bid request, the system controller 32 initiates a skill-game to be played by the user prior to placing a bid on the selected auction item. The system controller 32 generates and displays a skill-based game 112 to the user via the user computing device in response to the received bid request. In one embodiment, the system controller 32 may display the skill-based game on the auction website 650 (as shown in FIG. 40). In another embodiment, the system controller 32 may generate and display a separate webpage including the skill-based game. The system controller 32 then receives a skill input from the user and determines an outcome of the skill-based game as a function of the received skill input.

In method step 710, the system controller 32 determines whether the outcome of the skill-based game is a winning outcome. If the system controller 32 determines that the outcome is a winning outcome, the system controller 32 initiates method step 712.

In method step 712, the system controller 32 places a bid on the selected auction item 66 corresponding to the received bid request.

If the system controller 32 determines that the outcome of the skill-based game is not a winning outcome, the system controller 32 initiates method step 714 and determines a number of games previously played by the user and determines a number of non-winning outcomes. For example, in one embodiment, the system controller 32 may update a corresponding user profile record to include the outcome of the current skill-based game, and determine a number of total skill-based games played by the user and the corresponding number of non-winning outcomes.

In method step 714, the system controller 32 determines the number of skill-games that have been played by the user and included a non-winning outcome. If the number of non-winning outcomes and/or the number of games played is greater than, or equal to, a predefined number of attempts, the system controller 32 initiates method step 716 and terminates access to the online auction to the corresponding user. If the system controller 32 determines that the number of non-winning outcomes and/or the number games played is less than the predefined number of attempts, the system controller 32 initiates method step 708 and initiates another skill-based game and/or allows the user to place another bid request on the selected auction item and/or another auction item.

Referring to FIG. 32, in one embodiment the system 10 may initiate method 800. For example, during method 800, the system controller 32 receives a signal indicating the user accessing the auction website and determines whether the user has an existing user account. If the user does not have an existing account, the system controller 32 may require the user to establish a user profile account before initiating the online auction. If the system controller 32 determines that the user has a current user account, the system controller 32 prompts the user to log into the auction website using a unique user name and password. In one embodiment, the system controller 32 may allow the user to play a skill-based game and provide the user with an amount of bid units for use in the online auction based on the outcome of the skill-based game.

In the illustrated embodiment, the system controller 32 determines if the user account already includes bids units for use in the online auction. If the user account includes bid units, the system controller 32 allows the user to select at least one online auction to participate in. If the user account does no include bid units, the system controller 32 prompts the user to purchase bid units using a payment collection feature. In one embodiment, the system controller 32 may delay initiation of the online auction until a predetermined number of users have entered the auction website.

In the illustrated embodiment, the system controller 32 initiates the online auction including receiving a bid request from the user and initiating an auction countdown timer. When the auction timer reaches a predetermined count, the system controller 32 displays a skill-based game to the user to complete before the auction countdown timer reaches zero. If the user successfully competes the skill-based game, the system controller 32 accepts the bid, resets the countdown timer, and deducts on bid from the user's bid account, and establishes the user as being the "Highest Bidder". In one embodiment, the system controller 32 may determine a score of the skill-based game for each of the users participating in the auction, and determine a highest bidder based on the relative scores of each user. For example the system controller 32 may allow several users to play the skill-based games simultaneously and determine the highest bidder to be the user with the highest score in the corresponding skill-based game. In addition, the system controller 32 may display a graphic representation of all the users participating in the auction, and their previous game score. In one embodiment, the system controller 32 may initiate another skill-based game 112 for use in submitting a subsequent bid on a selection auction item. For example, system controller 32 may determining an initial highest bidder using an initial skill-based game, and upon completion of the initial skill-based game, reset the auction countdown timer, increase a difficulty of the skill-based game, and allow the users to complete another skill-based game to obtain the highest bid. The system controller 32 may also reduce the amount of time available to compete the skill-based game.

If the user does not successfully complete the skill-based game, the system controller 32 does not accept the bid request, does not reset the countdown timer, and does not deduct the bid from the corresponding user account. In one embodiment, the system controller 32 may disqualify the user from further participation in the current auction. The system controller 32 determines if the auction countdown timer has reached zero, determines the user associated with the last bid, and awards the auction item to the user having the last bid.

In one embodiment, the system 10 may implement a process that allows a customer to use a physical point of sale or electronic point of sale system to buy auction bids for a penny auction or reserved price auction, or alternatively, the customer logs into a penny auction or reserved price auction web site and purchases bids using an internet or local network enabled device, such as a smart phone, tablet, or PC.

In one embodiment, the customer sits at a computer station, game machine, or customer interface device and identifies themselves to the auction as a customer by entering a PIN, password, using a magnetic card, or some other identification process or device, or alternatively the customer uses their own internet or a local network enabled device to log in to the auction. The customer may also be automatically logged in to an associated "game engine", or game engines, as a result of logging into the auction, or identifying themselves as a customer to the auction at a computer station, game machine, game terminal, or customer interface device. As a result of the aforementioned purchase of the auction bids, or as a result of performing a positive action such as daily account activity, replying to a text message, referring a new customer, earning reward points, etc., the customer is awarded game pieces, sweepstakes entries, points, or credits, which are not the "bids" that were purchased and are separate from the "bids".

The customer chooses one or more products to bid on at the auction in an effort to win a product or products. The customer clicks on the "Bid" Button for the auction. The normal process occurs for the auction—one bid is deducted from their bid account and, the auction timer resets and the auction price is incremented, or the auction price is incremented, that customer is now the highest bidder. Also, when the bid button is selected by the customer the auction engine communicates with at least one game engine.

This model may incorporate a sweepstakes game engine, an RNG game engine, a game of skill game engine, or a combination of all three game engines. If this model is incorporating a sweepstakes game engine, then the auction engine directs the sweepstakes game engine to perform an instant reveal game and reveal at least one sweepstakes entry value from the sweepstakes entry database. The auction engine displays the corresponding amount of that entry or entries on the auction screen for the customer to view. One game piece, sweepstakes entry, point, or credit is deducted from the customer's account. That entry value(s) from the sweepstakes game is discarded and will not be used again. The game engine stores all game plays and results in the game engine database If this model is incorporating an RNG game engine, then the auction engine directs the RNG game engine to produce one randomly generated game result as the winning value of the game for that customer. The auction engine displays the corresponding amount of that value on the auction page for the customer to view. One game piece, point, or credit is deducted from the customer's account. The game engine stores all plays and results in the game engine database.

If this model is incorporating a skill game engine, then the auction engine directs the skill game to begin the game of skill which the customer views and plays on the auction screen and plays the game of skill until completed. A randomly generated or pre-determined value for the successful completion of the game of skill, or the score achieved in the game of skill may be used as the "win" result of the game. The auction engine displays the corresponding amount of that winning value on the auction page for the customer to view. If the customer did not successfully negotiate the skill game, then the win amount may be "zero". One game piece, point, or credit is deducted from the customer's account. If the customer did not successfully negotiate the skill game, a game piece, point, or credit may or may not be deducted from customer's account. The game engine stores all plays in the game engine database. The auction engine may use the successful negotiation of the skill game by the player to be a qualifier for the customer to be able to continue to bid in that particular auction.

In all three scenario's, the result from the instant sweepstakes game, RNG game, or game of skill, is displayed on the auction page and the "total won" amount which is the accumulated amount won from each game is also displayed on the auction screen. Both amounts are stored by the auction engine in the auction database. The number of game pieces, sweepstakes entries, points, or credits is stored in the auction database.

As customer continues to use their bids in the auction their accumulated total of amount win in the games will grow. The auction will provide a function where the customer can use their accumulated game winnings to purchase more bids, redeem/cash out their winnings, or use their winnings to purchase a product.

A penny auction or reserved price auction system with variable bid prices. This method may be used with or without an associated game. The game may or may not include variable levels of game play bases on the purchase level of the associated bids.

Feature 1: Auction products may be divided into groups. The groups may or may not be determined by retail price, for example:

Product retail price $10 to $50=Tier 1
Product retail price $51 to $100=Tier 2
Product retail price $101 to $250=Tier 3
Product retail price $251 to $500=Tier 4
Product retail price $501 to $1,000=Tier 5

Feature 2: The cost of the bid which is used to place a bid in the auction may be divided into groups. For example:

Bids for a Tier 1 product may cost $0.10 each
Bids for a Tier 2 product may cost $0.25 each
Bids for a Tier 3 product may cost $0.50 each
Bids for a Tier 4 product may cost $1.00 each
Bids for a Tier 5 product may cost $2.00 each.

Feature 3: The amount of Auction price increase PER BID, may be a fixed amount—such as 1 cent as in a traditional penny auction, or the increase increment amount may vary, for example:

A bid on a Tier 1 product may increment the auction by 1 cent

A bid on a Tier 2 product may increment the auction by 2 cents

A bid on a Tier 3 product may increment the auction by 3 cents

A bid on a Tier 4 product may increment the auction by 4 cents

A bid on a Tier 5 product may increment the auction by 5 cents

Feature 4: Considering the format explained in the email below, where a click on the bid button may also trigger a "game play" of an RNG, Sweepstakes, or Skill game engine, the system as a whole may use the "tier level" of the bid purchase to determine the game level played. For example:

1. A tier 1 product bid purchase may or may not equal a 1 line slot game play;
2. A tier 2 product bid purchase may or may not equal a 2 line slot game play;
3. A tier 3 product bid purchase may or may not equal a 3 line slot game play;
4. A tier 4 product bid purchase may or may not equal a 4 line slot game play;
5. A tier 5 product bid purchase may or may not equal a 5 line slot game play.

Scenario 1: Product Tier level 2; Cost of Bid 20 cents; Auction price increment is 2 cents; Game engine played is a casino slot game engine (although a slot game screen may or may not be displayed). 1. Customer is logged into an auction site, or is otherwise at a computing device with access to an auction; 2. Customer chooses to "load" their auction account with $20.00 in funds which could also be called a credit, or a wallet, or a bid account. These are the funds available to purchase bids: a. Funds may have been pre-loaded on a gift card; b. Funds may have been pre-loaded on some type of rewards card; c. Funds may have been pre-loaded on a casino voucher card or ticket. 3. Customer reviews auction products available and chooses to bid on a "Tier 2" product. 4. Customer clicks on the "Bid Button": a. 20 cents is deducted from the their pre-loaded bid account, wallet, credit, etc., as the purchase of that bid; b. The auction price increments by 2 cents, for example, if the auction price was 12 cents, it is now 14 cents, and this customer is now the highest bidder; c. If this is a penny auction format, the auction timer will reset to a specified value and then continue to count down; and d. The auction engine will then engage the RNG slot game engine and will select the appropriate level of play, for example, to play a 2 line slot game. 5. The RNG slot game engine will return the result of the 2 line slot game play to the auction game engine. 6. The auction game engine will update the auction screen with the results of the game. 7. The auction game engine will compute and display a running "total win" value to display on the auction page. 8. The customer is not satisfied with their auction performance, or game result and reviews the available items for auction again. 9. The customer chooses to bid on a Tier 5 product and clicks the "Bid Button": a. $2 is deducted from the their pre-loaded bid account, wallet, credit, etc.; b. The auction price on this item increments by 5 cents, for example, if the auction price was $1.00, it is now $1.05, and this customer is now the highest bidder; c. If this is a penny auction format, the auction timer will reset to a specified value and then continue to count down; d. The auction engine will then engage the RNG slot game engine and will select the appropriate level of play, for example, to play a 5 line slot game. 10. The RNG slot game engine will return the result of the 5 line slot game play to the auction game engine. 11. The auction game engine will update the auction screen with results of the game. 12. The auction game engine will compute and display a running "total win" value to display on the auction page. 13. The customer, at any time may use the "winnings" of the game to either purchase more bids, cash out, or purchase a product. 14. In some uses, the won auction product may not have to be purchased by the customer at the conclusion of the auction. The product may be awarded to the customer as a prize for winning the auction. 15. In some uses, the customer may receive their unused funds from their wallet back—for use in other games, or other purchases: a. The return of the funds may be in the form of cash, voucher, credit; b. In some instances, there may be restrictions to game play or the use of game winnings in order to receive their unused funds.

The usage with a sweepstakes game engine is similar. The sweepstakes game engine may reveal the results of more than one sweepstakes entry based on the tier level of the bid purchase. The sweepstakes game engine may "play" more than one game per bid and return the results of the multiple game plays as the results of the customer sweepstakes win. This may take place as the customer purchases bids at higher or lower tier levels.

The usage in a skill game format may require the customer to play a higher level, or lower level, of game depending on the Tier level of bid purchased. A higher level or lower level of game may mean that the difficulty of the game may be increased or decreased, the amount of time allowed to participate or complete the game may be increased or decreased, the amount of points or money won for the successful completion on the skill game may be increased or decreased.

The differences between this model and every other penny auction model includes: 1. A customer may purchase a bid as a unique purchase decision on a particular product, whereas in a traditional penny auction a customer is required to purchase a "bid pack" up front, potentially before know what item(s) they will bid on, of if there is an item they wish to bid on. 2. A customer may purchase a lower priced bid in order to bid on lower priced items because they cannot afford to purchase expensive bid packs. 3. A customer's unused funds may be returned. This is not done in penny auctions, as the upfront payment for a "Bid Pack" is seen as a purchase and the purchase is not normally refundable. 4. A customer can make their money last longer by having the choice to bid on less expensive items and over a longer period of time. 5. A customer may use an auction strategy and/or desire to only compete in the auction with customers who are willing to pay for a certain price per bid. For example, a customer may determine that there are potentially fewer bidders to compete against at the Tier 5 level. The customer may therefore desire to compete only at that tier level of products as a potentially winning strategy. With a traditional penny auction, a customer may compete against "all customers, all of the time, on every item". 6. A customer may choose to decrease their spending level as their funds deplete as a strategy to wait for a big game win in order to buy more expensive bids and compete for more expensive products. 7. As a customer chooses to spend more money or less money on a "bid per bid" basis, they can also receive an opportunity to win more or less money.

Exemplary embodiments of a system and method for providing an auction to a player are described above in detail. The system and method are not limited to the specific embodiments described herein, but rather, components of the system and/or steps of the method may be utilized independently and separately from other components and/or steps described herein. For example, the system may also be used in combination with other wagering systems and methods, and is not limited to practice with only the system as described herein. Rather, an exemplary embodiment can be implemented and utilized in connection with many other auction and/or gaming applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system or incorporated in an existing gaming system. The system of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A networked computer system for providing a webpage to a user, comprising:
    a database including a webpage list including a plurality of host webpage data records and an auction list including a plurality of auction items, each host webpage data record including a host webpage identifier associated with a host webpage and visual webpage design elements associated with the corresponding host webpage; and
    a computer server including a processor coupled to a memory device, the processor programmed to:
    receive from a web browser of a user computing device a participation request including a signal indicating activation of an auction webpage link being displayed in a host webpage, the signal including a host webpage identifier;
    access the database, determine a host webpage data record associated with the received host webpage identifier, and retrieve the visual webpage design elements included with the determined host webpage data record;
    display an online auction including generating and displaying an auction webpage on the user computing device via the web browser, the auction webpage including the retrieved visual webpage design elements associated with the host webpage and a plurality of auction items;
    receive from the web browser a bid request from the user including a selected auction item and a bid unit;
    determine a remaining bidding time associated with the selected auction item; and
    upon determining the remaining bidding time is less than a predefined remaining bidding time:
    initiate a skill-based game including:
    access a game list stored in the database and select a game record from the game list including game data associated with a skill-based game; and
    generate and display the skill-based game to the user via the user computing device based on the game data included in the selected game record;
    receive a skill input from the user and determine an outcome of the skill-based game as a function of the received skill input;
    determine a score value associated with outcome of the skill-based game; and
    associate a bid with the selected auction item based on the received bid request if the outcome of the skill-based game is a winning outcome and the determined score value is greater than a predefined score value.

2. A networked computer system in accordance with claim 1, wherein the computer server is programmed to:
    receive participation requests from a plurality of user computing devices;
    determine a number of users associated with the received participation requests; and
    initiate the online auction if the determined number of users associated with the received participation requests is greater than a predefined number of users.

3. A networked computer system in accordance with claim 1, wherein the computer server is programmed to provide one or more bid units to the user as a function of the outcome of the skill-based game.

4. A networked computer system in accordance with claim 1, wherein the computer server is programmed to:
    receive a subsequent bid request from the user;
    initiate another skill-based game having an increased level of difficulty; and
    generate a bid associated with the received subsequent bid request if the outcome of the another skill-based game is a winning outcome.

5. A networked computer system in accordance with claim 1, wherein the computer server is programmed to:
    establish a predefined period of time in which to complete the skill-based game; and
    generate the bid associated with the received bid request if the user completes the skill-based game within the predefined period of time.

6. A networked computer system in accordance with claim 1, wherein the computer server is programmed to:
    receive participation requests from a plurality of users, each of the plurality of users having submitted bid request associated with the selected auction item;
    initiate an instance of the skill-based game for each of the plurality of users; and
    generate and display a graphical representation of qualified users including each user having obtained a winning outcome in each corresponding skill-based game.

7. A networked computer system in accordance with claim 6, wherein the computer server is programmed to:
    determine a score for each of the plurality of users participating in the skill-based game; and
    identify a highest bidder associated with the selected auction item as the user having a highest score associated with the skill-based game.

8. A computer implemented method of operating a networked computer system to provide a webpage to a user, the networked computer system including a database and a computer server including a processor and a memory device, the method including the steps of:
    the processor receiving from a web browser of a user computing device a participation request including a signal indicating activation of an auction webpage link being displayed in a host webpage, the signal including a host webpage identifier;
    the processor accessing the database including a webpage list including a plurality of host webpage data records and an auction list including a plurality of auction items, each host webpage data record including a host webpage identifier associated with a host webpage and visual webpage design elements associated with the corresponding host webpage;
    the processor determining a host webpage data record associated with the received host webpage identifier and retrieving the visual webpage design elements included with the determined host webpage data record;
    the processor displaying an online auction including generating and displaying an auction webpage on the user computing device via the web browser, the auction webpage including the retrieved visual webpage design elements associated with the host webpage and a plurality of auction items;
    the processor receiving from the web browser a bid request from the user including a selected auction item and a bid unit;
    the processor determining a remaining bidding time associated with the selected auction item; and
    upon determining the remaining bidding time is less than a predefined remaining bidding time:

the processor initiating a skill-based game including:

the processor accessing a game list stored in the database and select a game record from the game list including game data associated with a skill-based game; and the processor generating and displaying the skill-based game to the user via the user computing device based on the game data included in the selected game record;

the processor receiving a skill input from the user and determine an outcome of the skill-based game as a function of the received skill input;

the processor determining a score value associated with outcome of the skill-based game; and the processor associating a bid with the selected auction item based on the received bid request if the outcome of the skill-based game is a winning outcome and if the determined score value is greater than a predefined score value.

9. A computer implemented method in accordance with claim 8, including the steps of:

the processor receiving participation requests from a plurality of user computing devices;

the processor determining a number of users associated with the received participation requests; and the processor initiating the online auction if the determined number of users associated with the received participation requests is greater than a predefined number of users.

10. A computer implemented method in accordance with claim 8, including the step of the processor providing one or more bid units to the user as a function of the outcome of the skill-based game.

11. A computer implemented method in accordance with claim 8, including the steps of:

the processor receiving a subsequent bid request from the user;

the processor initiating another skill-based game having an increased level of difficulty; and the processor generating a bid associated with the received subsequent bid request if the outcome of the another skill-based game is a winning outcome.

12. A computer implemented method in accordance with claim 8, including the steps of:

the processor establishing a predefined period of time in which to complete the skill-based game; and the processor generating the bid associated with the received bid request if the user completes the skill-based game within the predefined period of time.

13. A computer implemented method in accordance with claim 8, including the steps of:

the processor receiving participation requests from a plurality of users;

the processor initiating an instance of the skill-based game for each of the plurality of users; and the processor generating and display a graphical representation of qualified users including each user having obtained a winning outcome in each corresponding skill-based game.

14. One or more non-transitory computer-readable storage media, having computer-executable instructions embodied thereon, wherein when executed by at least one processor, the computer-executable instructions cause the processor to:

receive from a web browser of a user computing device a participation request including a signal indicating activation of an auction webpage link being displayed in a host webpage, the signal including a host webpage identifier;

access a database including a webpage list including a plurality of host webpage data records and an auction list including a plurality of auction items, each host webpage data record including a host webpage identifier associated with a host webpage and visual webpage design elements associated with the corresponding host webpage;

determine a host webpage data record associated with the received host webpage identifier, and retrieve the visual webpage design elements included with the determined host webpage data record;

display an online auction including generating and displaying an auction webpage on the user computing device via the web browser, the auction webpage including the retrieved visual webpage design elements associated with the host webpage and a plurality of auction items;

receive from the web browser a bid request from the user including a selected auction item and a bid unit;

determine a remaining bidding time associated with the selected auction item; and upon determining the remaining bidding time is less than a predefined remaining bidding time:

initiate a skill-based game including:

access a game list stored in the database and select a game record from the game list including game data associated with a skill-based game; and generate and display the skill-based game to the user via the user computing device based on the game data included in the selected game record;

receive a skill input from the user and determine an outcome of the skill-based game as a function of the received skill input;

determine a score value associated with outcome of the skill-based game; and associate a bid with the selected auction item based on the received bid request if the outcome of the skill-based game is a winning outcome and the determined score value is greater than a predefined score value.

15. A networked computer system for providing a webpage to a user, comprising:

a database including a webpage list including a plurality of host webpage data records and an auction list including a plurality of auction items, each host webpage data record including a host webpage identifier associated with a host webpage and visual webpage design elements associated with the corresponding host webpage;

wherein the database includes a game list including a plurality of game records, each game record including game data including information associated with a corresponding skill-based game, a difficulty level of the corresponding skill-based game, and an auction item value associated with the corresponding skill-based game; and a computer server including a processor coupled to a memory device, the processor programmed to:

receive from a web browser of a user computing device a participation request including a signal indicating activation of an auction webpage link being displayed in a host webpage, the signal including a host webpage identifier;

access the database, determine a host webpage data record associated with the received host webpage identifier, and retrieve the visual webpage design elements included with the determined host webpage data record;

display an online auction including generating and displaying an auction webpage on the user computing device via the web browser, the auction webpage including the retrieved visual webpage design elements associated with the host webpage and a plurality of auction items;

receive from the web browser a bid request from the user including a selected auction item and a bid unit;

determine a remaining bidding time associated with the selected auction item; and upon determining the remaining bidding time is less than a predefined remaining bidding time:

initiate a skill-based game including:

determine a value of the selected auction item;

access the database to select a game record associated with the determined value of the selected auction item;

generate and display the skill-based game to the user via the user computing device based on the game data and difficulty level associated with the selected game record;

receive a skill input from the user and determine an outcome of the skill-based game as a function of the received skill input; and associate a bid with the selected auction item based on the received bid request if the outcome of the skill-based game is a winning outcome.

16. A computer implemented method of operating a networked computer system to provide a webpage to a user, the networked computer system including a database and a computer server including a processor and a memory device, the method including the steps of:

the processor receiving from a web browser of a user computing device a participation request including a signal indicating activation of an auction webpage link being displayed in a host webpage, the signal including a host webpage identifier;

the processor accessing the database including a webpage list including a plurality of host webpage data records and an auction list including a plurality of auction items, each host webpage data record including a host webpage identifier associated with a host webpage and visual webpage design elements associated with the corresponding host webpage;

wherein the database includes a game list including a plurality of game records, each game record including game data including information associated with a corresponding skill-based game, a difficulty level of the corresponding skill-based game, and an auction item value associated with the corresponding skill-based game;

the processor determining a host webpage data record associated with the received host webpage identifier and retrieving the visual webpage design elements included with the determined host webpage data record;

the processor displaying an online auction including generating and displaying an auction webpage on the user computing device via the web browser, the auction webpage including the retrieved visual webpage design elements associated with the host webpage and a plurality of auction items;

the processor receiving from the web browser a bid request from the user including a selected auction item and a bid unit;

the processor determining a remaining bidding time associated with the selected auction item; and upon determining the remaining bidding time is less than a predefined remaining bidding time:

the processor initiating a skill-based game including:

the processor determining a value of the selected auction item;

the processor accessing the database to select a game record associated with the determined value of the selected auction item;

the processor generating and displaying the skill-based game to the user via the user computing device based on the game data and difficulty level associated with the selected game record;

the processor receiving a skill input from the user and determine an outcome of the skill-based game as a function of the received skill input; and the processor associating a bid with the selected auction item based on the received bid request if the outcome of the skill-based game is a winning outcome.

17. A networked computer system for providing a webpage to a user, comprising:

a database including a webpage list including a plurality of host webpage data records and an auction list including a plurality of auction items, each host webpage data record including a host webpage identifier associated with a host webpage and visual webpage design elements associated with the corresponding host webpage; and a computer server including a processor coupled to a memory device, the processor programmed to:

receive from a web browser of a user computing device a participation request including a signal indicating activation of an auction webpage link being displayed in a host webpage, the signal including a host webpage identifier;

access the database, determine a host webpage data record associated with the received host webpage identifier, and retrieve the visual webpage design elements included with the determined host webpage data record;

display an online auction including generating and displaying an auction webpage on the user computing device via the web browser, the auction webpage including the retrieved visual webpage design elements associated with the host webpage and a plurality of auction items;

receive from the web browser a bid request from the user including a selected auction item and a bid unit;

determine a remaining bidding time associated with the selected auction item; and upon determining the remaining bidding time is less than a predefined remaining bidding time:

initiate a skill-based game including:

access a game list stored in the database and select a game record from the game list including game data associated with a skill-based game; and generate and display the skill-based game to the user via the user computing device based on the game data included in the selected game record;

receive a skill input from the user and determine an outcome of the skill-based game as a function of the received skill input; and associate a bid with the selected auction item based on the received bid request if the outcome of the skill-based game is a winning outcome;

wherein the computer server is further programmed to:

determine a number of skill-based games previously played by the user and having a corresponding non-winning outcomes; and excluding the user from participation in the online auction if the number of skill-based games previously played by the user and having a corresponding non-winning outcome is greater than a predefined number of skill-based games.

18. A computer implemented method of operating a networked computer system to provide a webpage to a user, the networked computer system including a database and a computer server including a processor and a memory device, the method including the steps of:

the processor receiving from a web browser of a user computing device a participation request including a signal indicating activation of an auction webpage link being displayed in a host webpage, the signal including a host webpage identifier;

the processor accessing the database including a webpage list including a plurality of host webpage data records and an auction list including a plurality of auction items, each host webpage data record including a host webpage identifier associated with a host webpage and visual webpage design elements associated with the corresponding host webpage;

the processor determining a host webpage data record associated with the received host webpage identifier and retrieving the visual webpage design elements included with the determined host webpage data record;

the processor displaying an online auction including generating and displaying an auction webpage on the user computing device via the web browser, the auction webpage including the retrieved visual webpage design elements associated with the host webpage and a plurality of auction items;

the processor receiving from the web browser a bid request from the user including a selected auction item and a bid unit;

the processor determining a remaining bidding time associated with the selected auction item; and upon determining the remaining bidding time is less than a predefined remaining bidding time:

the processor initiating a skill-based game including:

the processor accessing a game list stored in the database and select a game record from the game list including game data associated with a skill-based game; and the processor generating and displaying the skill-based game to the user via the user computing device based on the game data included in the selected game record;

the processor receiving a skill input from the user and determine an outcome of the skill-based game as a function of the received skill input; and the processor associating a bid with the selected auction item based on the received bid request if the outcome of the skill-based game is a winning outcome;

wherein method further includes the steps of:

the processor determining a number of skill-based games previously played by the user and having a corresponding non-winning outcomes; and the processor excluding the user from participation in the online auction if the number of skill-based games previously played by the user and having a corresponding non-winning outcome is greater than a predefined number of skill-based games.

* * * * *